US007877304B1

(12) United States Patent
Coulter

(10) Patent No.: US 7,877,304 B1
(45) Date of Patent: Jan. 25, 2011

(54) SYSTEM AND METHOD FOR MANAGING CONSUMER INFORMATION

(76) Inventor: David B. Coulter, 2594 Red Rock Rd., Corona, CA (US) 92882

( * ) Notice: Subject to any disclaimer, the term of this patent is extended or adjusted under 35 U.S.C. 154(b) by 322 days.

(21) Appl. No.: 11/304,781

(22) Filed: Dec. 15, 2005

Related U.S. Application Data

(60) Provisional application No. 60/636,715, filed on Dec. 16, 2004.

(51) Int. Cl.
*G06Q 40/00* (2006.01)

(52) U.S. Cl. .......................................................... 705/35

(58) Field of Classification Search ....................... None
See application file for complete search history.

(56) References Cited

U.S. PATENT DOCUMENTS

| | | | | |
|---|---|---|---|---|
| 6,338,050 | B1 | 1/2002 | Conklin et al. | |
| 6,925,440 | B1 | 8/2005 | Shkedi | |
| 6,954,741 | B1 | 10/2005 | Burchetta et al. | |
| 7,003,488 | B2 | 2/2006 | Dunne et al. | |
| 7,028,052 | B2 | 4/2006 | Chapman et al. | |
| 7,136,448 | B1 | 11/2006 | Venkataperumal et al. | |
| 7,139,734 | B2 * | 11/2006 | Nathans et al. | 705/38 |
| 7,206,768 | B1 | 4/2007 | deGroeve et al. | |
| 7,249,076 | B1 * | 7/2007 | Pendleton et al. | 705/35 |
| 7,280,980 | B1 | 10/2007 | Hoadley et al. | |
| 7,305,364 | B2 * | 12/2007 | Nabe et al. | 705/37 |
| 7,349,881 | B1 | 3/2008 | Lockwood | |
| 7,401,050 | B2 | 7/2008 | O'Neill | |
| 2001/0053967 | A1 | 12/2001 | Gordon et al. | |
| 2002/0072975 | A1 * | 6/2002 | Steele et al. | 705/14 |
| 2002/0077964 | A1 | 6/2002 | Brody et al. | |
| 2002/0087460 | A1 * | 7/2002 | Hornung | 705/38 |
| 2002/0091625 | A1 | 7/2002 | Blauvelt et al. | |
| 2002/0099649 | A1 | 7/2002 | Lee et al. | |
| 2002/0173994 | A1 * | 11/2002 | Ferguson, III | 705/4 |
| 2002/0194096 | A1 | 12/2002 | Falcone et al. | |
| 2002/0194122 | A1 * | 12/2002 | Knox et al. | 705/39 |
| 2003/0014265 | A1 * | 1/2003 | Landry et al. | 705/1 |
| 2003/0028406 | A1 | 2/2003 | Herz et al. | |
| 2003/0036995 | A1 * | 2/2003 | Lazerson | 705/38 |

(Continued)

OTHER PUBLICATIONS

Managing Consumer Credit Risk, Peter Burns and Anne Stanley, Federal Reserve Bank of Philadelphia, Jul. 31, 2001.*

(Continued)

*Primary Examiner*—Alexander Kalinowski
*Assistant Examiner*—Bruce I Ebersman

(57) ABSTRACT

Method and system of analyzing a consumer's credit is provided. The method includes, answering questions about the consumer's credit; analyzing the answers to determine credit data about the consumer; storing the credit data in a leads database; storing the credit data in a credit analysis database; displaying the credit data to the consumer; inquiring into whether the consumer wants to register for managing credit online; and registering the consumer or sending the credit data to a marketing analysis engine to categorize the credit data for future marketing to the consumer. The system includes a user interface for entering user data; a credit score meter for accessing a credit score; and a processing module for segregating credit data items into categories; wherein the processing module calculates a credit score; an interest rate for each of the categories; and payment amounts for each of the categories.

6 Claims, 59 Drawing Sheets

U.S. PATENT DOCUMENTS

| | | | | |
|---|---|---|---|---|
| 2003/0036996 | A1 | 2/2003 | Lazerson | |
| 2003/0046223 | A1* | 3/2003 | Crawford et al. | 705/38 |
| 2003/0093289 | A1 | 5/2003 | Thornley et al. | |
| 2003/0135451 | A1 | 7/2003 | O'Brien et al. | |
| 2003/0149659 | A1* | 8/2003 | Danaher et al. | 705/38 |
| 2003/0154406 | A1 | 8/2003 | Honarvar et al. | |
| 2003/0229580 | A1 | 12/2003 | Gass et al. | |
| 2004/0054619 | A1 | 3/2004 | Watson et al. | |
| 2004/0111359 | A1* | 6/2004 | Hudock | 705/38 |
| 2004/0111370 | A1* | 6/2004 | Saylors et al. | 705/40 |
| 2004/0153663 | A1* | 8/2004 | Clark et al. | 713/200 |
| 2004/0158521 | A1* | 8/2004 | Newton et al. | 705/38 |
| 2004/0177030 | A1* | 9/2004 | Shoham | 705/38 |
| 2004/0199456 | A1 | 10/2004 | Flint et al. | |
| 2004/0243508 | A1 | 12/2004 | Samson et al. | |
| 2005/0015304 | A1 | 1/2005 | Evroni et al. | |
| 2005/0021462 | A1 | 1/2005 | Teague et al. | |
| 2005/0080718 | A1 | 4/2005 | Desai | |
| 2005/0125686 | A1 | 6/2005 | Brandt | |
| 2005/0154664 | A1* | 7/2005 | Guy et al. | 705/35 |
| 2005/0182713 | A1 | 8/2005 | Marchesi | |
| 2006/0031158 | A1* | 2/2006 | Orman | 705/38 |
| 2006/0059073 | A1 | 3/2006 | Walzak | |
| 2006/0080230 | A1 | 4/2006 | Freiberg | |
| 2006/0089905 | A1* | 4/2006 | Song et al. | 705/39 |
| 2006/0190394 | A1 | 8/2006 | Fraser et al. | |
| 2006/0200396 | A1 | 9/2006 | Satterfield et al. | |
| 2006/0218067 | A1* | 9/2006 | Steele | 705/35 |
| 2007/0067297 | A1* | 3/2007 | Kublickis | 707/9 |
| 2007/0078786 | A1* | 4/2007 | Bous et al. | 705/74 |

OTHER PUBLICATIONS

Improving Credit Information, Andrew Powell, Nataliya Mylenko,, Margaret Miller, Giovanni Majnoni, World Bank Policy Research, 2004.*

Credit Report Accuracy and Access to Credit Robert Avery, Federal Reserve Bulletin, vol. 90, Issue.*

FDIC Consumer News—Winter 2002/2003, Winter of 2002-2002, Feb. 2003, pp. 1-4; http://www.fdic.gov/consumers/consumer/news/cnwin0203/ch101.html.

Non-Final Office Action on co-pending application dated Feb. 21, 2008; U.S. Appl. No. 11/304,835.

Non-Final Office Action on co-pending application dated Feb. 22, 2008; U.S. Appl. No. 11/304,249.

Notice of Allowance on co-pending US application (U.S. Appl. No. 11/304,249) dated Aug. 13, 2010.

Final Office Action on co-pending US. application (U.S. Appl. No. 11/304,782) dated Aug. 31, 2010.

Non-Final Office Action on co-pending application dated Jun. 24, 2008; U.S. Appl. No. 11/304,782.

Final Office Action on co-pending application dated Apr. 28, 2009; U.S. Appl. No. 11/304,782.

Non-Final Office Action on co-pending application dated Dec. 28, 2009; U.S. Appl. No. 11/304,782.

Final Office Action on co-pending application dated Oct. 3, 2008; U.S. Appl. No. 11/304,835.

Non-Final Office Action on co-pending application dated May 27, 2009; U.S. Appl. No. 11/304,835.

Final Office Action on co-pending application dated Dec. 28, 2009; U.S. Appl. No. 11/304,835.

Final Office Action on co-pending application dated Oct. 3, 2008; U.S. Appl. No. 11/304,249.

Non-Final Office Action on co-pending application dated Nov. 13, 2009; U.S. Appl. No. 11/304,249.

Three (3) Screenshots of a website for internal use by the Applicant (3 pages).

* cited by examiner

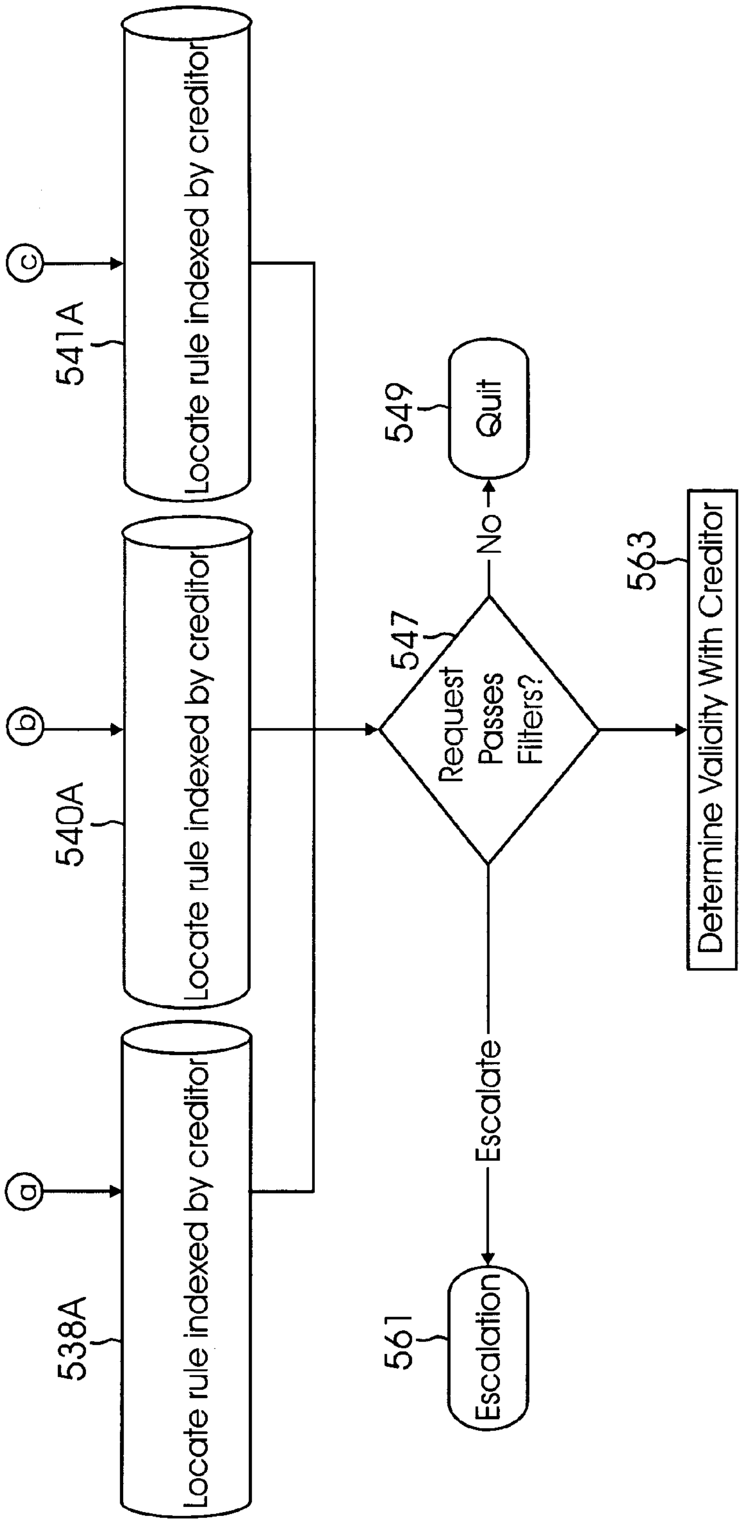
FIG. 5C(ii)
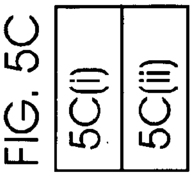
FIG. 5C

230 Service Action Guide

Taking ACTION: Opt-in & Opt-Out

Throughout our services, you will find ACTION Buttons where you control the actions and, thereby, any charges according to your billing plan.

IMPORTANT : The color outlines of ACTION Buttons are:

GREY item is ready for you to take action, called Opt-In.

RED means this item is in process and action has been taken. You can stop the action, called Opt-Out, which will turn its outline color back to grey.

EXAMPLE: In Credit Corrections you would see:

232 Grey indicates this item is ready to be disputed. Opt-In by clicking.

234 Red indicates this item is already being disputed and can be Opt-Out.

Credit Corrections Debt Relief Identity Shield

Credit Corrections

View Negative Items on your Credit Report(s) & DISPUTE ERRORS:

236 This ACTION Button allows you to Dispute Errors (inaccurate, outdated or unverifiable items) on your credit report(s). Request this Credit Report Item be Disputed. You also give the reason why.

Go to top of this page

Debt Relief

View Credit Items on your Credit Report for debt relief.

These ACTION Buttons next to Credit Report Items show which items are eligible for submission to debt relief.

238 % Request an Interest Rate Reduction from your Creditor.

Request offer and compromise from your creditor for debt

FIG. 7

240 

reduction.

242 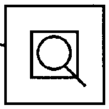 Request your Creditor to Validate this Debt and the terms and conditions.

back up to menu

Identity Shield

View Credit Report Items and determine if they are NOT YOURS or take it one step further by declaring you are a victim of ID theft:

These ACTION Buttons next to Credit Report Items allow you to DISPUTE as not yours or declare you are a victim of Identity Theft for the specific item.

NOTE: Selecting NOT YOUR item on your Credit Report is also available to you in the Credit Corrections section.

244 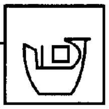 Dispute this item as NOT YOURS.

246  Dispute this item as NOT YOURS and submit this to the authorities that you are a victim of Identity Theft for this item.

back up to menu

FIG. 8

CREDIT CORRECTION DISPUTE

CREDIT DISPUTE OPT IN

Do you wish to confirm that you are Opting In to this item?

Please find below the details of the item you are Opting In. By clicking the confirm button below you are confirming that you are Opting In for this item. We will record this action you are taking as an electronic signature.

This is not my account.  250  ■ — or

Reason | This is not my account.

[Confirm] [Cancel]
252        254

| | (A) | (B) | (C) |
|---|---|---|---|
| [-]COMMERCIAL SERVICE C | | | |
| Status: | NEGATIVE | NEGATIVE | NEGATIVE |
| Item Account Number: | 42XX | 42XX | 42XX |
| Reference Number: | | | |
| Date Opened: | 2001-06-01 | 2001-06-01 | 2001-06-01 |
| Item Type: | | | |
| Balance: | 229.0 | 229.0 | 229.0 |
| Date Disputed: | | | |

[CLOSE]

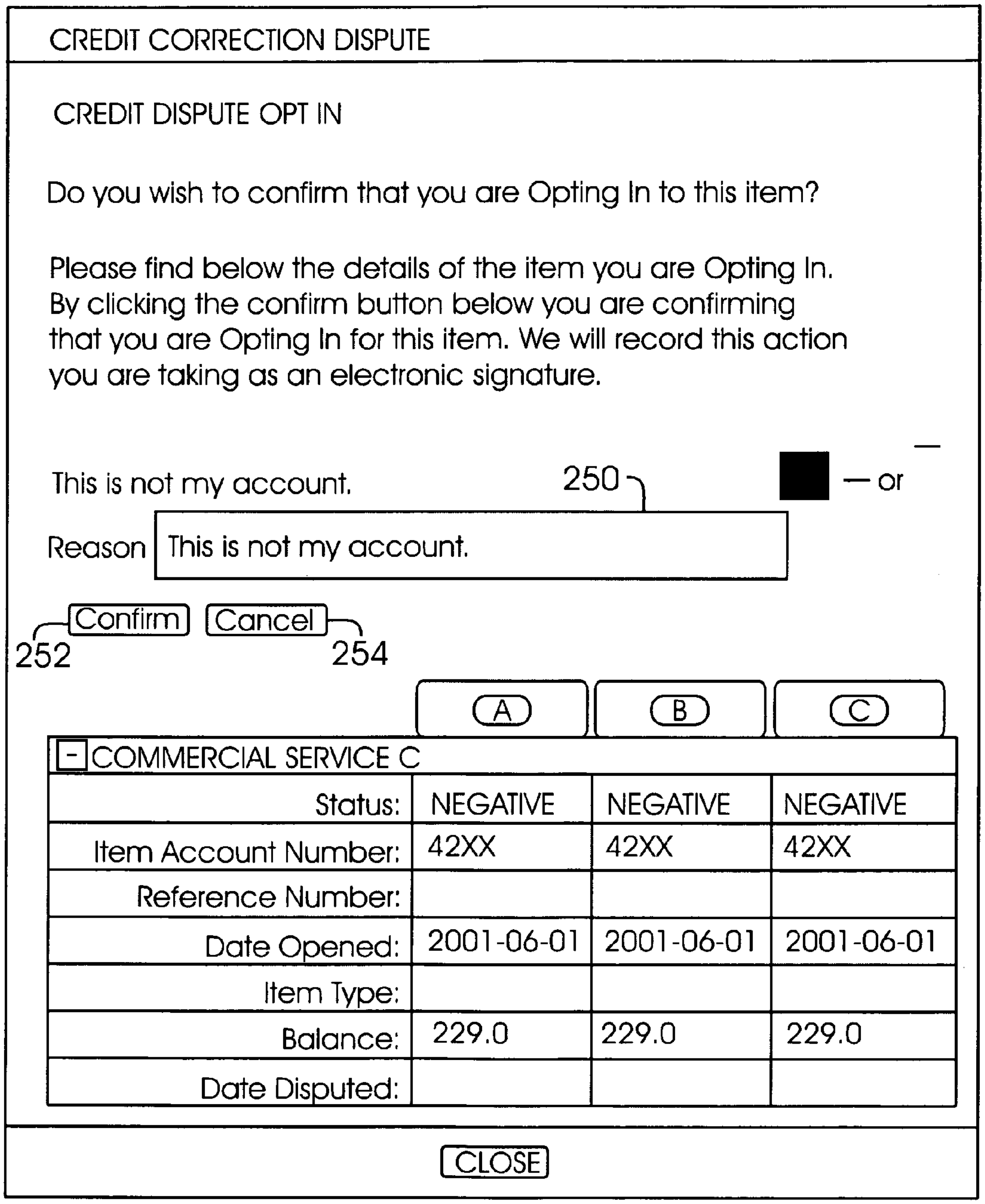

CREDIT SCORE METER

| Loan | | | Present | | Future | | Savings | |
|---|---|---|---|---|---|---|---|---|
| Type | Amount | No.of Months | Interest Rate % | Payment $ | Interest Rate % | Payment $ | Monthly $ | Total $ |
| Mortgage | 200000 | 359 | 10.02 | $1,758.16 | 7.51 | $1400.46 | $357.70 | $128,772.87 |
| Auto | 25000 | 59 | 20.39 | $667.84 | 14.48 | $587.92 | $79.92 | $4,795.17 |
| Credit Card | 15000 | 59 | 20.93 | $405.21 | 15.71 | $362.46 | $42.75 | $2,564.78 |
| Personal | 10000 | 59 | 20.39 | $267.14 | 14.48 | $235.17 | $31.97 | $1,918.07 |
| Total | | | | $3,098.34 | | $2,586.01 | $512.34 | $138,050.90 |

Current Score (a)
382 484
386 658
Future Score (b)

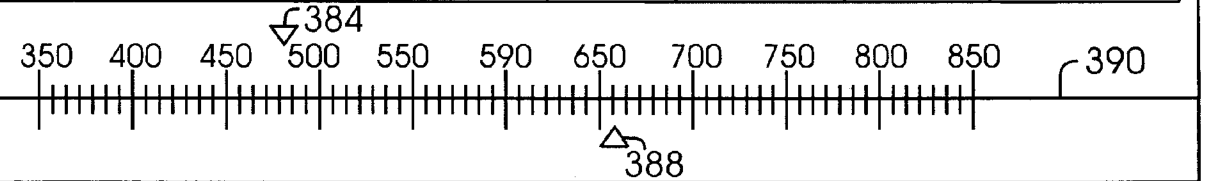

Our Credit Score Meter can be used to approximate what your saving could be with improvements in your credit score and thereafter refinancing your debt. We work on your behalf to improve your credit and debt outlook (a) Your current credit score (b) Your future credit score INSTRUCTIONS: You can enter your Mortgage, Auto, Credit Card and Personal loan amounts and number of months remaining. Then pick up the RED current score indicator and move it to where your Current score is. Then see how you could save with the system by your picking up the BLUE Future Score indicator to show improvements and savings.

| MEMBER HOME | CREDIT METER | REFER A FRIEND | BILLING & ACCOUNT INFO | For Your Future | UPGRADE MEMBERSHIP | LOGOUT |
|---|---|---|---|---|---|---|

You are now in
Negative Items And Those Disputed
Here you will find disputed and negatively reported items.

| DISPUTE NEGATIVE CREDIT ITEMS | DISPUTE INQUIRIES | DISPUTE PUBLIC RECORDS |
|---|---|---|

Member Home>>Credit Corrections>>Negative Items Disputed
Credit Items
The information listed here are as shown in our database and as you have reported to us.    (?)

| Contract All | (A) | (B) | (C) |
|---|---|---|---|
| ⊞ 1STNATBK | | | |
| Status: | NOT REPORTED | NOT REPORTED | POSITIVE |
| ⊞ AAFES | | | |
| In Dispute 🗑 Status: | NOT REPORTED | NOT REPORTED | NEGATIVE <u>542</u> |
| ⊞ AM DIR CR | | | |
| Dispute 🗑 Status: | NOT REPORTED | NOT REPORTED | NEGATIVE <u>544</u> |

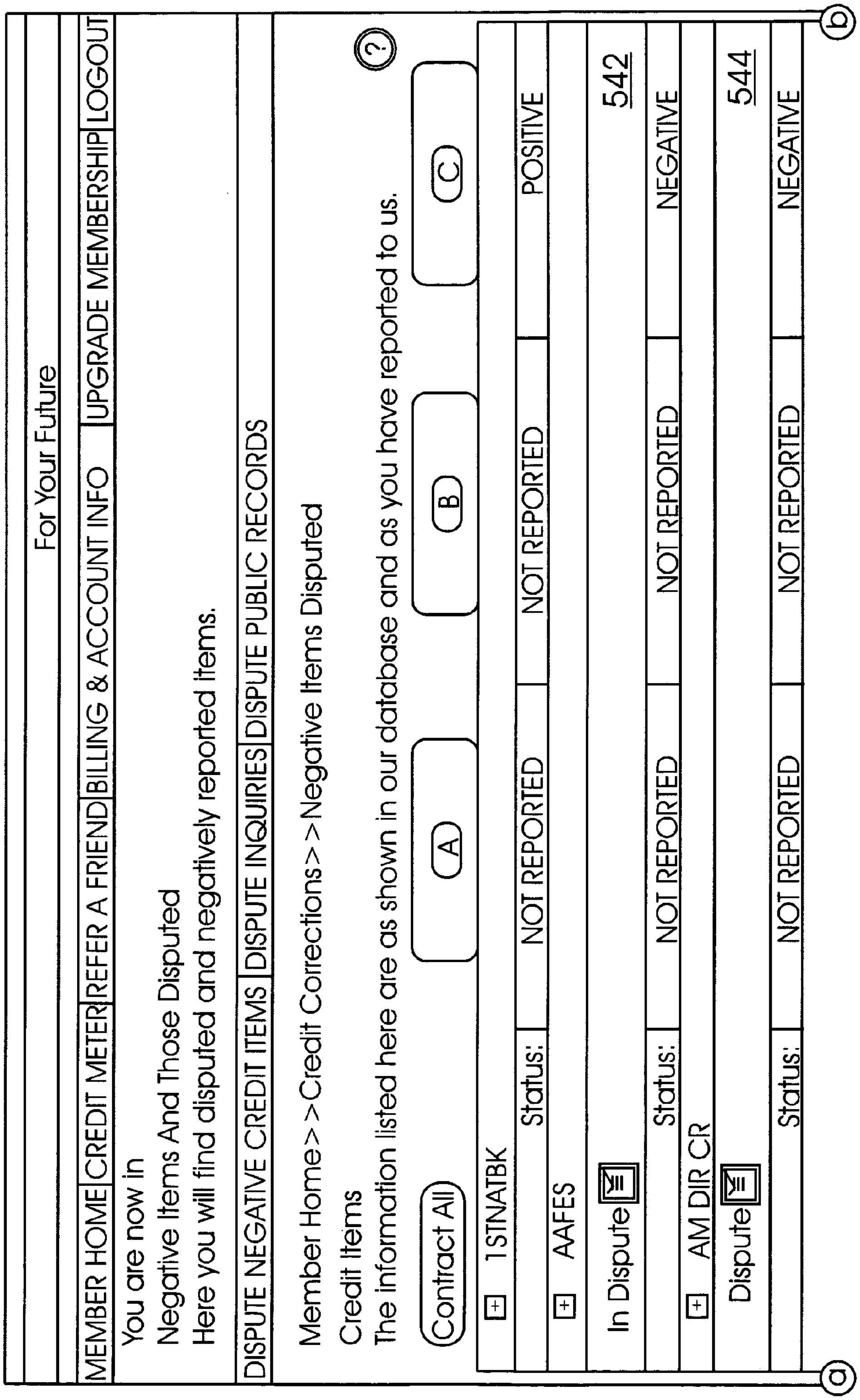

FIG. 11(i)

| | | | |
|---|---|---|---|
| ⊞ CALIFORNIA NATIONAL | | | |
| In Dispute ☒ | | | 546 |
| Status : | NEGATIVE | NEGATIVE | NOT REPORTED |
| Account Number : | 549062017001XXXX | 549062017001XXXX | |
| Payment Amount : | $0.00 | $0.00 | |
| High Credit Amount : | | | |
| Account Opened Date: | 1997-08-01 | 1997-08-01 | |
| Unpaid Balance : | $0.00 | $0.00 | |
| Current Rating : | Open | Open | |
| Late 30 Days : | | | |
| Late 60 Days : | | | |
| Late 90 Days : | | | |
| Creditor Comments: | ACCOUNT INCLUDED IN BANKRUPTCY CHAPTER 7,11 OR 12 | ACCOUNT INCLUDED IN BANKRUPTCY CHAPTER 7,11 OR 12 | |
| ⊞ BANK | | | |
| In Dispute ☒ | | | 548 |
| Status : | NOT REPORTED | NOT REPORTED | NEGATIVE |

⊟ COMMERCIAL SERVICE C

In Dispute ☒ 550

| | | | |
|---|---|---|---|
| Status : | NEGATIVE | NEGATIVE | NEGATIVE |
| Account Number : | 42XX | 42XX | 42XX |
| Payment Amount : | $38.00 | $38.00 | $38.00 |
| High Credit Amount : | $229.00 | $229.00 | $229.00 |
| Account Opened Date: | 2001-06-01 | 2001-06-01 | 2001-06-01 |
| Unpaid Balance : | $229.00 | $229.00 | $229.00 |
| Current Rating : | Open | Open | Open |
| Late 30 Days : | | | |
| Late 60 Days : | | | |
| Late 90 Days : | | | |
| Creditor Comments: | CHARGED OFF ACCOUNT<br>CHARGE OFF | CHARGED OFF ACCOUNT<br>CHARGE OFF | CHARGED OFF ACCOUNT<br>CHARGE OFF |

⊟ CREDIT ACCEPTANCE

FIG. 11

| |
|---|
| 11(i) |
| 11(ii) |
| 11(iii) |

FIG. 11(iii)

| Dispute | A | B | C 552 |
|---|---|---|---|
| Status : | NEGATIVE | NEGATIVE | NOT REPORTED |
| Account Number : | 120XXXX | 120XXXX | |
| Payment Amount : | $0.00 | $0.00 | |
| High Credit Amount : | $10,350.00 | $10,350.00 | |
| Account Opened Date: | 2000-02-01 | 2000-02-01 | |
| Unpaid Balance : | $0.00 | $0.00 | |
| Current Rating : | Open | Open | |
| Late 30 Days : | | | |
| Late 60 Days : | | | |
| Late 90 Days : | | | |
| Creditor Comments: | INCLUDED IN CHAP.13 BANKRUPTCY | INCLUDED IN CHAP.13 BANKRUPTCY | |

⊟ CREDITACPT

| Dispute | | | 554 |
|---|---|---|---|
| Status : | NOT REPORTED | NOT REPORTED | NEGATIVE |
| Account Number : | | | N/A |
| Payment Amount : | | | $0.00 |
| High Credit Amount : | | | |
| Account Opened Date: | | | 2000-02-01 |
| Unpaid Balance : | | | $0.00 |
| Current Rating : | | | Open | a b c d e

| | | | |
|---|---|---|---|
| Late 30 Days : | | | |
| Late 60 Days : | | | 0 |
| Late 90 Days : | | | 0 |
| Creditor Comments: | | | ACCOUNT INCLUDED IN BANKRUPTCY CHAPTER 7,11 OR 12 |
| ⊟ DEPT AFF | | | |
| Dispute ☒ | | | 556 |
| Status : | NEGATIVE | NEGATIVE | NOT REPORTED |
| Account Number : | 99425932033XXXX | 99425932033XXXX | |
| Payment Amount : | $0.00 | $0.00 | |
| High Credit Amount : | $731.00 | $731.00 | |
| Account Opened Date: | 1997-10-01 | 1997-10-01 | |
| Unpaid Balance : | $731.00 | $731.00 | |
| Current Rating : | Open | Open | |
| Late 30 Days : | | | |
| Late 60 Days : | | | |
| Late 90 Days : | | | |
| Creditor Comments: | COLLECTION ACCOUNT | COLLECTION ACCOUNT | |
| ⊟ FIRST NATL BK | | | |

Dispute ☒ 558

| | | | |
|---|---|---|---|
| Status : | NEGATIVE | NEGATIVE | NOT REPORTED |
| Account Number : | 407193023001XXXX | 407193023001XXXX | |
| Payment Amount : | $0.00 | $0.00 | |
| High Credit Amount : | $450.00 | $450.00 | |
| Account Opened Date: | 2000-04-01 | 2000-04-01 | |
| Unpaid Balance : | $0.00 | $0.00 | |
| Current Rating : | Open | Open | |
| Late 30 Days : | | | |
| Late 60 Days : | | | |
| Late 90 Days : | | | |
| Creditor Comments: | INCLUDED IN CHAP.13 BANKRUPTCY | INCLUDED IN CHAP.13 BANKRUPTCY | | h i

FIG. 12(iii)

(h) (i)

— 2nd NATL BANK

Dispute ☒ 559

| | | | |
|---|---|---|---|
| Status : | NEGATIVE | NEGATIVE | NOT REPORTED |
| Account Number : | S17800708318XXXX | S17800708318XXXX | |
| Payment Amount : | $20.00 | $20.00 | |
| High Credit Amount : | $350.00 | $350.00 | |
| Account Opened Date: | 2002-08-01 | 2002-08-01 | |
| Unpaid Balance : | $340.00 | $340.00 | |
| Current Rating : | Open | Open | |
| Late 30 Days : | | | |
| Late 60 Days : | 1 | 1 | |
| Late 90 Days : | 0 | 0 | |
| Creditor Comments: | Current Account /was 30 Days Past Due | Current Account /was 30 Days Past Due | |

| |
|---|
| 12(i) |
| 12(ii) |
| 12(iii) |
| 12(iv) |

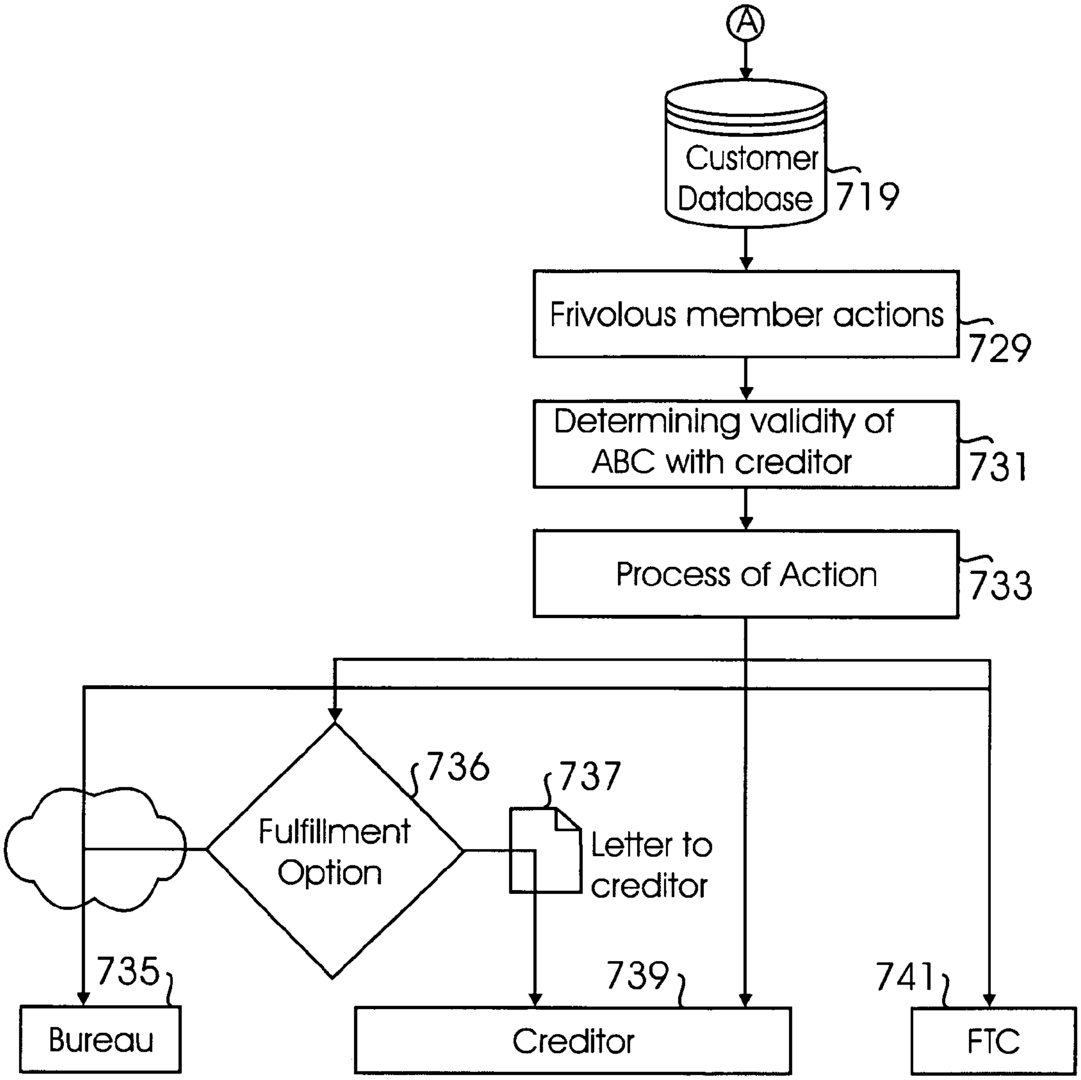
FIG. 22B(ii)
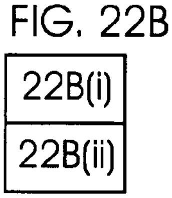
FIG. 22B

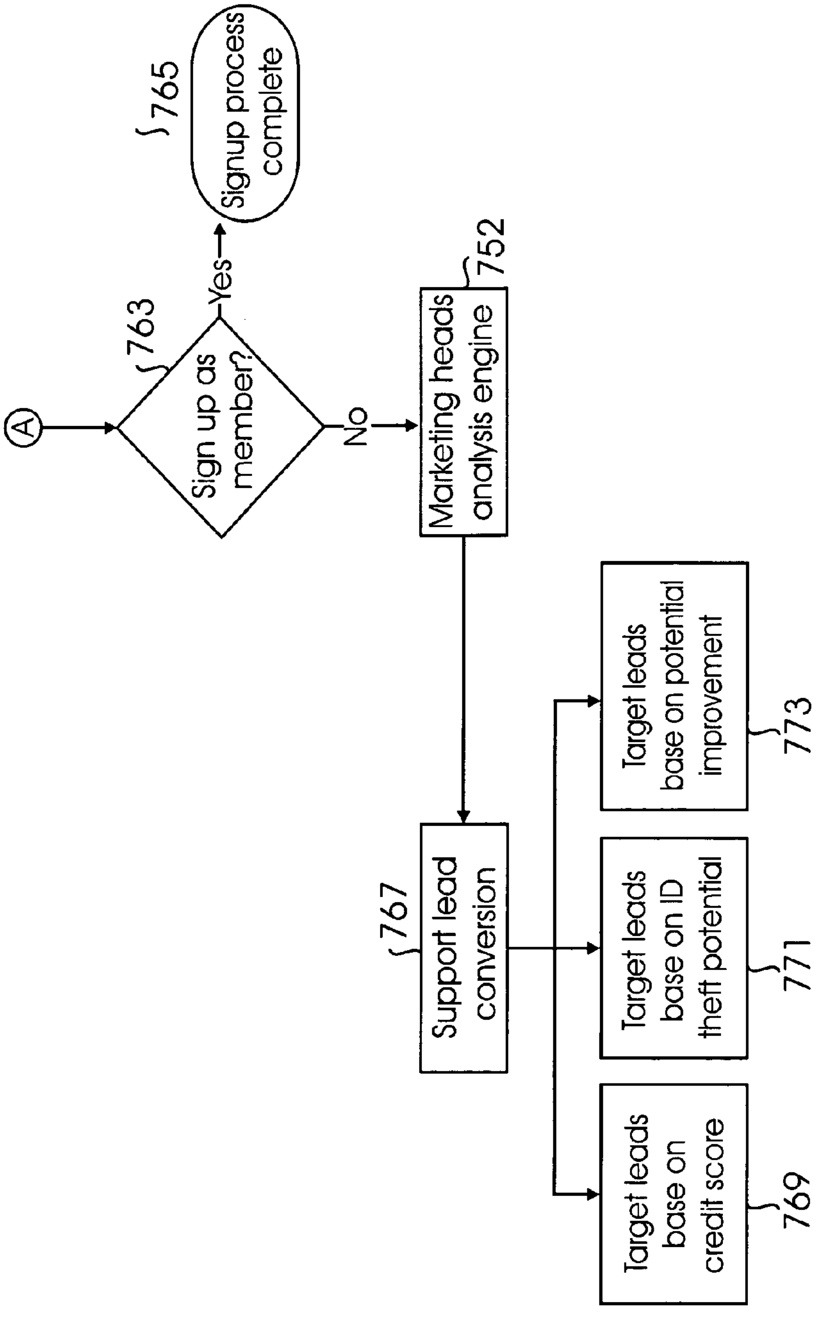
FIG. 23B(ii)
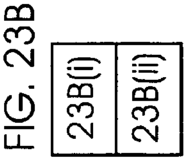
FIG. 23B

☐ A-L FINANCIAL CORP.
RECOMMENDED ACTION: N/A

| | ⊕ ConsumerDirect™ Action | ☐ Debt Settlement | ⊕ ID Theft Aware & Declare™ |
|---|---|---|---|
| ⊚ Debt Resolution | | % Validate this Debt | $ Interest Rate Reduction |

| | experian' | Union | EQUIFAX |
|---|---|---|---|
| Bureau Status: | NEGATIVE | NEGATIVE | NEGATIVE |
| Account Number: | 591111XXXX | 591111XXXX | 591111XXXX |
| Payment Amount: | 90.00 | 90.00 | 90.00 |
| High Credit Amount: | N A | N A | N A |
| Account Opened Date: | 2000.02.01 | 2000.02.01 | 2000.02.01 |
| Unpaid Balance: | 90.00 | 90.00 | 90.00 |
| Current rating: | Open | Open | Open |
| Late 30 Days: | 0 | 0 | 0 |
| Late 60 Days: | 0 | 0 | 0 |
| Late 90 Days: | 0 | 0 | 0 |

Creditor Comments:  AMOUNT IS CHARGE OFF      AMOUNT IS CHARGE OFF      AMOUNT IS CHARGE OFF
                    AMOUNT UNPAID BALANCE     AMOUNT UNPAID BALANCE     AMOUNT UNPAID BALANCE
                    REPORTED AS A LOSS BY     REPORTED AS A LOSS BY     REPORTED AS A LOSS BY
                    CREDIT GRANTOR AUTO LOAN  CREDIT GRANTOR AUTO LOAN  CREDIT GRANTOR AUTO LOAN

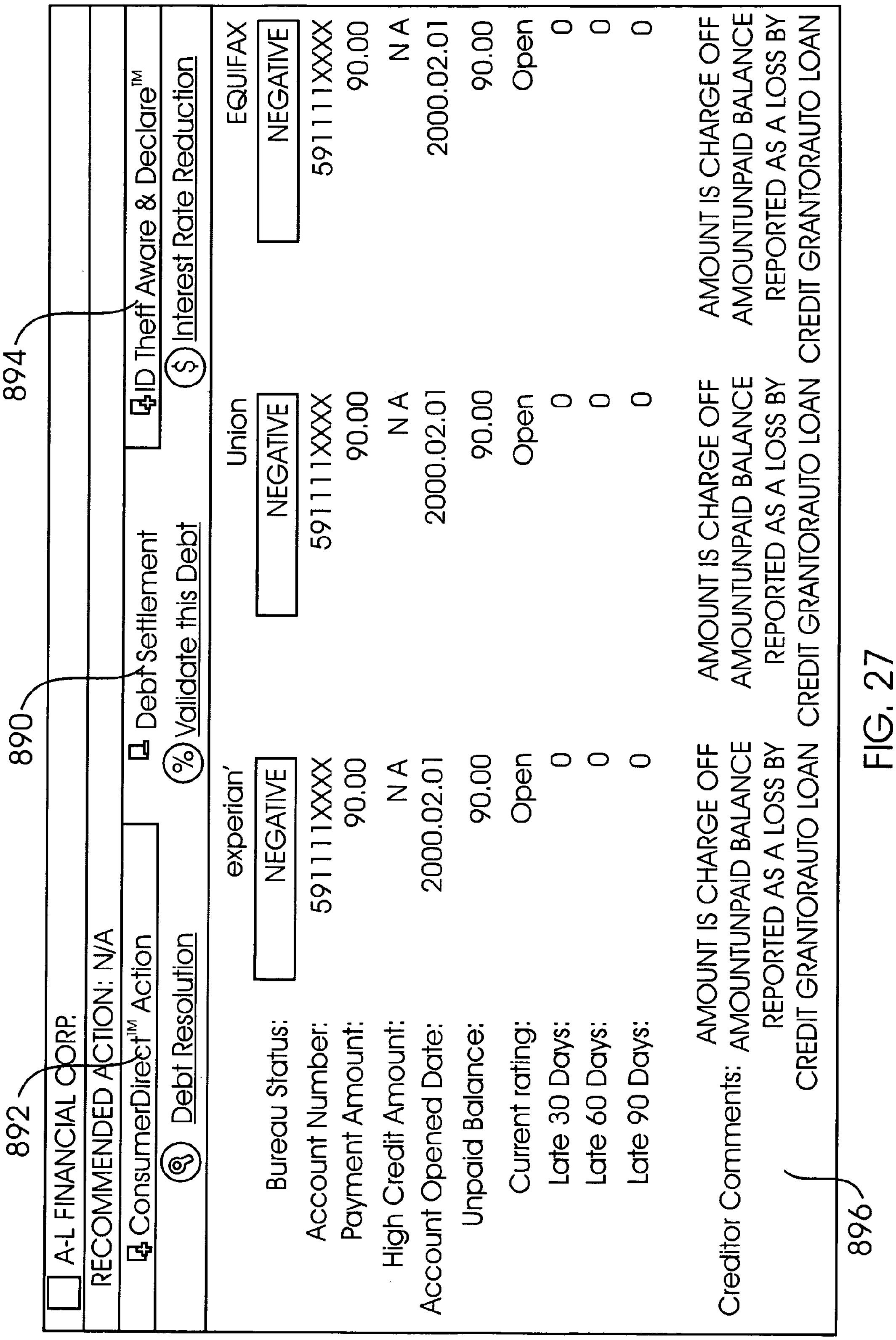

FIG. 27

| | A-L FINANCIAL CORP | |
|---|---|---|
| | RECOMMENDED ACTION: N/A | |
| [Debt Resolution] | ⊕ Debt Settlement | ⊕ ID Theft Aware & Declare™ |
| ⊕ ConsumerDirect™ Action | (%) Validate this Debt | ($) Interest Rate Reduction |

898A, 898B, 898C

1. INSTRUCTIONS: This Action will initiate a debt settlement request with this creditor. Please give reasonable time for your creditor to respond with either acceptance, denial, or counter offer. Note: We are not negotiating or representing you on your behalf.
2. What percentage of this debt do you wish to offer to your creditor [ %]
3. How many months do you wish to pay this? 
   Note: Enter zero to pay immediately upon acceptance [ ]
4. [SELECT A REASON FOR THE DEBT REDUCTION ✓] . Or . Type your reason below
   [                                    ]    [Take Action 900]

900A

|  | Experian' | Union | EQUIFAX |
|---|---|---|---|
| Bureau Status: | NEGATIVE | NEGATIVE | NEGATIVE |
| Account Number4: | 591111XXXX | 591111XXXX | 591111XXXX |
| Payment Amount: | 90.00 | 90.00 | 90.00 |
| High Credit Amount: | N A | N A | N A |
| Account Opened Date: | 2000.02.01 | 2000.02.01 | 2000.02.01 |

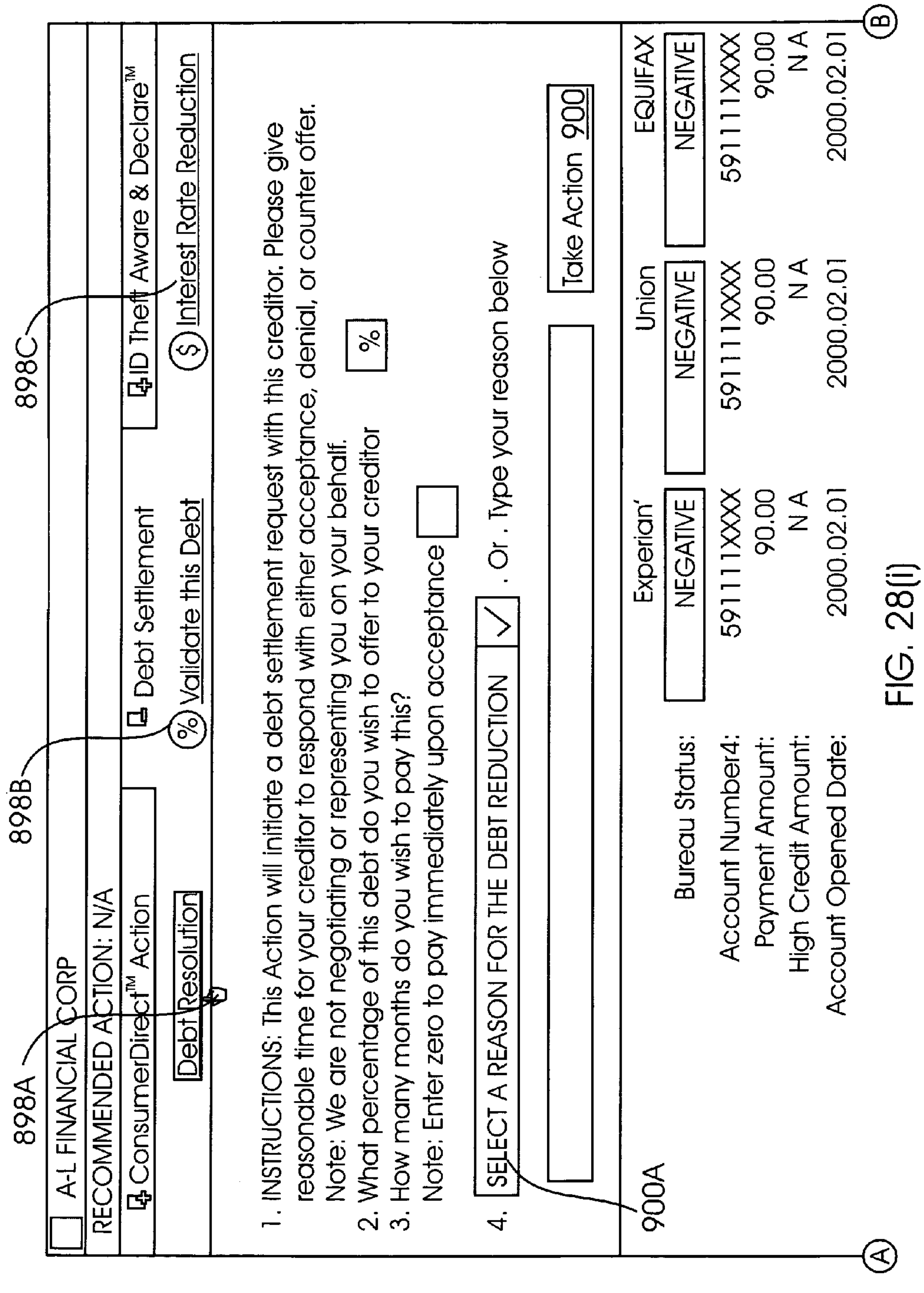

| | | | |
|---|---|---|---|
| Unpaid Balance: | 90.00 | 90.00 | 90.00 |
| Current rating: | Open | Open | Open |
| Late 30 Days: | 0 | 0 | 0 |
| Late 60 Days: | 0 | 0 | 0 |
| Late 90 Days: | 0 | 0 | 0 |
| Creditor Comments: | AMOUNT IS CHARGE OFF AMOUNTUNPAID BALANCE REPORTED AS A LOSS BY CREDIT GRANTORAUTO LOAN | AMOUNT IS CHARGE OFF AMOUNTUNPAID BALANCE REPORTED AS A LOSS BY CREDIT GRANTORAUTO LOAN | AMOUNT IS CHARGE OFF AMOUNTUNPAID BALANCE REPORTED AS A LOSS BY CREDIT GRANTORAUTO LOAN |

| ☐ A-L FINANCIAL CORP | | | |
|---|---|---|---|
| RECOMMENDED ACTION: N/A | | | |
| ⊕ ConsumerDirect™ Action | ⊡ Debt Settlement | | ⊕ ID Theft Aware & Declare™ |
| ⊙ Debt Resolution | % Validate this Debt | | $ Interest Rate Reduction |

898B

1. INSTRUCTIONS: This Action will initiate a verification already with the furnisher/creditor: [Take Action] — 902

| | Experian | Union | EQUIFAX |
|---|---|---|---|
| Bureau Status: | NEGATIVE | NEGATIVE | NEGATIVE |
| Account Number4: | 591111XXXX | 591111XXXX | 591111XXXX |
| Payment Amount: | 90.00 | 90.00 | 90.00 |
| High Credit Amount: | N A | N A | N A |
| Account Opened Date: | 2000.02.01 | 2000.02.01 | 2000.02.01 |
| Unpaid Balance: | 90.00 | 90.00 | 90.00 |
| Current rating: | Open | Open | Open |
| Late 30 Days: | 0 | 0 | 0 |
| Late 60 Days: | 0 | 0 | 0 |
| Late 90 Days: | 0 | 0 | 0 |
| Creditor Comments: | AMOUNT IS CHARGE OFF AMOUNTUNPAID BALANCE REPORTED AS A LOSS BY CREDIT GRANTORAUTO LOAN | AMOUNT IS CHARGE OFF AMOUNTUNPAID BALANCE REPORTED AS A LOSS BY CREDIT GRANTORAUTO LOAN | AMOUNT IS CHARGE OFF AMOUNTUNPAID BALANCE REPORTED AS A LOSS BY CREDIT GRANTORAUTO LOAN |

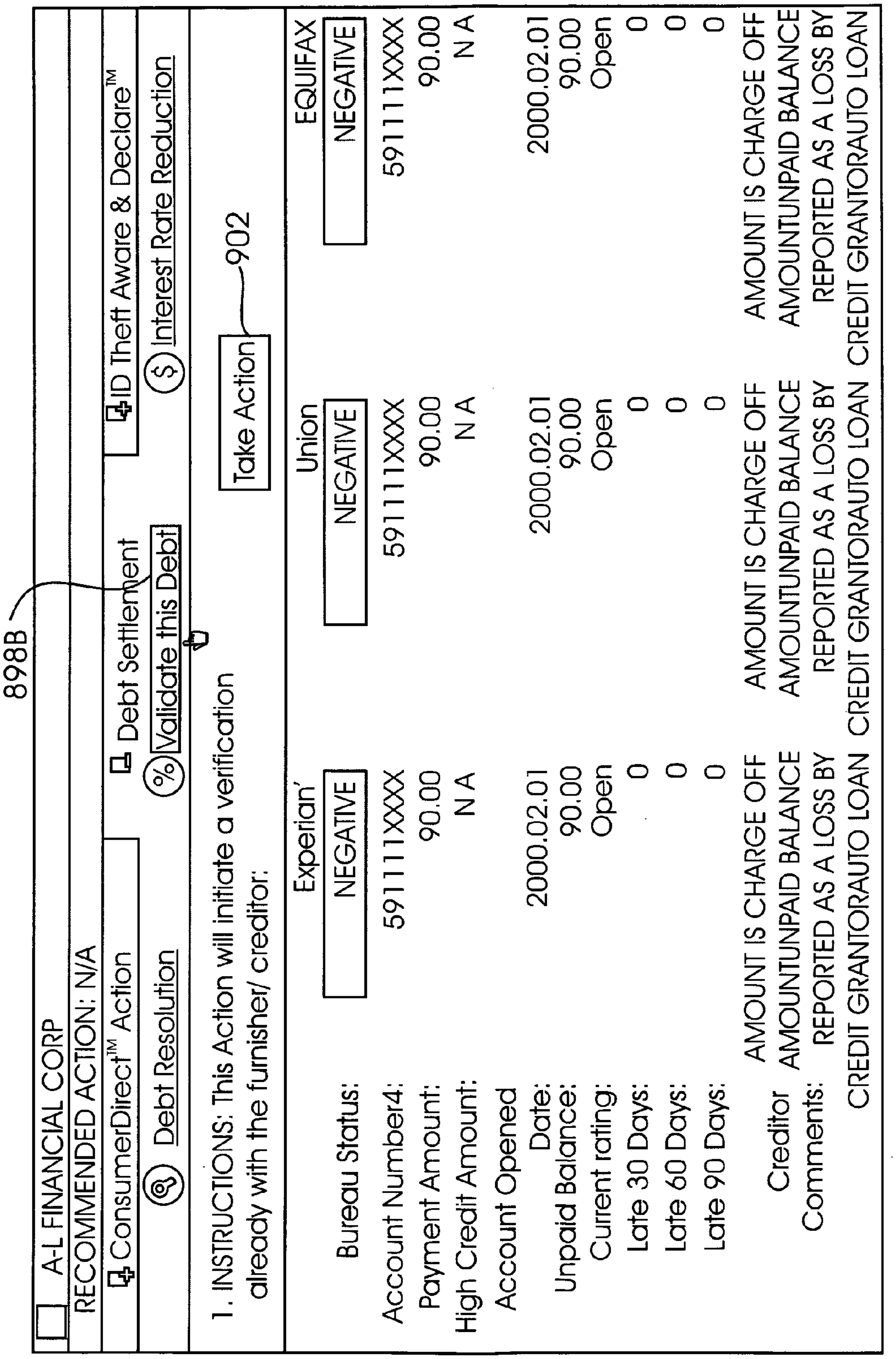

FIG. 29

☐ A-L FANICIAL CORP
RECOMMENDED ACTION: N/A

| 🖰 ConsumerDirect™ Action | ☐ Debt Settlement | 🖰 ID Theft Awake & Declare™ |
| 🖲 Debt Resolution | (%) Validate this Debt | ($) Interest Rate Reduction |

898C

1. INSTRUCTIONS: This Action will initiate a request to lower your interest rate on this account. Please give reasonable time to your creditor to respond with either acceptance, denial, or counter offer. Note: We are not negotiating or representing you on your behalf. This is only an interest rate reduction request.

2. Please enter the interest rate on this account that you are requesting to pay [  ] %
Important: Make sure you are not requesting an interest rate higher than you are currently paying.

3. SELECT A REASON FOR THE INTEREST RATE REDUCTION [ ∨ ]   Or. Type your reason below.

[                    ]    [ Take Action ]—908

906

|  | Experian' | Union | EQUIFAX |
|---|---|---|---|
| Bureau Status: | NEGATIVE | NEGATIVE | NEGATIVE |
| Account Number: | 591111XXXX | 591111XXXX | 591111XXXX |
| Payment Amount: | 90.00 | 90.00 | 90.00 |
| High Credit Amount: | N A | N A | N A |
| Account Opened Date: | 2000.02.01 | 2000.02.01 | 2000.02.01 |

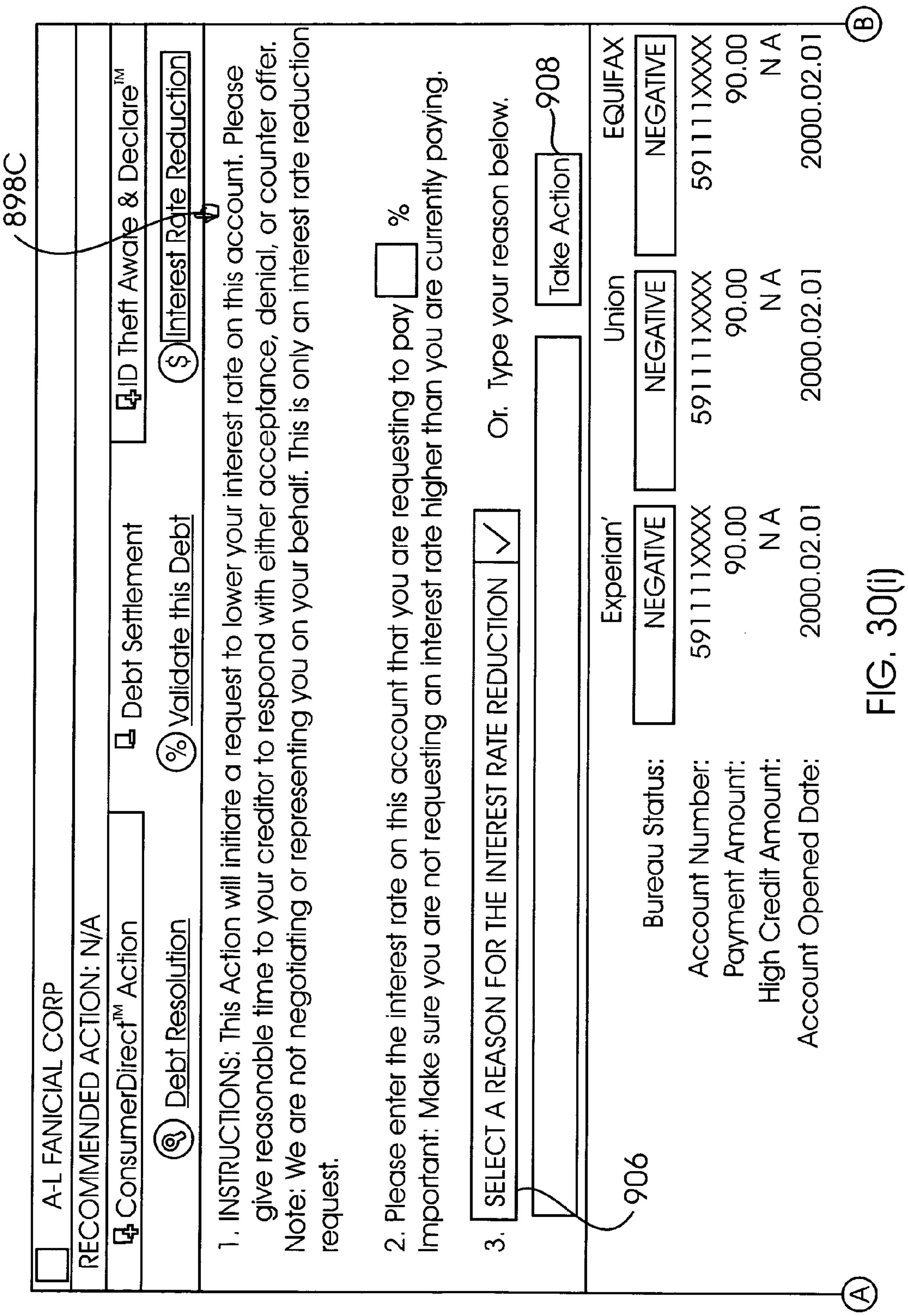

| | | | |
|---|---|---|---|
| Unpaid Balance: | 90.00 | 90.00 | 90.00 |
| Current rating: | Open | Open | Open |
| Late 30 Days: | 0 | 0 | 0 |
| Late 60 Days: | 0 | 0 | 0 |
| Late 90 Days: | 0 | 0 | 0 |
| Creditor Comments: | AMOUNT IS CHARGE OFF AMOUNTUNPAID BALANCE REPORTED AS A LOSS BY CREDIT GRANTORAUTO LOAN | AMOUNT IS CHARGE OFF AMOUNTUNPAID BALANCE REPORTED AS A LOSS BY CREDIT GRANTORAUTO LOAN | AMOUNT IS CHARGE OFF AMOUNTUNPAID BALANCE REPORTED AS A LOSS BY CREDIT GRANTORAUTO LOAN |

| |
|---|
| 30(i) |
| 30(ii) |

| A-L FINANCIAL CORP | | | |
|---|---|---|---|
| RECOMMENDED ACTION: N/A | | | |
| ☐ ConsumerDirect™ Action | ⊕ Debt Settlement | ☐ ID Theft Aware & Declare™ ~912 | |
| ⓢ Declare Not Mine | | ⓠ Validate | |
| ⤴ 894 | | | |

| | Experian' | Union | EQUIFAX |
|---|---|---|---|
| Bureau Status: | NEGATIVE | NEGATIVE | NEGATIVE |
| Account Number: | 591111XXXX | 591111XXXX | 591111XXXX |
| Payment Amount: | 90.00 | 90.00 | 90.00 |
| High Credit Amount: | N A | N A | N A |
| Account Opened Date: | 2000.02.01 | 2000.02.01 | 2000.02.01 |
| Unpaid Balance: | 90.00 | 90.00 | 90.00 |
| Current rating: | Open | Open | Open |
| Late 30 Days: | 0 | 0 | 0 |
| Late 60 Days: | 0 | 0 | 0 |
| Late 90 Days: | 0 | 0 | 0 |
| Creditor Comments: | AMOUNT IS CHARGE OFF AMOUNTUNPAID BALANCE REPORTED AS A LOSS BY CREDIT GRANTORAUTO LOAN | AMOUNT IS CHARGE OFF AMOUNTUNPAID BALANCE REPORTED AS A LOSS BY CREDIT GRANTORAUTO LOAN | AMOUNT IS CHARGE OFF AMOUNTUNPAID BALANCE REPORTED AS A LOSS BY CREDIT GRANTORAUTO LOAN |

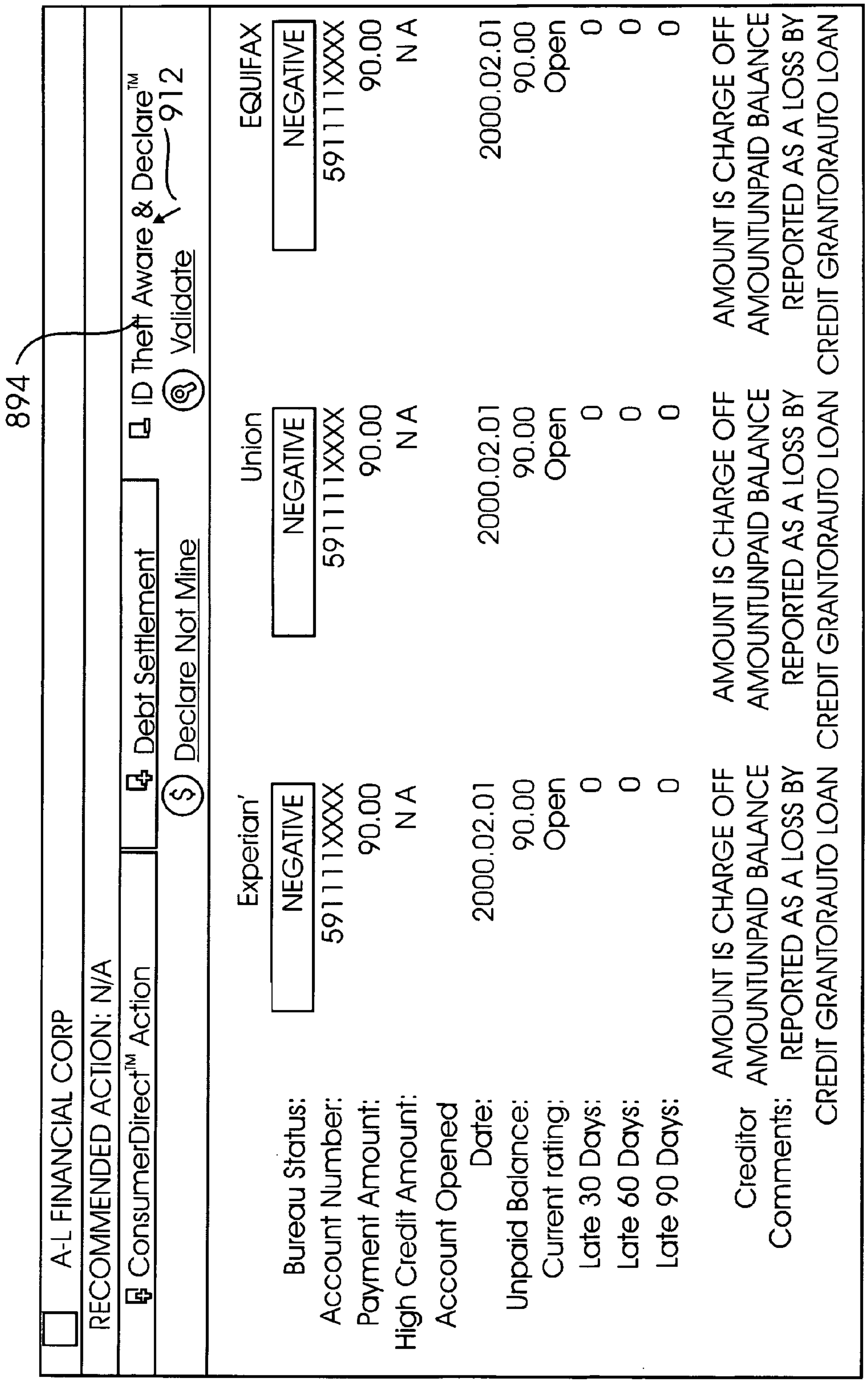

FIG. 32

| ☐ A-L FANICIAL CORP | | |
|---|---|---|
| RECOMMENDED ACTION: N/A | | |
| 🖳 ConsumerDirect™ Action | 🗘 Debt Settlement | 🗒 ID Theft Aware & Declare™ |
| | ⓢ Declare Not Mine ~914 | ⓐ Validate |

1. INSTRUCTION: This will initiate a Dispute Action directly with the furnisher/creditor that this not your account and is being recorded incorrectly. This action will request that this item be removed from your credit reports. Note: This is not a declaration of identity theft and may be a simple mistake by the furnisher/creditor of this information on your credit report

[ Take Action ]

| | Experian' | Union | EQUIFAX |
|---|---|---|---|
| Bureau Status: | NEGATIVE | NEGATIVE | NEGATIVE |
| Account Number4: | 591111XXXX | 591111XXXX | 591111XXXX |
| Payment Amount: | 90.00 | 90.00 | 90.00 |
| High Credit Amount: | N A | N A | N A |
| Account Opened Date: | 2000.02.01 | 2000.02.01 | 2000.02.01 |
| Unpaid Balance: | 90.00 | 90.00 | 90.00 |
| Current rating: | Open | Open | Open |
| Late 30 Days: | 0 | 0 | 0 |
| Late 60 Days: | 0 | 0 | 0 |
| Late 90 Days: | 0 | 0 | 0 |
| Creditor Comments: | AMOUNT IS CHARGE OFF AMOUNT UNPAID BALANCE REPORTED AS A LOSS BY CREDIT GRANTOR AUTO LOAN | AMOUNT IS CHARGE OFF AMOUNT UNPAID BALANCE REPORTED AS A LOSS BY CREDIT GRANTOR AUTO LOAN | AMOUNT IS CHARGE OFF AMOUNT UNPAID BALANCE REPORTED AS A LOSS BY CREDIT GRANTOR AUTO LOAN |

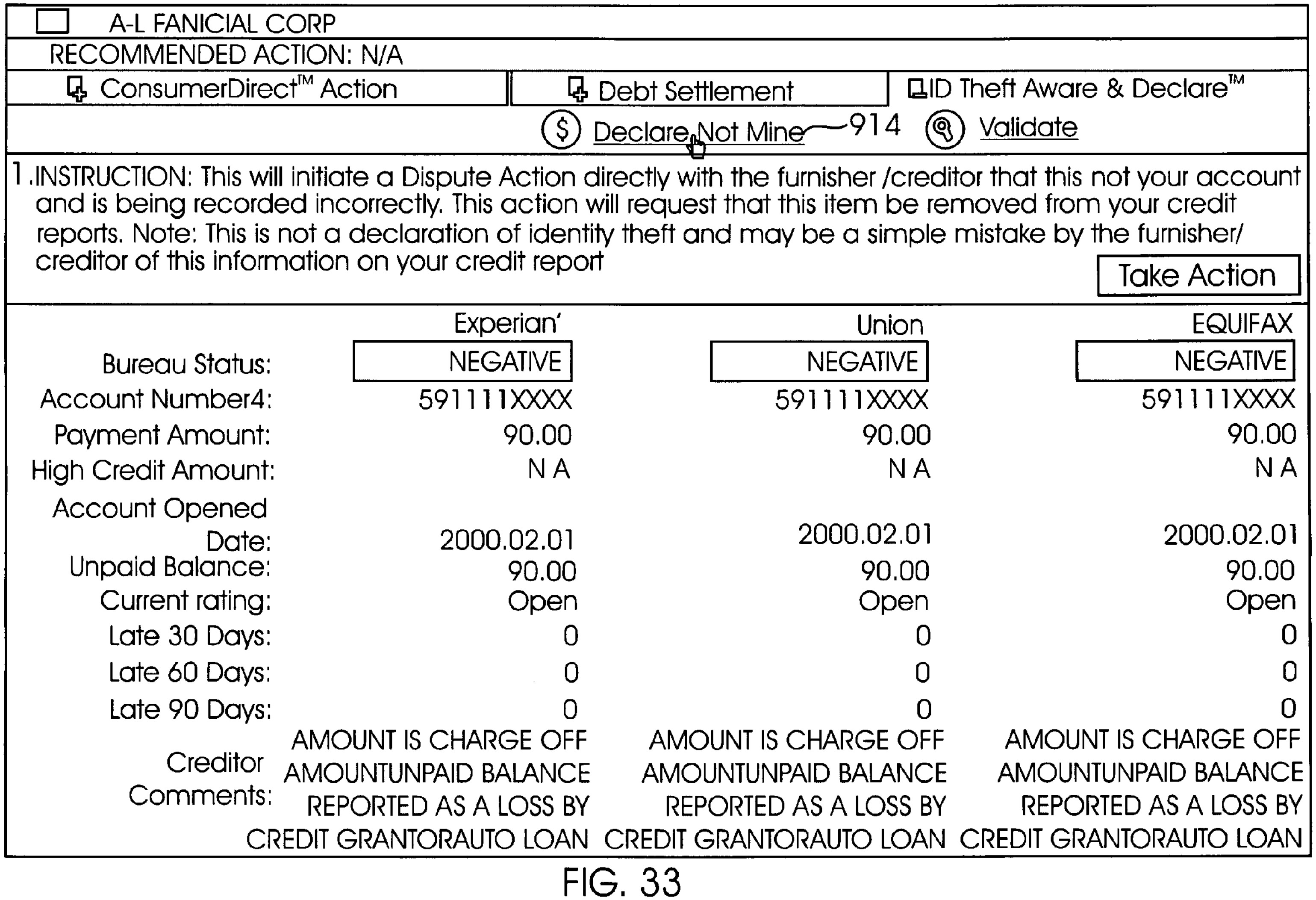

FIG. 33

☐ A-L FANICIAL CORP

RECOMMENDED ACTION: N/A

| ⚕ ConsumerDirect™ Action | ⊕ Debt Settlement | ☐ ID Theft Aware & Declare™ — 916 |
|---|---|---|
| | ⓢ Declare Not Mine | ⓠ Validate |

| | Experian' | Union | EQUIFAX |
|---|---|---|---|
| Bureau Status: | NEGATIVE | NEGATIVE | NEGATIVE |
| Account Number4: | 591111XXXX | 591111XXXX | 591111XXXX |
| Payment Amount: | 90.00 | 90.00 | 90.00 |
| High Credit Amount: | N A | N A | N A |
| Account Opened Date: | 2000.02.01 | 2000.02.01 | 2000.02.01 |
| Unpaid Balance: | 90.00 | 90.00 | 90.00 |
| Current rating: | Open | Open | Open |
| Late 30 Days: | 0 | 0 | 0 |
| Late 60 Days: | 0 | 0 | 0 |
| Late 90 Days: | 0 | 0 | 0 |
| Creditor Comments: | AMOUNT IS CHARGE OFF AMOUNTUNPAID BALANCE REPORTED AS A LOSS BY CREDIT GRANTORAUTO LOAN | AMOUNT IS CHARGE OFF AMOUNTUNPAID BALANCE REPORTED AS A LOSS BY CREDIT GRANTORAUTO LOAN | AMOUNT IS CHARGE OFF AMOUNTUNPAID BALANCE REPORTED AS A LOSS BY CREDIT GRANTORAUTO LOAN |

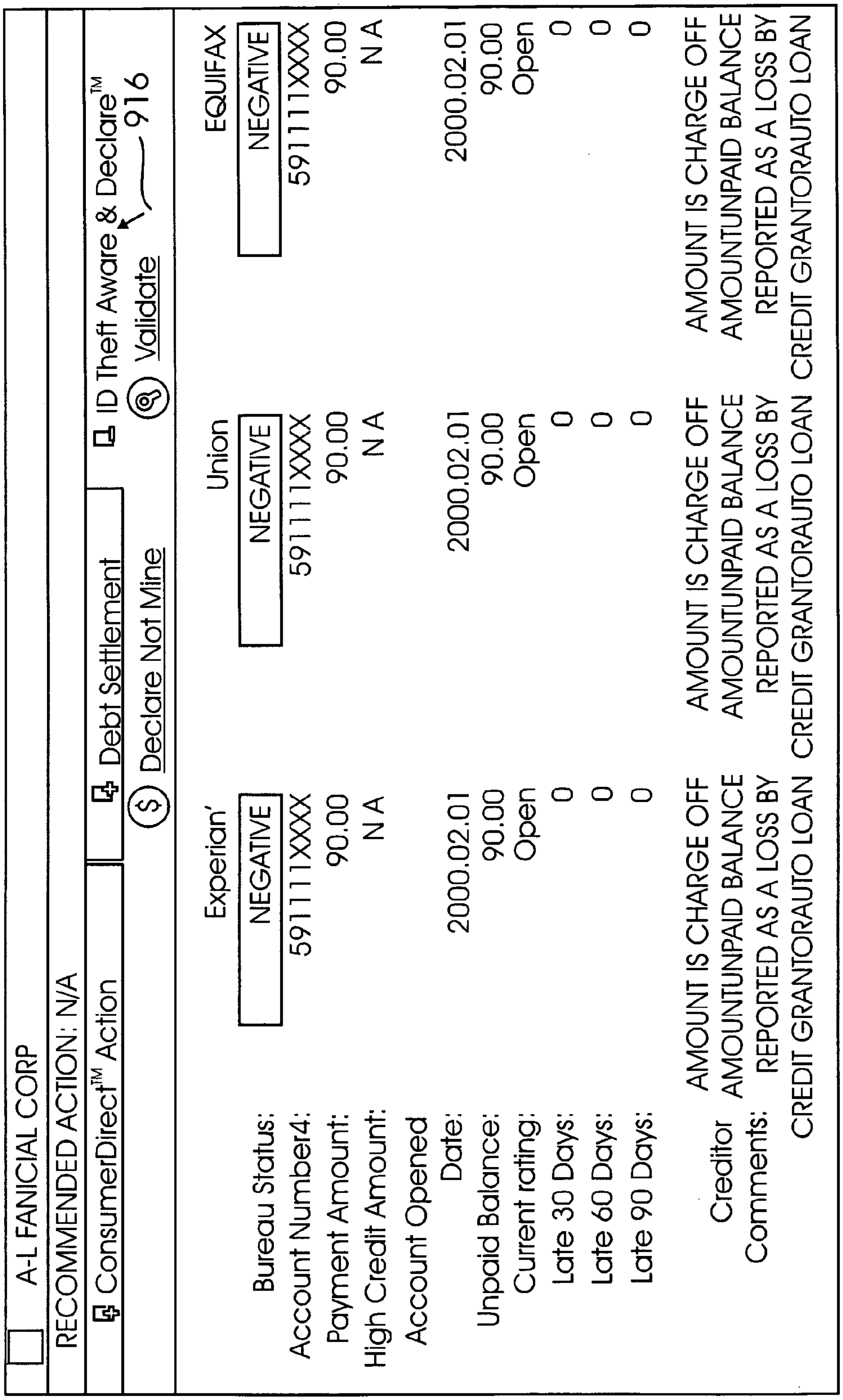

FIG. 34

1ST NATL BANK/FNB BRKN- LAST Action Taken:07/28/2005

RECOMMENDED ACTION:Debt settlement: Debt Reduction

PLEASE CONFIRM YOUR REQUESTED ACTION

FREE MONTHLY actions: 5     Action During last period : (2)
FREE ACTIONS available: 3     Cost for additional actions: $3.05

LEGAL NOTICE: By hitting submit, you are solely responsible for the action you have specified. You understand there are no guarantees of result and our company is not responsible or liable in any way for the actions you have specified. Further, you understand that any action you take is not considered credit repair or debt negotiation and we are not advising or negotiating on your behalf. There is no information sent to any credit bureau. Instead, our new technology is directed to the furnisher/ creditor of information on your credit report. Our company and By submitting you are hereby agreeing to the terms and conditions of this action and your membership. If you have exceeded the number of FREE actions available to you for your membership, you will be charged as shown above in "Cost of additional action:", which is according to your plan, after your midnight PST cancellation has expired.

Cancel     I Agree — 918

| | | | |
|---|---|---|---|
| High Credit Amount: | NA | NA | XXXX |
| Account Opened Date: | 2000.02.01 | 2000.02.01 | 2000.02.01 |
| Unpaid Balance: | 90.00 | 90.00 | 90.00 |
| Current rating: | Open | Open | Open |
| Late 30 Days: | 0 | 0 | 0 |
| Late 60 Days: | 0 | 0 | 0 |
| Late 90 Days: | 0 | 0 | 0 |

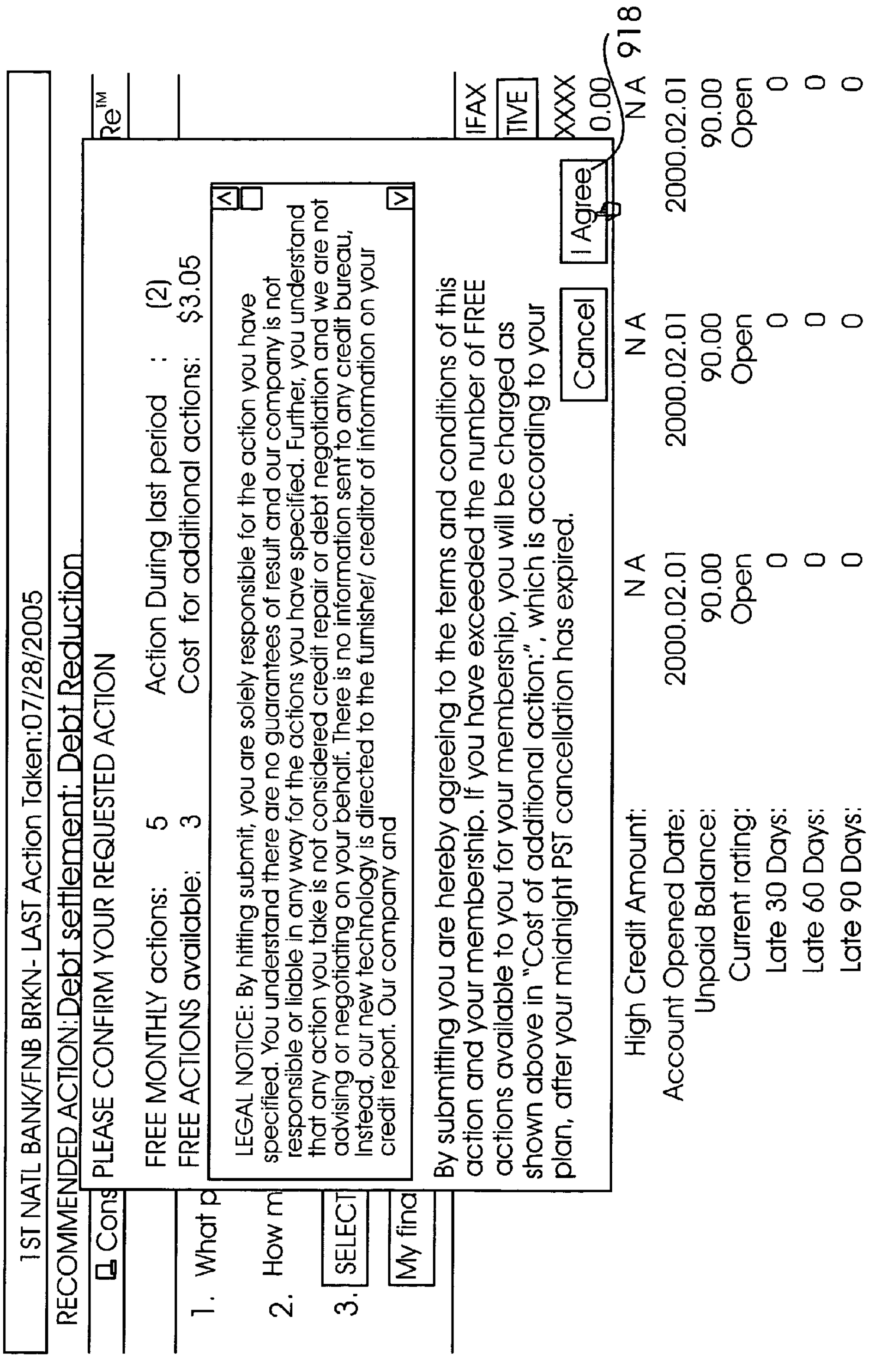

FIG. 35

| A-L FINANCIAL CORP | | | |
|---|---|---|---|
| RECOMMENDED ACTION: N/A | | | |
| ☐ ConsumerDirect™ Action | ☐ Debt Settlement | | ☐ ID Theft Aware & Declare™ |
| ⓢ ConsumerDirect™ Dispute | ⓔ ConsumerDirect™ Verification | | |

922

1. INSTRUCTION: select or type in your Dispute reasoon                . This will initiate a Dispute Action directly with the furnisher/ creditor i.e. Never late .. Account is closed 3. SELECT A DISPUTE REASON  [ ✓ ]  .. Type your reason below

922A

[                    ] Take Action — 922B

| | Experian' | Union | EQUIFAX |
|---|---|---|---|
| Bureau Status: | NEGATIVE | NEGATIVE | NEGATIVE |
| Account Number4: | 591111XXXX | 591111XXXX | 591111XXXX |
| Payment Amount: | 90.00 | 90.00 | 90.00 |
| High Credit Amount: | N A | N A | N A |
| Account Opened Date: | 2000.02.01 | 2000.02.01 | 2000.02.01 |
| Unpaid Balance: | 90.00 | 90.00 | 90.00 |
| Current rating: | Open | Open | Open |
| Late 30 Days: | 0 | 0 | 0 |
| Late 60 Days: | 0 | 0 | 0 |
| Late 90 Days: | 0 | 0 | 0 |

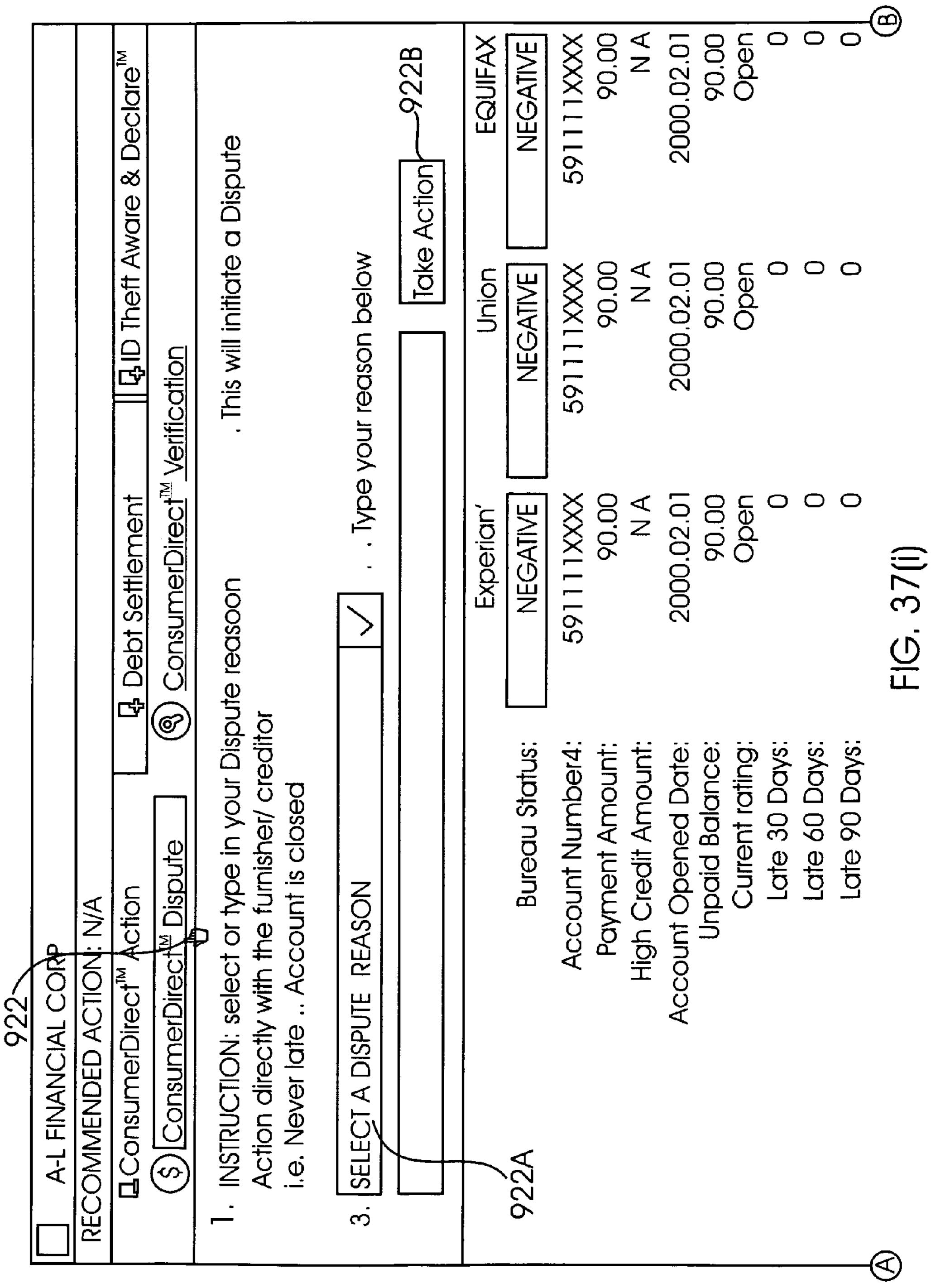

Figures 37, 37II:
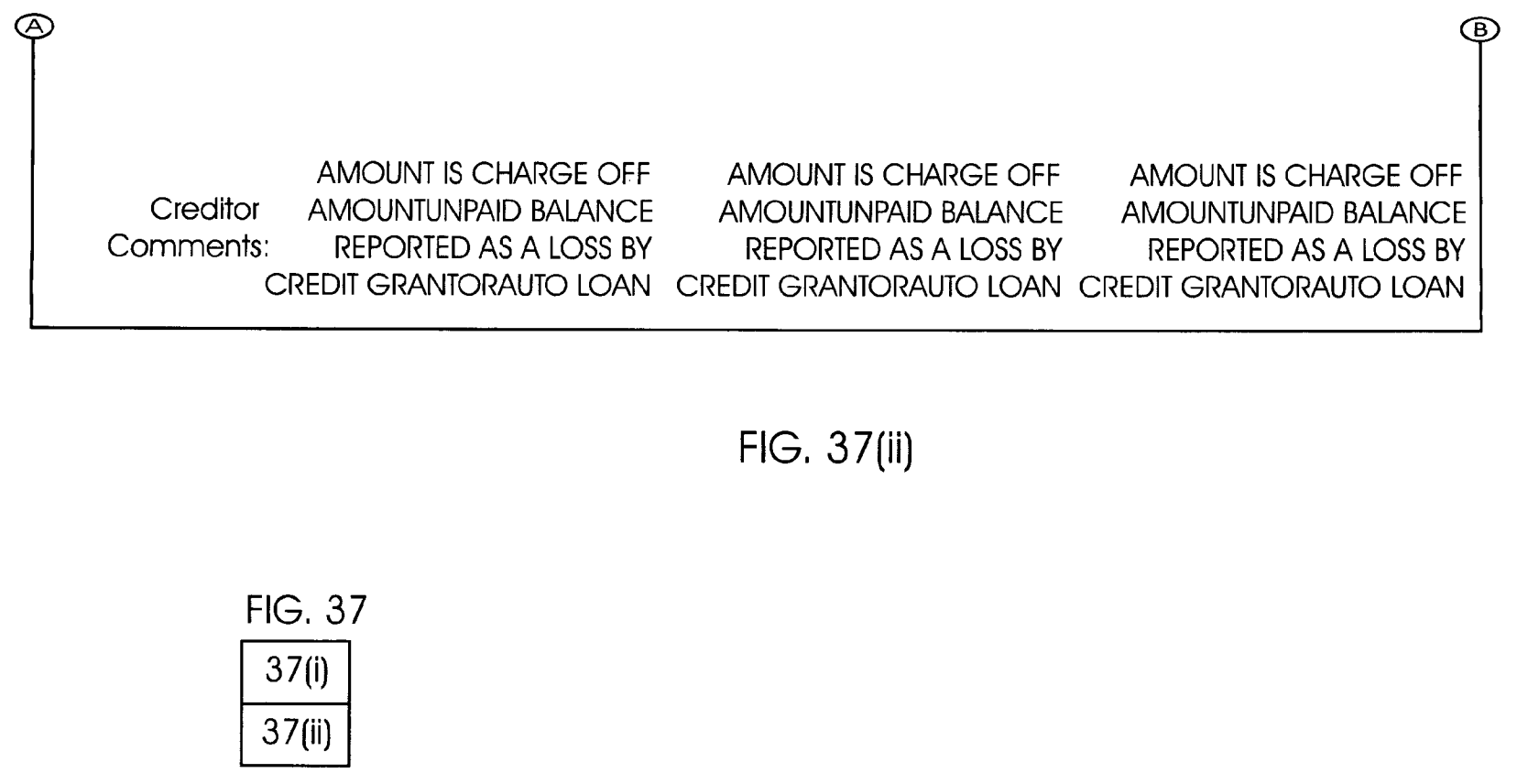

| | | | |
|---|---|---|---|
| Creditor Comments: | AMOUNT IS CHARGE OFF AMOUNTUNPAID BALANCE REPORTED AS A LOSS BY CREDIT GRANTORAUTO LOAN | AMOUNT IS CHARGE OFF AMOUNTUNPAID BALANCE REPORTED AS A LOSS BY CREDIT GRANTORAUTO LOAN | AMOUNT IS CHARGE OFF AMOUNTUNPAID BALANCE REPORTED AS A LOSS BY CREDIT GRANTORAUTO LOAN |

| |
|---|
| 37(i) |
| 37(ii) |

| A-L FINANCIAL CORP | | | |
|---|---|---|---|
| RECOMMENDED ACTION: N/A | | | |
| ☐ ConsumerDirect™ Action | ☐ Debt Settlement | ☐ ID Theft Aware & Declare™ | |
| ⓢ ConsumerDirect™ Dispute | ⊙ ConsumerDirect™ Verification ⟶ 924 | Take Action | |

1. INSTRUCTION: This Action will initiate a verification of your account directly with the furnisher/creditor

| | Experian | Union | EQUIFAX |
|---|---|---|---|
| Bureau Status: | NEGATIVE | NEGATIVE | NEGATIVE |
| Account Number4: | 591111XXXX | 591111XXXX | 591111XXXX |
| Payment Amount: | 90.00 | 90.00 | 90.00 |
| High Credit Amount: | N A | N A | N A |
| Account Opened Date: | 2000.02.01 | 2000.02.01 | 2000.02.01 |
| Unpaid Balance: | 90.00 | 90.00 | 90.00 |
| Current rating: | Open | Open | Open |
| Late 30 Days: | 0 | 0 | 0 |
| Late 60 Days: | 0 | 0 | 0 |
| Late 90 Days: | 0 | 0 | 0 |
| Creditor Comments: | AMOUNT IS CHARGE OFF AMOUNT UNPAID BALANCE REPORTED AS A LOSS BY CREDIT GRANTOR AUTO LOAN | AMOUNT IS CHARGE OFF AMOUNT UNPAID BALANCE REPORTED AS A LOSS BY CREDIT GRANTOR AUTO LOAN | AMOUNT IS CHARGE OFF AMOUNT UNPAID BALANCE REPORTED AS A LOSS BY CREDIT GRANTOR AUTO LOAN |

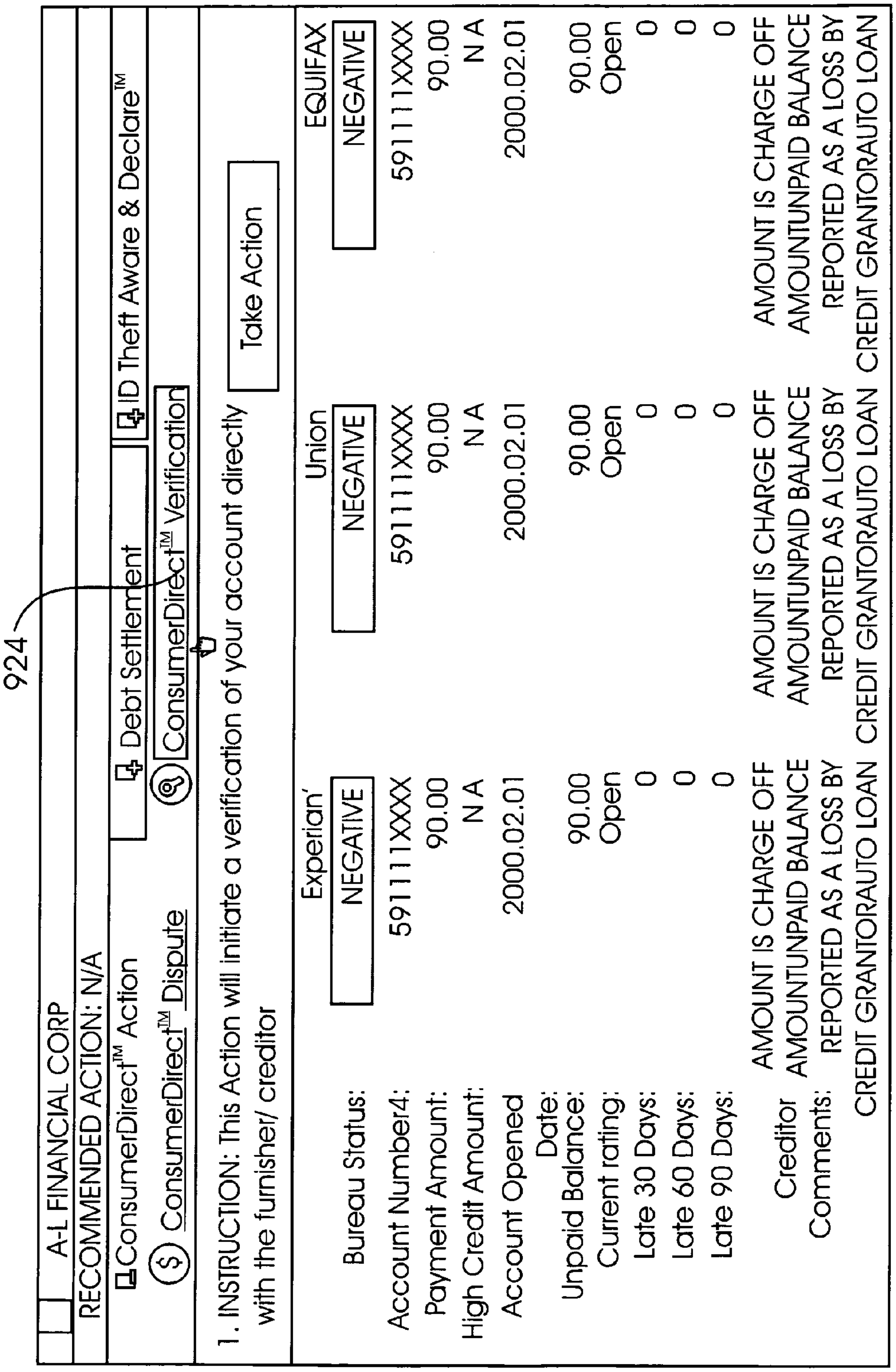

FIG. 38

SYSTEM AND METHOD FOR MANAGING CONSUMER INFORMATION

CROSS-REFERENCE TO RELATED APPLICATIONS

This application claims the benefit, under 35 U.S.C. §119 (e), of U.S. Provisional Patent Application No. 60/636,715, filed on Dec. 16, 2004, the disclosure of which is incorporated herein in its entirety.

This application is also related to the following applications, filed on even date herewith, the disclosures of the applications are incorporated herein in their entirety:

(a) Ser. No. 11/304,782, entitled "SYSTEM AND METHOD FOR MANAGING CONSUMER INFORMATION" with David B. Coulter, as the inventor;

(b) Ser. No. 11/304,835, entitled "SYSTEM AND METHOD FOR MANAGING CONSUMER INFORMATION" with David a Coulter, as the inventor; and (c) Ser. No. 11/304,249, entitled. "SYSTEM AND METHOD FOR MANAGING CONSUMER INFORMATION" with David B. Coulter, as the inventor.

BACKGROUND OF THE INVENTION

1. Field of the Invention

The present invention relates to systems and methods for information analysis, and more particularly to a system for online consumer credit reporting information analysis and distribution.

2. Background

Data accuracy is dependent upon the accuracy of data sources. Inaccurate consumer financial data has become an enormous problem for consumers, industry, and government. For consumers, inaccurate data, data theft, and other data abuse misrepresent a consumer's identity. Correcting inaccurate data and recovering from data abuse entails a tremendous amount of effort.

Three major credit reporting bureaus, namely, TransUnion™, Experian™, and Equifax™ maintain and report credit information for consumers. The credit reporting industry seeks to report as much credit information as possible to subscribers, which can be financial institutions, employers, landlords, retail environments, government entities, and any other entities authorized to purchase credit data access from credit reporting bureaus.

Major problems exist with the information maintained by credit reporting bureaus. The sources of creditor information are not entirely reliable, there may be countless differences in a consumer's specific data that could be erroneous, and the vast amount of information received by the credit reporting bureaus makes detecting, verifying, and correcting errors to be an enormous task. Indeed, the most cost-effective way for a credit reporting bureau to handle errors is to rely on the consumer to detect, verify, and seek correction of errors.

Currently there exist over 2.36 billion errors on credit reports for approximately 133 million credit report holders in the U.S. Additionally, there are 27,123 identity thefts daily, amounting to over 9.9 million victims per year in the U.S. An estimated twenty-nine percent (29%) of credit reports are believed to contain serious errors, such as false delinquencies or accounts that do not belong to the consumer. Such errors could result in creditors denying credit to a consumer. If credit is approved despite such credit report errors, a creditor is likely to charge a consumer a higher rate of interest than the rate of interest available if the consumer's credit report lacked erroneous information.

Around forty-one percent (41%) of credit reports are believed to contain personal demographic identifying information that is misspelled, outdated, belonging to a different person, or otherwise incorrect. Approximately twenty-six percent (26%) of credit reports are believed to list credit accounts that have been closed by the consumer but incorrectly remain listed as open accounts.

Besides erroneous reporting of negative information, errors are also made by omission of positive information. Approximately twenty percent (20%) of credit reports are believed to be missing major credit, loan, mortgage, or other consumer accounts that would demonstrate creditworthiness of a consumer.

To attempt to correct reporting errors, the credit repair industry offers a manual system for correcting data that is reported by credit reporting bureaus. The credit repair industry operates as follows: consumers are charged large up-front fees along with monthly recurring fees; credit repairs starts by mailing requests for hard copies of the consumer's credit reports; the consumer waits for the return mail delivery of these hard copies of the credit reports to the credit repair company; the credit repair company begins to manually process any disputes and claims without receiving directions from the consumer; finally, disputes and claims are mailed by the credit repair company to the credit reporting bureaus for processing.

Credit reporting bureaus allow for manual entering of any statements, regarding credit items, which the consumer believes are in error. Such statements are reported in the credit reports available online through the credit reporting bureaus' systems. However, the process available directly from the credit reporting bureaus is a lengthy process. For example, a credit reporting bureau's online system requires that the consumer provide identifying information and contact information (such as address, telephone number, social security number, birth date, and the like) each time entering a statement. This conventional process is even more burdensome in that such identifying information and contact information must be separately provided for each credit reporting bureau system. Consequently, a need exists for a method to enable consumers to provide information in a more uniform manner.

Credit scores are often calculated using predictive modeling. Sometimes called "credit risk scores", the credit scores are used as predictive tools to assess consumer credit and bankruptcy risk in order for credit grantors to make profitable decisions in granting credit such as, customer acquisition (prescreening and marketing), credit origination and underwriting, and customer management.

To predict credit risk, credit grantors often use a credit score. Such credit scores are widely used by credit grantors in the United States, the United Kingdom, Canada, and South Africa. Credit grantors in any country that has credit reporting bureau data are increasingly using credit scores.

Besides credit risk scores, other scores used include revenue and attrition scores, application fraud scores, credit-based insurance scores, small business risk scores, collections and recovery scores, and marketing scores.

The leading producer for credit scores and models for predicting consumer behavior is the Fair Isaac Credit Organization. The firm's FICO™ score is the most widely used credit score in the credit reporting industry. The FICO™ score (a number between 300 and 850) is calculated with a proprietary model. The proprietary model evaluates the information in a consumer's credit report and compares the information with millions of other credit reports. The higher the score, the more likely a consumer is to be approved for the granting of credit and to receive favorable interest rates.

While one is not able to identically duplicate the calculation of a FICO™ score, one may generally predict qualitative results from negative aspects of a consumer's credit data (such as late payments, bankruptcies, and court judgments) and from positive aspects of a consumer's credit data (such as low debt-to-income ratio, no late payments, and a lengthy, successful credit history).

Currently, no solution exists for providing a tool or calculator that takes data, categorizes the data, displays the data with categories, and calculates related interest rates and payment schedules. Additionally, no solution exists that may simultaneously display any combination of a current credit score, an estimated credit score, and a scalable predicted future credit score.

Identity theft is the fastest growing and number one reported crime in the United States today. Generally, a victim of identity theft has few effective options to correct the situation. Understanding what needs to be done and scheduling time to correct the situation can be overwhelming to most consumers. A consumer generally becomes a victim of identity theft because the consumer's personal information is not properly protected by current creditors, past creditors, past potential creditors, credit reporting bureaus, financial institutions, retail environments, government entities, and any other entities likely to possess personal information.

No identity theft protection industry exists, except for credit report monitoring services, which simply provide a consumer a periodic copy of a credit report. There is no automated solution to address the problem or a method of informing the appropriate authorities for assistance.

Therefore, what is desired is a system and method for correcting credit reporting errors (such as inaccurate, outdated, or unverifiable information), protect against identity theft, and predict future credit scores.

SUMMARY OF THE INVENTION

In one aspect of the present invention, a method for management of consumer credit report data is provided. The method includes, offering a service to a user; requesting an action for the service; providing a service action guide; and initiating an action of credit correction and/or debt relief and/or identity protection.

In another aspect of the present invention, a system for management of consumer credit report data is provided. The system includes, a central processing unit using a system provider for offering a service to a user; a user interface for requesting an action for the service and providing a service action guide; and a processing module to process requesting an action for the service between the user interface and a communication module.

In another aspect of the present invention, a method for online credit report data analysis and management is provided. The method includes, providing credit reporting information and services to a user through a system provider; interacting with credit reporting bureaus; obtaining consumer credit data from the credit reporting bureaus; authorizing third party access to the consumer credit data; allowing a credit grantor to submit current credit qualifications to the system provider; verifying whether the current credit qualifications match with the user; and preventing the credit grantor from knowing the identity of any user that matches the current credit qualifications.

In yet another aspect of the present invention, a method for managing credit report data is provided. The method includes, obtaining credit report data, belonging to a user, from a credit reporting bureau; providing suggestions to the user, based upon the user's credit report data and an instruction from the user; viewing credit report data with suggestions for action; and taking action based upon the user's instructions.

In another aspect of the present invention, a method of processing an action is provided. The method includes, gathering consumer credit and non-credit data ("data") and storing the data in a consumer database; submitting an action for processing to a creditor or a credit report provider; monitoring if the action is accepted; monitoring credit bureaus if the action if accepted; updating the consumer database; and notifying consumer if action was accepted or rejected.

In another aspect of the present invention, a method of processing an independent user action is provided. The method includes, determining if a creditor is located in a consumer database; entering the creditor into the customer database if the creditor is not in the consumer database, wherein the creditor includes a credit data provider; verifying the consumer's personal information with information stored in the consumer database; entering the independent user action into the consumer database; determining if the independent user action is frivolous; determining the validity of the independent user action; and processing the independent user action if the consumer's information is in the consumer database, the action is not frivolous and the action is valid.

In another aspect of the present invention, a method for processing a potential error or resolving a potential issue based on information relating to a consumer's credit including a third-party reported transaction is provided. The method includes triggering an event relating to the potential error and/or the potential issue based on said consumer's credit information; determining if potential error is deemed likely or not to be an actual error, or said potential issue is deemed likely or not to be a resolvable issue by accessing one or more data sets; obtaining more information from said consumer; obtaining information from one or more creditors; and/or obtaining information from one or more credit bureaus; and if the potential error is deemed likely to be an actual error, communicating, or assisting said consumer to communicate, with one or more creditors and/or one or more credit bureaus with information to investigate and correct said potential error; and if the potential issue is deemed likely to be a resolvable issue, communicating, or assisting said consumer to communicate, with one or more creditors and/or one or more credit bureaus with information to resolve said issue.

In one aspect of the present invention, a method of recommending an action to a consumer is provided. The method includes, applying selection criteria to credit data to determine recommended actions for the consumer; determining if any of the recommended actions are frivolous; determining if any of the recommended actions are valid; and comparing the recommended actions to pre-set parameters set by the consumer to determine if the consumer should be notified of any of the recommended actions, if at least one recommended action is non-frivolous and valid.

In another aspect of the present invention, a method for sending user action requests to a database is provided. The method includes processing user action requests, received from a user, in a batch; sending the user action requests from a system provider to a database;

sending an indication of results or a notice of a lack of results to the user; sending a notice to the system provider whether the database has changed or deleted the disputed credit report entry or whether the database has not acted in response to the user action requests; and sending a results notice to the user detailing whether the database has changed or deleted the disputed credit report entry or whether the database has not acted in response to the user action requests.

In another aspect of the present invention, a system for sending user action requests to a database is provided. The system includes a processing module for processing user action requests, received from a user, in a batch; and a communications module for sending the user action requests from a system provider to a database; wherein the communications module sends an indication of results or a notice of a lack of results to the user.

In another aspect of the present invention, a method for suggesting a data change after data analysis is provided. The method includes retrieving database information from a database; segregating the database information into categories; authorizing access to the database information; alerting a user of any discrepancy in the database information; and making a suggestion for a data change.

In one aspect of the present invention, a method for determining if an action is frivolous is provided. The method includes sending the action through one or more filters; applying rules for the filters to the action restricting possible actions of the consumer; wherein if an action is determined to be frivolous, then after suggesting alternative actions and receiving additional information from a consumer, resubmitting the action to one or more filters and if the action passes then the action is deemed non-frivolous.

In another aspect of the present invention, a method of repairing credit of a consumer is provided. The method includes requesting an action to be performed on a credit report; verifying whether the action to be performed is valid; determining if the action should be granted; updating the credit report if the action is valid and granted; and notifying the consumer whether the action has been granted.

In another a method for determining if an action is valid is provided. The method includes, presenting an action to an interface which sends the action to at least one database; comparing the action with rules of the at least one database to determine a result and validating a pending action; and sending the result to a distribution engine.

In one aspect of the present invention, a method of analyzing a consumer's credit is provided. The method includes, answering questions about the consumer's credit; analyzing the answers to determine credit data about the consumer; storing the credit data in a leads database; storing the credit data in a credit analysis database; displaying the credit data to the consumer; inquiring into whether the consumer wants to register for managing credit online; and registering the consumer or sending the credit data to a marketing analysis engine to categorize the credit data for future marketing to the consumer.

In another aspect of the present invention, a method for matching financial providers with a consumer is provided. The method includes retrieving consumer credit data; calculating basic assumptions based upon the credit data; displaying the basic assumptions on a credit scoring meter; and matching the consumer with potential financial providers.

In another aspect of the present invention, a method for providing credit credentials for authorized distribution of consumer credit report data is provided. The method includes obtaining consumer credit report data, belonging to a user, from a credit reporting bureau; identifying an authorized person for receiving consumer credit report data viewing privileges; sending a notice to the authorized person with an automatic expiration of the consumer credit report data viewing privileges; displaying the consumer credit report data, belonging to the user, to the authorized person; and recording details of authorized person's viewing of the consumer credit report data, including information on which portions of the consumer credit report data was viewed by the authorized person.

In another aspect of the present invention, a method for simulating a credit score is provided. The method includes, entering user data; accessing a credit score meter; segregating credit data items into categories; calculating a current credit score; calculating payment amounts for each of the categories; and re-calculating the credit score whenever interest rates, payment amounts, or other data are adjusted.

In yet another aspect of the present invention, a system for simulating a credit score is provided. The system includes a user interface for entering user data;

a credit score meter for accessing a credit score; and a processing module for segregating credit data items into categories; wherein the processing module calculates a credit score; an interest rate for each of the categories; and payment amounts for each of the categories.

In another aspect of the present invention, a method for predicting a future credit score is provided. The method includes entering user data; accessing a credit score meter; segregating credit data items into categories; calculating a future credit score; calculating an interest rate for each of the categories; calculating payment amounts for each of the categories; and re-calculating the future credit score whenever interest rates, payment amounts, or other data are adjusted.

In yet another aspect, a method for determining a credit score is provided. The method includes entering user data; accessing a credit score meter; segregating credit data items into categories; calculating a credit score; adjusting the user data; re-calculating the credit score; and re-adjusting the user data.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures:

FIGS. 7-8 show screen shots of a service action guide, according to one aspect of the present invention;

FIG. 9 shows a screen shot for selecting a credit reporting action, according to another embodiment of the present invention;

FIG. 10A shows a screen shot for a credit score meter, according to another embodiment of the present invention;

FIG. 11 (FIGS. 11(*i*)-(*iii*)) shows a screen shot of presented credit reporting bureau reports 120 and features for disputing erroneous and negative items, according to another embodiment of the present invention;

FIG. 12 (FIGS. 12(*i*)-(*iii*)) shows a screen shot of presented credit reporting bureau reports and features for disputing erroneous and negative items, according to yet another embodiment of the present invention;

FIG. 27 shows a screen shot where a user can select debt settlement, a direct action or declare identity theft after viewing the user credit report, according to one aspect of the present invention;

FIG. 28 shows a screen shot where a user has three choices after selecting the debt settlement option: debt resolution, "validate this debt" and interest rate reduction, according to one aspect of the present invention;

FIG. 29 shows a screen shot where the user validates a particular debt and system provider communicates with the creditor directly verifying that a particular debt is a valid debt, according to one aspect of the present invention;

FIG. 30 shows a screen shot that allows a user to request an interest reduction from a creditor, according to one aspect of the present invention;

FIG. 32 shows a screen shot that allows a user to review the user's credit report and declare identity theft, according to one aspect of the present invention;

FIG. 33 shows a screen shot that allows a user to declare that the item on the credit report does not belong to the user, according to one aspect of the present invention;

FIG. 34 shows a screen shot that allows a user to validate a request, according to one aspect of the present invention;

FIG. 35 shows a second confirmation screen that that allows the user to confirm all the entries whether disputed or validated, according to one aspect of the present invention;

FIG. 37 shows a screen shot where a user elects to dispute an entry directly with a creditor, according to one aspect of the present invention;

FIG. 38 shows a screen shot where a user can verify an entry by clicking on the verification option, according to one aspect of the present invention.

DETAILED DESCRIPTION OF THE PREFERRED EMBODIMENTS

The following detailed description is of the best currently contemplated modes of carrying out the invention. The description is not to be taken in a limiting sense, but is made merely for the purpose of illustrating the general principles of the invention, since the scope of the invention is best defined by the appended claims.

Computing System:

To facilitate an understanding of the preferred embodiment, the general architecture and operation of a computing system will initially be described. The specific architecture and operation of the preferred embodiment will then be described with reference to the general architecture.

Figure 1:
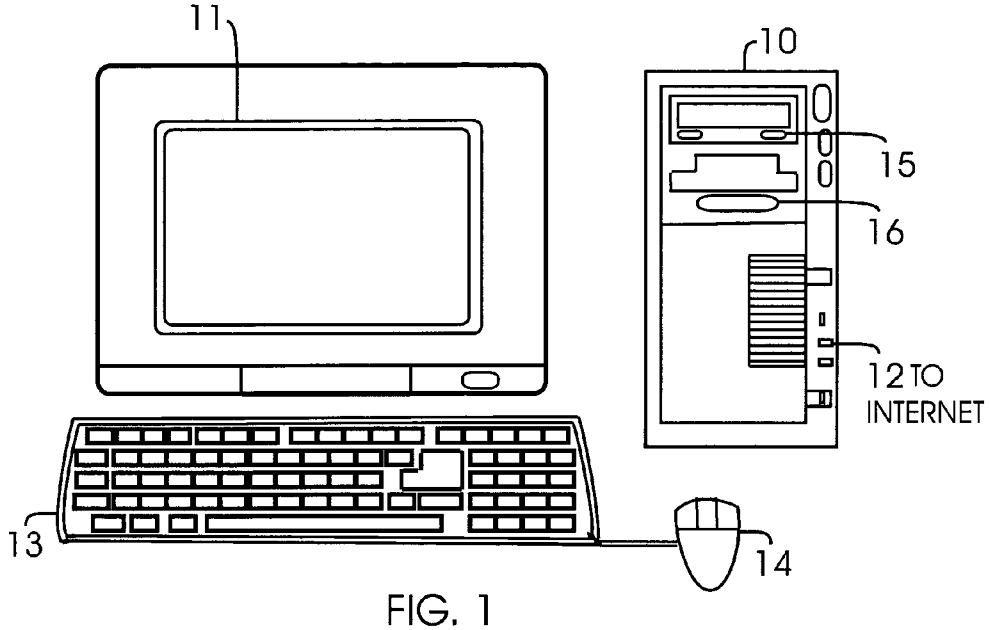
FIG. 1 is a block diagram of a computing system for executing computer executable process steps according to one embodiment of the present invention.

FIG. 1 is a block diagram of a computing system for executing computer executable process steps according to one embodiment of the present invention. FIG. 1 includes a host computer 10 and a monitor 11. Monitor 11 may be a CRT type, an LCD type, or any other type of color or monochrome display. Also provided with computer 10 is a keyboard 13 for entering text data and user commands, and a pointing device 14 (such as a mouse) for processing objects displayed on monitor 11.

Computer 10 may include a computer-readable memory medium such as a rotating disk 15 for storing readable data. Besides other programs, disk 15 can store application programs including web browsers by which computer 10 connects to the Internet and the systems described below, according to one aspect of the present invention.

Computer 10 can also access a computer-readable floppy disk storing data files, application program files, and computer executable process steps embodying the present invention or the like via a floppy disk drive 16. A CD-ROM interface (not shown) may also be provided with computer 10 to access application program files, audio files and data files stored on a CD-ROM.

A modem, an integrated services digital network (ISDN) connection, or the like may also provide computer 10 with an Internet connection 12 to the World Wide Web ("WWW"). An Internet connection 12 may allow the computer to download data files, audio files, application program files and computer-executable process steps embodying the present invention.

Figure 2:
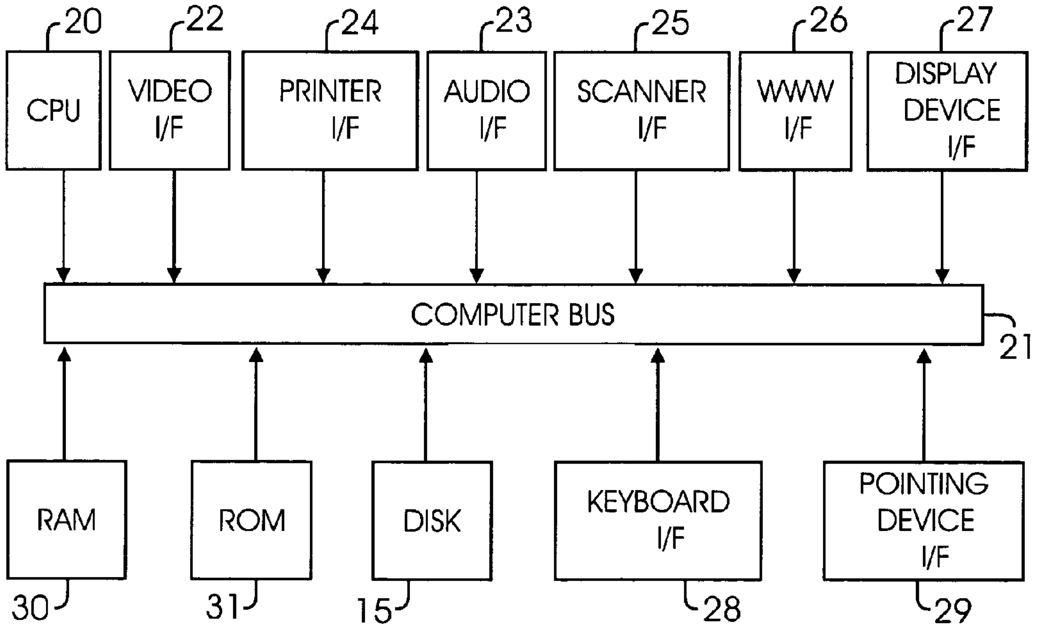
FIG. 2 is a block diagram showing the internal functional architecture of the computing system in FIG. 1.

FIG. 2 is a block diagram showing the internal functional architecture of computer 10. As shown in FIG. 2, computer 10 may include a central processing unit (CPU) 20 for executing computer-executable process steps and interfaces with a computer bus 21. Also shown in FIG. 2 are a WWW interface 26, a display device interface 27, a keyboard interface 28, a pointing device interface 29, an audio interface 23, a scanner interface 25, a printer interface 24, a video interface 22, and a rotating disk 15.

As described above, disk 15 may store operating system program files, application program files, web browsers, and other files. Some of these files may be stored on disk 15 using an installation program. For example, CPU 20 may execute computer-executable process steps of an installation program so that CPU 20 can properly execute the application program.

A random access main memory ("RAM") 30 may also interface to computer bus 21 to provide CPU 20 with access to memory storage. When executing stored computer-executable process steps from disk 15 (or other storage media such as floppy disk 16, shown in FIG. 1, or WWW connection 12, shown in FIG. 1), CPU 20 stores and executes the process steps out of RAM 30.

Read only memory ("ROM") 31 may be provided to store invariant instruction sequences such as start-up instruction sequences or basic input/output operating system (BIOS) sequences for operation of keyboard 13.

Figure 3:
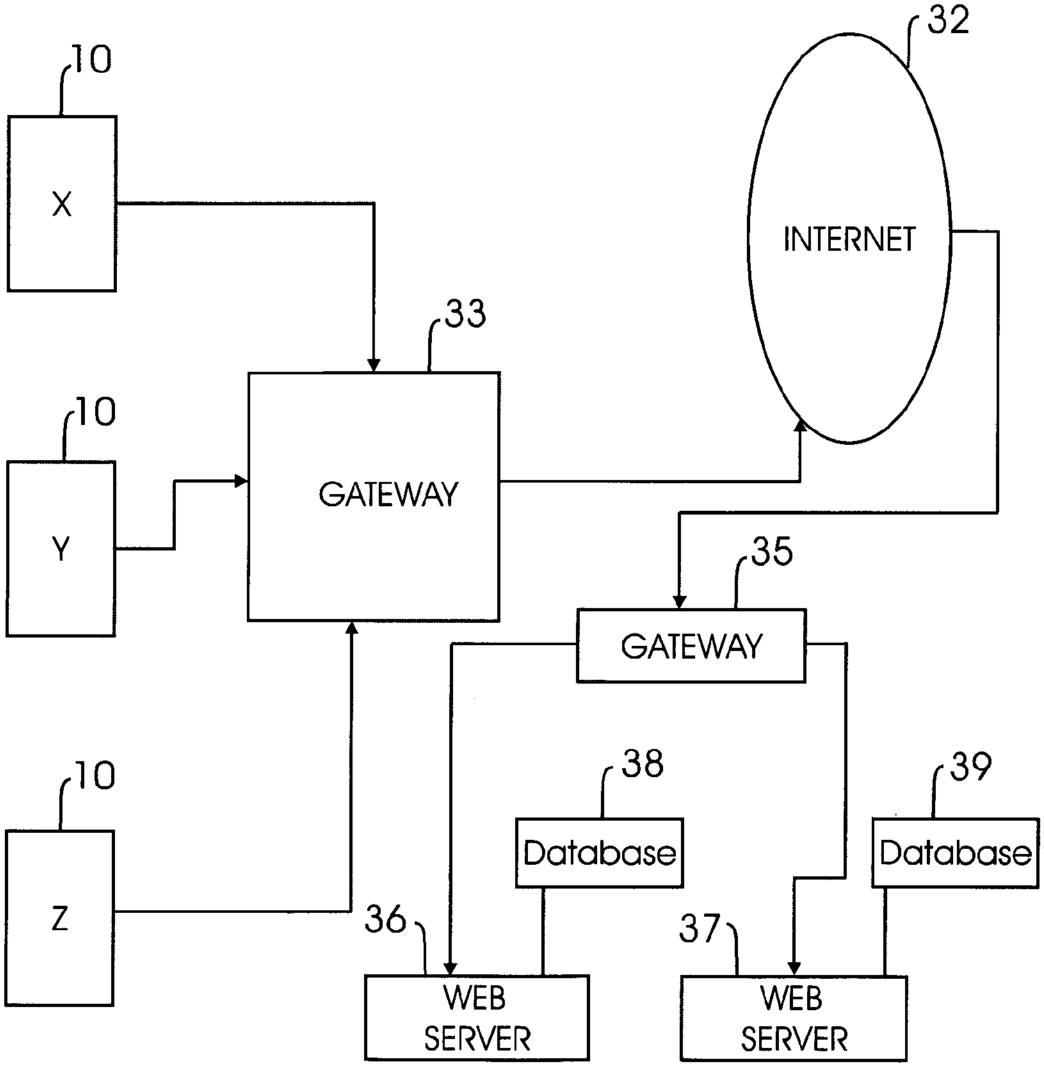
FIG. 3 is a block diagram of a typical topology of a computer network with computers, used according to one embodiment of the present invention.

FIG. 3 shows a typical topology of a computer network with computers similar to computer 10, connected to the Internet. For illustration purposes, three computers X, Y, and Z are shown connected to the Internet via Web interface 26 (shown in FIG. 2) through a gateway 33, where gateway 33 can interface N number of computers. Web interface 26 may be a modem, network interface card, or a unit for providing connectivity to other computer systems over a network using protocols such as X.25, Ethernet, or TCP/IP, or any device that allows, directly or indirectly, computer-to-computer communications.

It is noteworthy that the invention is not limited to a particular number of computers. Any number of computers that can be connected to the Internet 32 or any other computer network may be used.

FIG. 3 further shows a second gateway 35 that may connect a network of web servers 36 and 37 to the Internet 32. Web servers 36 and 37 may be connected with each other over a computer network. Web servers 36 and 37 can provide content, including credit report data, to a user from database 38 and/or 39. Web servers 36 and 37 can also host the present credit reporting information analysis system, according to the present invention.

The Internet connects thousands of computers world wide through well-known protocols, for example, Transmission Control Protocol. (TCP)/Internet Protocol (IP), into a vast network. Information on the Internet is stored world wide as computer files, mostly written in the Hypertext Mark Up Language ("HTML"). Other mark up languages, e.g., Extensible Markup Language ("XML") as published by W3C Consortium, Version 1, Second Edition, October 2000, ©W3C may also be used. The collection of all such publicly available computer files is known as the World Wide Web ("WWW").

The WWW is a multimedia-enabled hypertext system used for navigating the Internet and is made up of hundreds of thousands of web pages with images and text and video files, which can be displayed on a computer monitor. Each web page can have connections to other pages, which may be located on any computer connected to the Internet.

A typical Internet user uses a client program called a "Web Browser" to connect to the Internet. A user can connect to the Internet via a proprietary network, such as America Online or CompuServe, or via an Internet Service Provider, e.g., Earthlink. The web browser may run on any computer connected to the Internet. Currently, various browsers are available of which two prominent browsers are Netscape Navigator and Microsoft Internet Explorer. The Web Browser receives and sends requests to a web server and acquires information from the WWW.

A web server is a program that, upon receipt of a request, sends, the requested data to the requesting user. A standard naming convention known as Uniform Resource Locator ("URL") has been adopted to represent hypermedia links and links to network services. Most files or services can be represented with a URL.

URLs enable Web Browsers to go directly to any file held on any WWW server. Information from the WWW is accessed using well-known protocols, including the Hypertext Transport Protocol ("HTTP"), the Wide Area Information Service ("WAIS") and the File Transport Protocol ("FTP"), over TCP/IP protocol. The transfer format for standard WWW pages is Hypertext Transfer Protocol (HTTP).

Figure 4A:
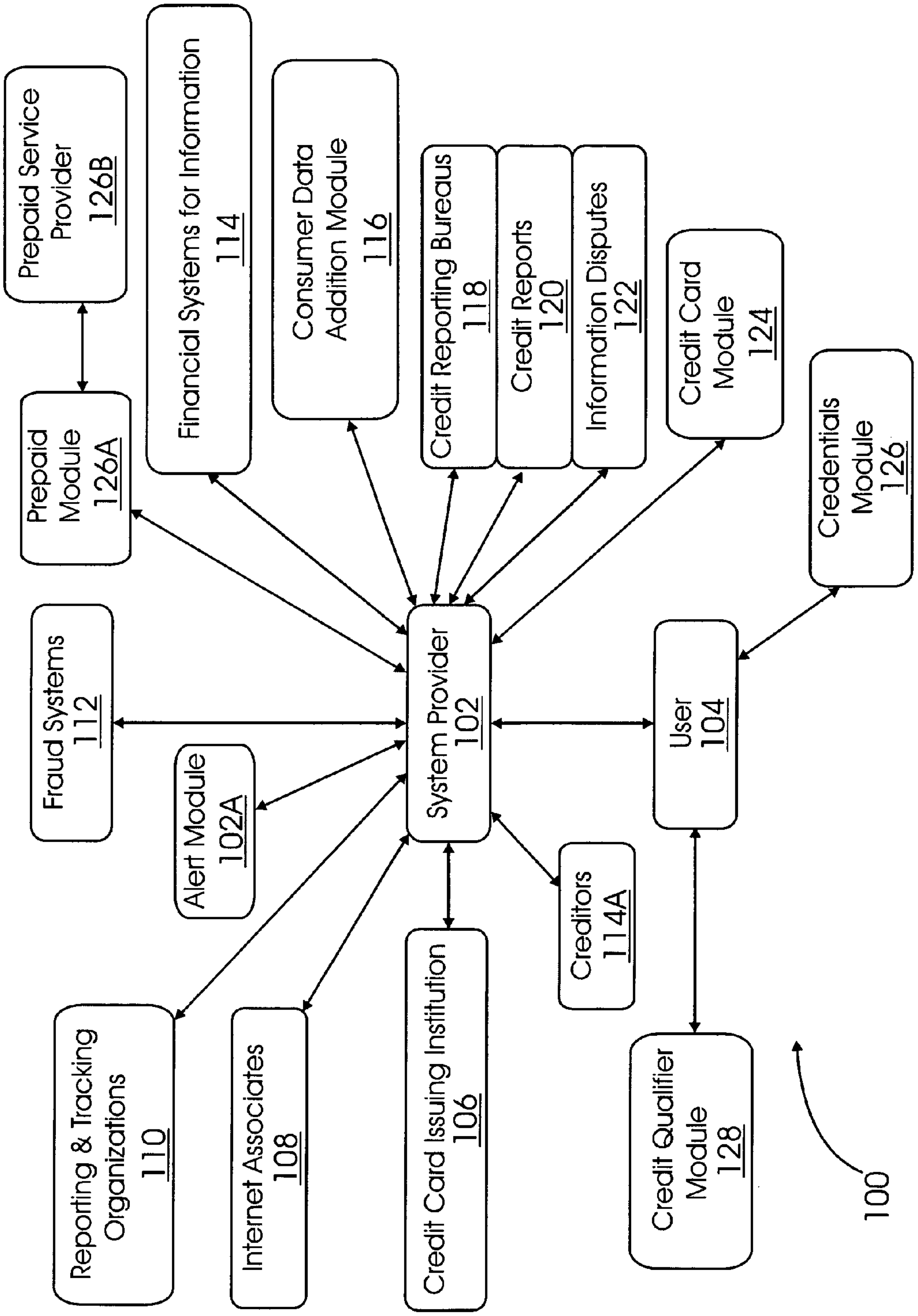
FIG. 4A is a block diagram of a system for online management of consumer credit reporting analysis, according to another embodiment of the present invention.

Online Credit Management:

FIG. 4A shows a system 100 for online management of consumer credit reporting analysis. A system provider 102 (such as an online service provider) may serve as a host or vendor for providing credit reporting information and services to a user 104. It is noteworthy that the term credit report data and credit related data intended to include any consumer related information in a broad sense and the adaptive aspects of the present invention are not limited to any particular type/format of data. Furthermore, the term creditor as used herein includes an entity that provides credit to consumers; furnishes consumer credit information or any other third party that can provide consumer related information.

User 104 (such as a consumer) may be a customer that purchases a membership from system provider 102 to access system 100. Whether user 104 is a member or a non-member guest of system provider 102, various third parties may start and maintain relationships with system provider 102 to offer services and products to user 104. For example, a credit card issuing institution 106 (such as a bank, savings and loan association, credit union, or a finance company) may offer to extend credit to user 104 by communicating through system provider 102 within system 100, whereby user 104 can see such offers from the institutions that system 100 facilitates. However, the institutions cannot see the users or communicate with the users.

Internet associates 108 (such as Internet portals, search engines, and Internet advertisers) may direct new users 104 to use system 100, for which the system provider 102 may provide consideration to the Internet associates 108. The Internet associates 108 may also operate as private-label distributors of services and products offered by system provider 102.

Reporting and tracking organizations 110 (for example, a court or an identification verification service, such as ChoicePoint™, Incorporated of Atlanta, Ga., in the United States) may contract with the system provider 102 to exchange data. The system provider 102 gathers consumer information other than credit report data, displays the data in a uniform manner and permits the user 104 to dispute, challenge, or confirm the data.

The system provider 102 sends requests to dispute, challenge, or confirm the data to a credit reporting bureau. Alternatively, the system provider 102 also sends requests to dispute, challenge, or confirm the data directly to creditors (or other data reporting entities) instead of communicating through the credit reporting bureau.

The system provider 102 can use a system similar to system 100 for permitting fee-based data verification ("data scrubbing") access to information on the user 104 to confirm and verify information for government, business, and other entities.

Various fraud systems 112 (for example, a provider of fraud management services, such as Iovation™, Incorporated of Portland, Oreg., in the United States) and financial systems for information 114 (for example, a business information provider, such as the D&B Corporation of Short Hills, N.J., in the United States) may start and maintain relationships with system provider 102.

Consumers, including the user 104, can add data (such as medical data if desired) via a consumer data addition module 116 (for example, a module that permits a consumer to enter personal information).

The system provider 102 also interacts with credit reporting bureaus 118 (such as TransUnion™ L.L.C. of Chicago, Ill., in the United States; Experian™ of Costa Mesa, Calif., in the United States; and Equifax™ Credit Information Services, Incorporated of Atlanta, Ga., in the United States) to obtain credit reports 120 (such as collections of data maintained by the credit reporting bureaus 118) and conduct information disputes 122 (for example, contacting a credit reporting bureau 118 or the creditor 114A to dispute information in a credit report 120 and request an investigation of the disputed information).

The system provider 102 offers a credit card via a credit card module 124 (such as a system for marketing and processing a credit card application). The user 104 also provides credentials via a credentials module 126 (such as a system for authorizing third party access to consumer credit data).

The user 104 also uses a credit qualifier module 128 (such as a system for determining credit worthiness). For example, the system provider 102 may allow credit grantors, financial companies, lenders, and the like to submit (such as, from the financial systems for information 114) current credit qualifications to the system 100.

Alternatively, system 100 is used to retrieve the current credit qualifications from the financial systems for information 114, which provides information on consumer credit history. System provider 102 prevents the credit grantor from seeing the identity of any consumers/users that match the credit grantor's credit qualifications. This current credit qualifications information is presented to the user 104 to facilitate application for credit for which the user 104 should be eligible.

System provider 102 charges the user 104 a fee for providing the application. The system provider 102 may also charge the credit grantor a commission on the completed credit transaction.

System provider 102 interfaces directly with a creditor (s) 114A. In this aspect, a direct to creditor approach is taken that allows a consumer to fix any credit related problems directly with the creditor. Details regarding the process are provided below with respect to FIG. 22A.

System provider 102 after receiving a dispute (or a request to correct credit information) from a user, and if allowed by creditor 114A, accesses the creditor 114A database directly. Creditor 114A stored data is analyzed and compared with the user data/request. Based on the analysis, system provider 102 concludes whether the stored data should be corrected or the stored data is accurate. System provider 102 notifies both the creditor 114A and user 104 when data needs to be changed and/or if data is accurate (i.e., a particular loan instrument is valid).

This service assists both user 104 and creditor 114A because if an item should be corrected, it will help both the parties. Also, if a user is maliciously trying to dispute entries, a creditor is informed. Furthermore, the creditor does not have to deal with various consumers and hence, they can accurately correct their databases, based on the service provided by system provider 102.

Prepaid services, for example, prepaid services for legal services, telephone cards, insurance, and others, are also provided via system provider 102. The prepaid services offer users an alternative to credit and still provide users access to products/services that a user can easily afford.

Prepaid service providers 126B interface with system provider 102 via a prepaid provider module 126A (or directly via system provider 102). Prepaid module 126A provides a centralized platform for multiple vendors to provide their services to user 104.

In another aspect, user 104 is provided a user interface (described below) that allows a user to select various services. One such service is a credit monitoring service. When an activity takes place on a user's credit report (for example, a loan), the user is notified via email, fax or other means. If the information is accurate, then the creditor 114A is also notified of the valid/accurate entry. This allows the creditor 114A to flag accurate entries to avoid future disputes.

Although creditors 114A have been described as institutional creditors (for example, banks with databases), the adaptive aspects of the present invention are not limited to this characterization. Creditor 114A includes individuals who provide personal loans to user 104. System provider 102 receives the information on such personal loans from creditor 114A (in this example, an individual) and feeds that information to credit reporting bureaus 118.

System provider 102 also interfaces with alert module 102A that alerts customers/creditors/credit bureaus as needed. In one aspect, alert module 102A is integrated with the system provider 102. In one aspect of the present invention, system provider 102 provides a credit report to the user. The user is then allowed to set up monitoring parameters, as described below.

Figure 4B:
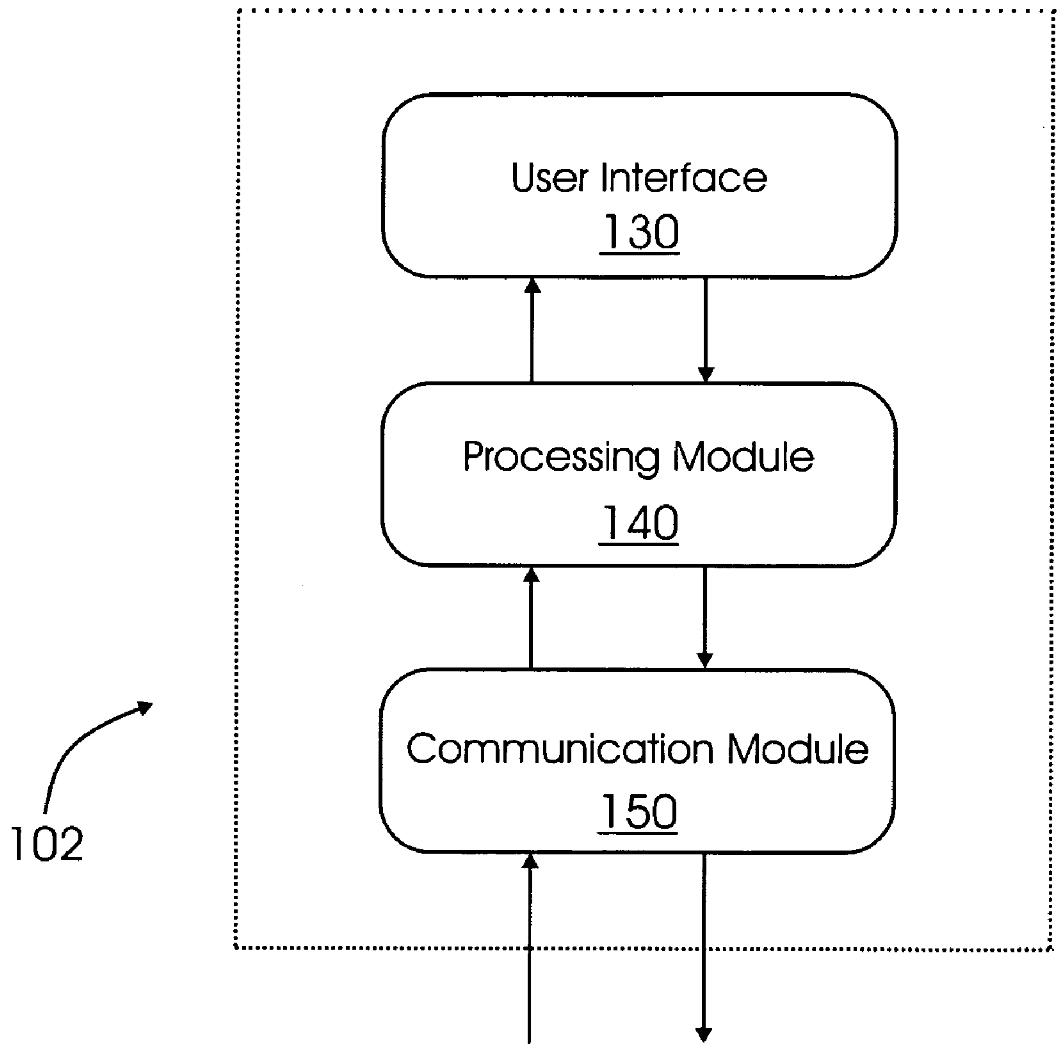
FIG. 4B is a block diagram of a system provider as used in the system of FIG. 4A.

FIG. 4B shows a block diagram of the system provider 102 used in the system 100 of FIG. 4A. The system provider 102 comprises a user interface 130 (or a receiving module), a processing module 140, and a communication module 150. The user interface 130 may be displayed on the host computer 10 and monitor 11 (shown in FIG. 1). The processing module 140 is used to process all requests between the user interface 130 and the communication module 150. The communication module 150 is used to conduct communications between the system provider 102, the user 104 (shown in FIG. 4A), and third parties 106-124 (shown in FIG. 4A).

Figure 4C:
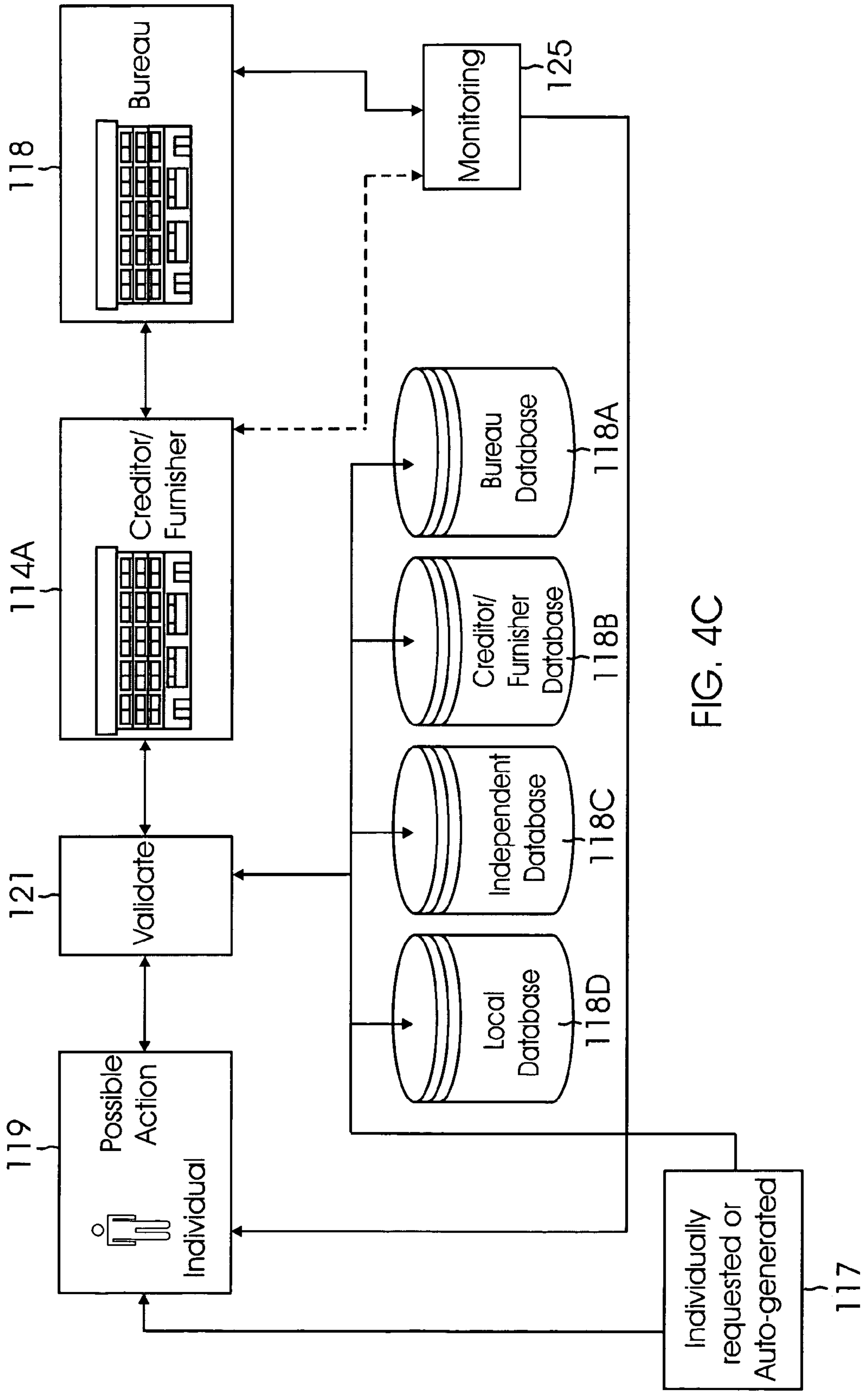
FIG. 4C is a block diagram of a system for online management of consumer credit reporting analysis, according to yet another embodiment of the present invention.

FIG. 4C shows an additional embodiment of the system 100 for online management of consumer credit reporting analysis. In this embodiment, the user 104 can request that data/information on a credit report be corrected or the action/request can be automatically generated from monitoring 125 the credit bureaus 118 with criteria or parameters set by the user. From the request 117, a possible action is generated 119 which is validated by databases, such as a credit reporting bureau database 118A, creditor 118B, independent database 118C, local database 118D or other type of database provider. Once validated, creditor 114A determines if the request should be granted. If the request is granted, the bureau 118 is notified and the data is updated. A results notice is sent to the user 104 detailing whether the request was granted and if the credit report was updated.

Figure 5A:
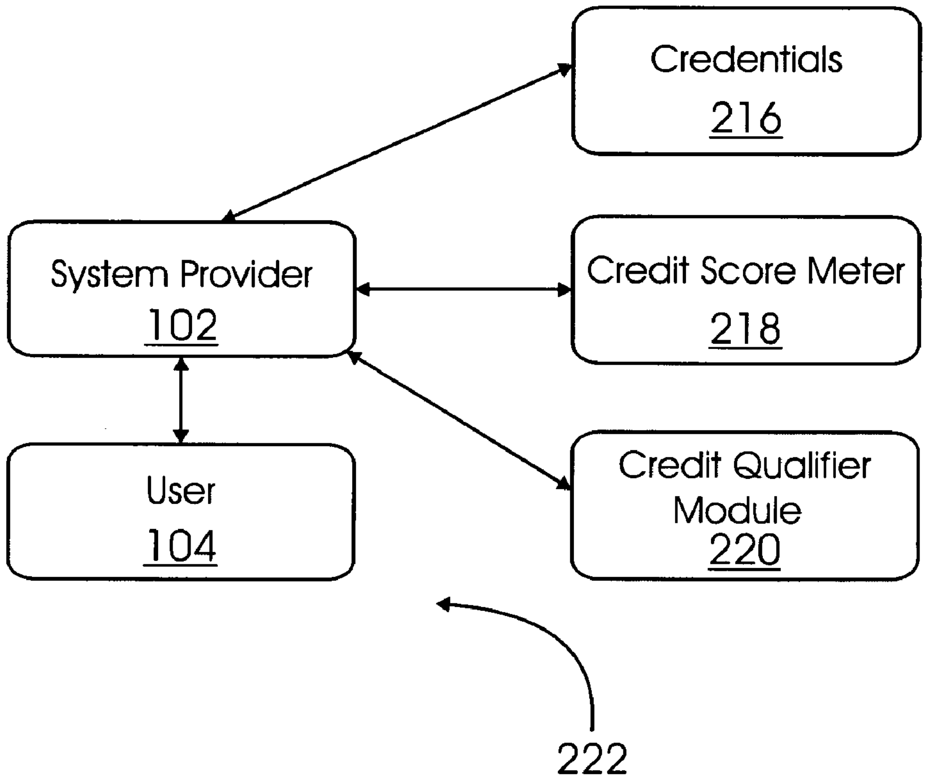
FIG. 5A is a block diagram of a system for management of consumer credit report data, according to one embodiment of the present invention.

FIG. 5A shows a block diagram of a system 222 for management of consumer credit report data. The system provider 102 interfaces with user 104 to offer the user 104 the services of the credentials module 216, the credit score meter 218, and the credit qualifier 220, which are described below in detail.

Figure 5B:
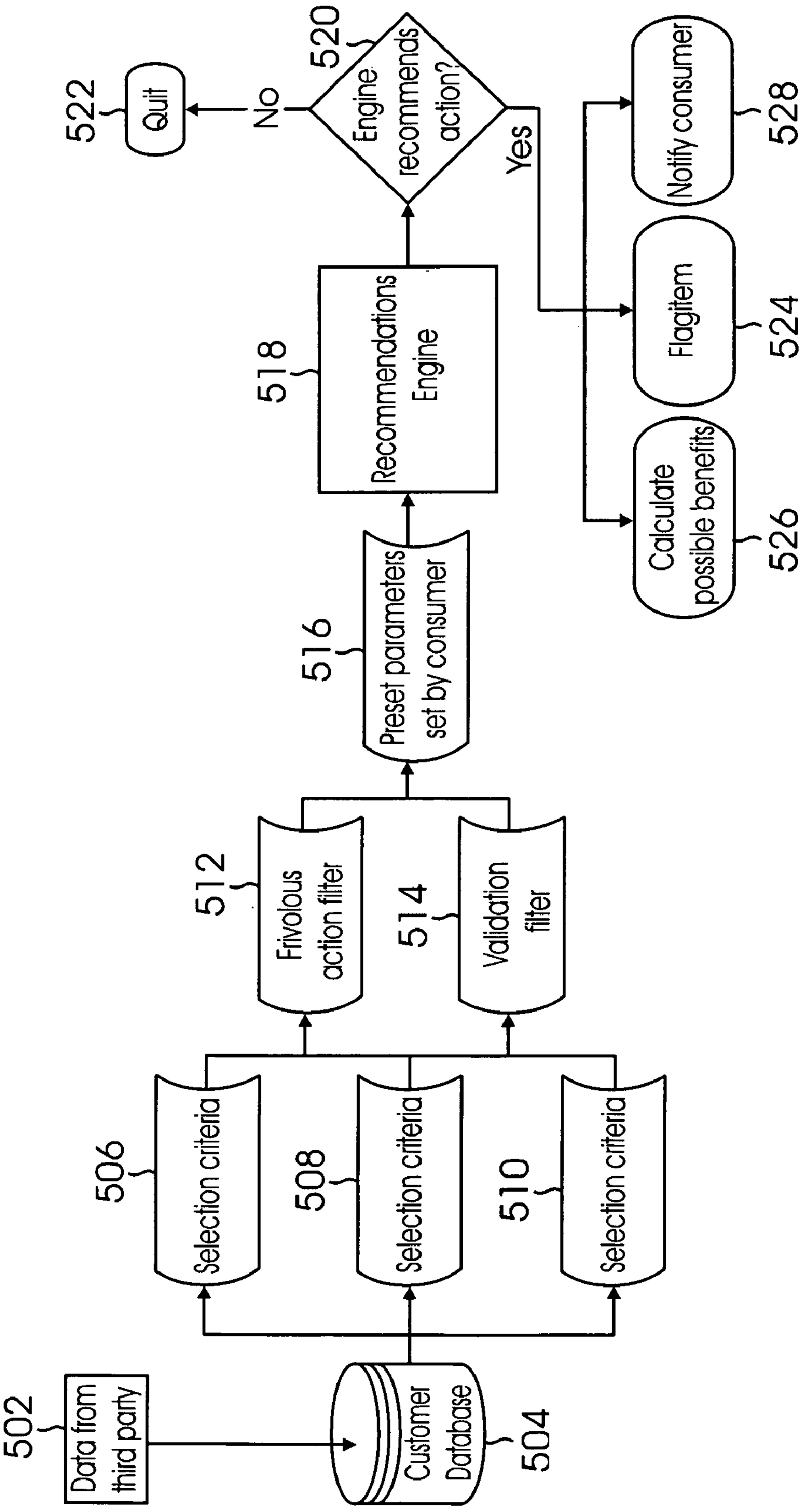
FIG. 5B is a flow chart of a method of determining a recommended action for a consumer, according to one embodiment of the present invention.

FIG. 5B is a flow chart of a method of determining a recommended action for a user. Data is entered into a customer database 504 by a creditor, independent database or any other third party. Applying selection criteria 506, 508, 510 to the data, possible actions, such as reporting an error, debt settlement and identification theft aware and declare, are recommended to the user 104. Selection criteria can include recommendations to the user 104. For example, if the user's debt is 36 months old and is only $100, it may be recommended that the user pay off the debt and not pursue an action. Once recommended actions have been determined, the actions are sent through a frivolous action filter 512 (described below with reference to FIG. 5C) and a validation filter 514 (described below with reference to FIG. 5D) to ensure that the action is not frivolous and is valid. Next, the recommended actions are compared to preset parameters determined by the consumer/user 516. If any of the recommended actions match any of the preset parameters, a recommendation engine 518 reviews the recommended actions and makes a final determination if the consumer should be notified of the recommended actions. If the consumer is to be notified 528, the action is flagged 524, the possible benefits of the action are calculated 526 and provided to the consumer 528. However, if there is no recommended action, the process ends 522.

Figure 5C:
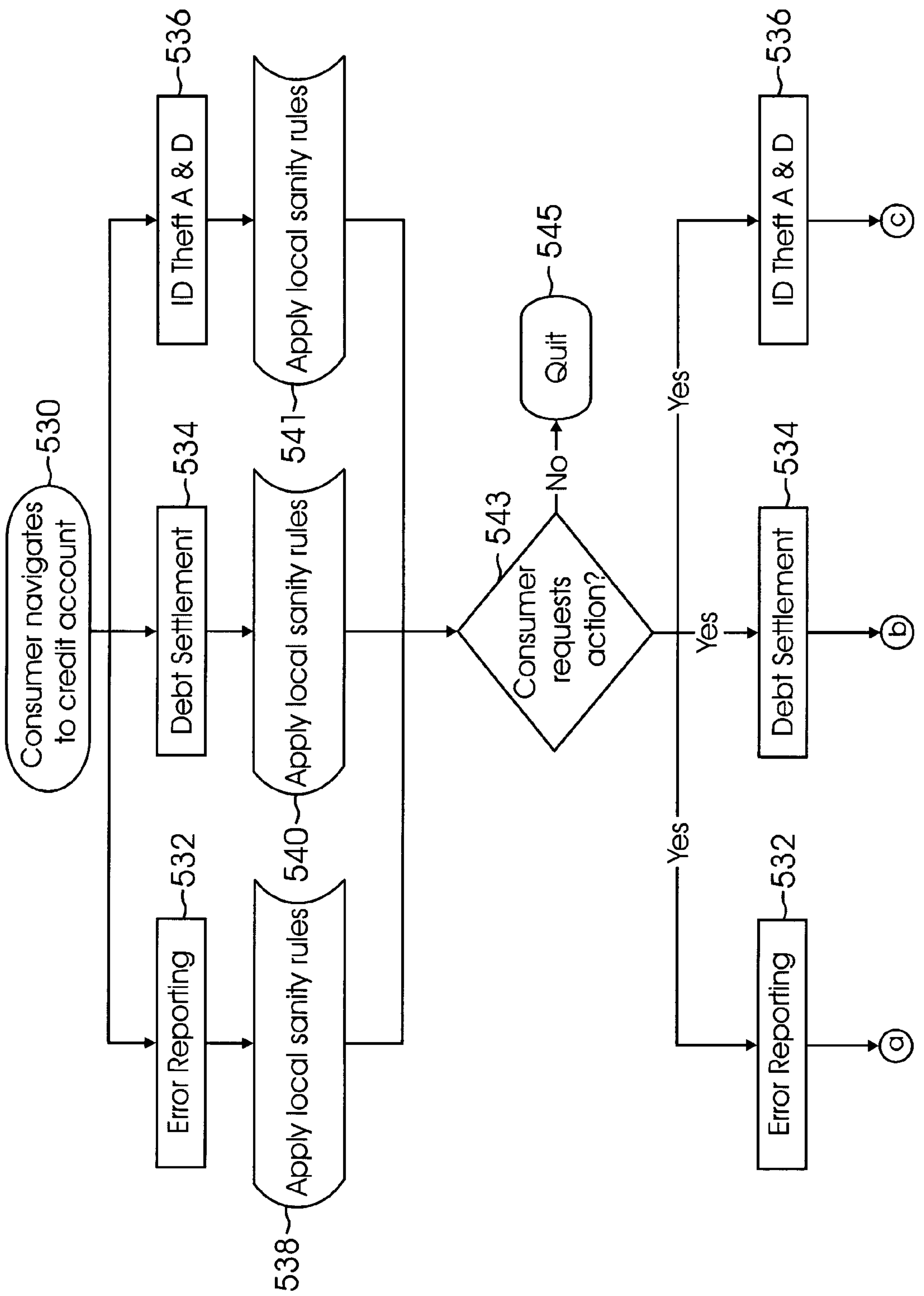
FIG. 5C is a flow chart of a method of determining if a consumer action is frivolous, according to one embodiment of the present invention.

FIG. 5C is a flow chart of a method of determining a frivolous user action, such as offering to settle a $10,000 debt for $20. First, the user 104 reviews a credit account/report 530 and determines whether to file an action or an action is automatically generated. A list of possible actions is produced by system provider 102 based on the credit account, such as an error on the report 532, proposing a settlement to a debt 534 or the user's identity has been stolen 536. The possible actions are then sent through local filters 538, 540, and 541 which contain rules to determine if the action is frivolous. The rules can come from various sources, such as creditors, system provider databases, any other third party database, bureaus, creditors, and the Federal Government. Rules can include, but are not limited to the following: (1) the action is frivolous if there is no negative item on the credit report(s) or the user has filed several disputes in a row; (2) the action is frivolous if the report(s) do not contain any debt or unpaid balance; and (3) the action is frivolous if the consumer is claiming identity theft on an item that is no longer active.

These rules are applied globally on all the credit accounts/reports, causing actions of the user 104 to be restricted. For example, filter 538 determines if an error reported is a negative item, filter 540 determines if the account has any debt and if there is an unpaid balance, and filter 541 determines if the item the user 104 is claiming identify theft is still an active item.

If user 104 does not request any action on information obtained from the credit account/report or an action is not automatically generated 543, the process ends 545.

If the user 104 requests an action or an action is automatically generated 543, such as there is an error on the report 532, proposing a settlement to a debt 534 or the consumer's identity has been stolen 536, the action is compared against local filters 538A, 540A, and 541A supplied by the creditor. Local filters 538A, 540A, and 541A are applied only to the specific action and credit account of the user 104. If the action does not pass 547 filters 538A, 540A, 541A, no action is taken 549. Upon an action failing, the user 104 is notified that the action has been ended.

If the user believes that this decision was in error and wishes to escalate the action 561, the user is requested to submit a declaration stating that the request is not frivolous. For example, if the action was determined frivolous because the user does not have the account in question, the user can submit a declaration stating that the user does have the account in question. If the request has been determined not to be frivolous, the validity of the request is then determined (as described with reference to FIG. 5D below).

Figure 5D:
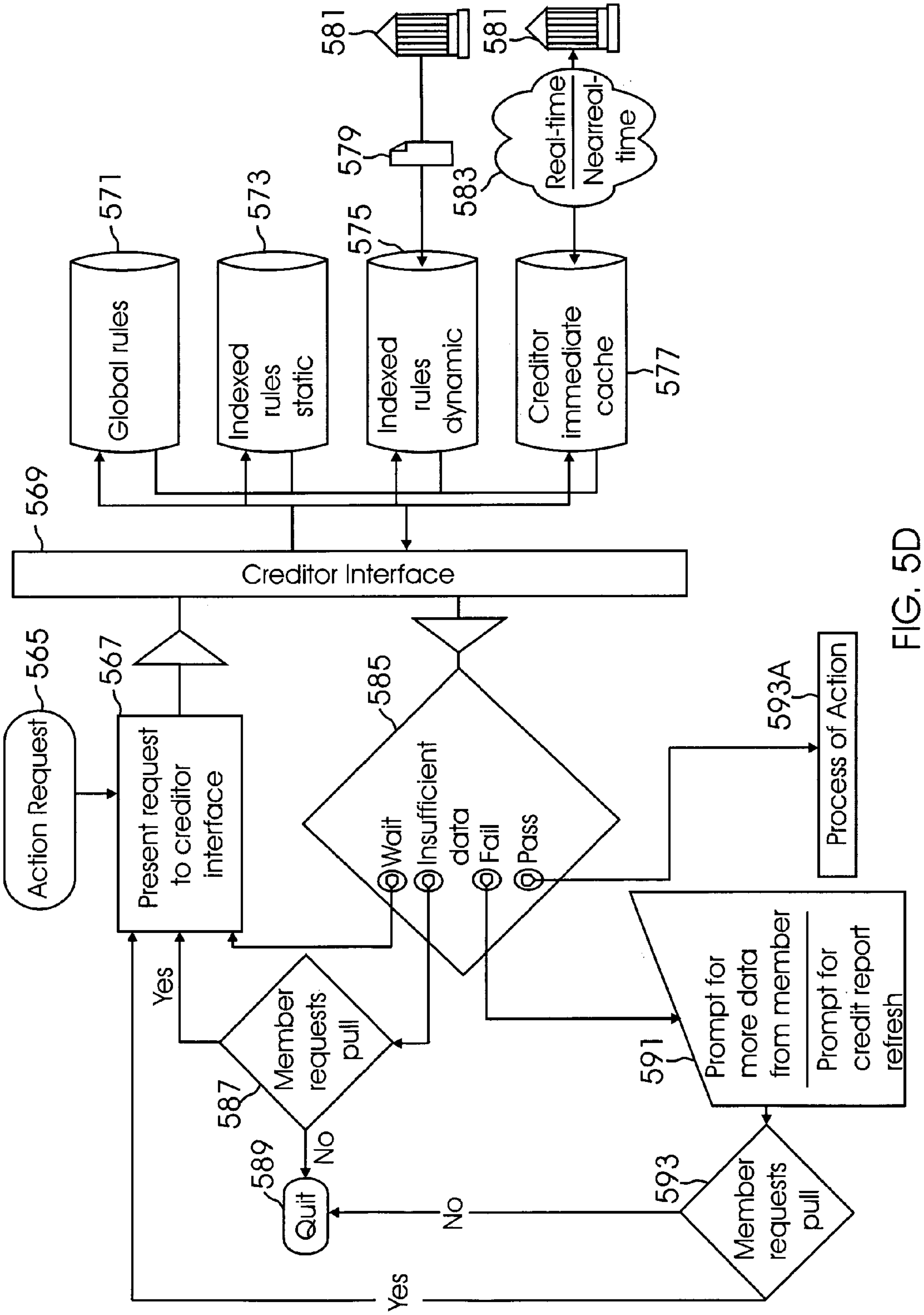
FIG. 5D is a flow chart of a method of determining the validity of a consumer's action, according to one embodiment of the present invention.

FIG. 5D is a flow chart of a method of determining the validity of a user's action. First, the actions/requests 565 are presented 567 to a creditor interface 569 which compares the actions with several databases containing rules, as described above. These databases include a global rules database 571 for determining if the user 104 has an existing account, an indexed rules static database 573 for determining if the account the user 104 is disputing matches an account in the system, an indexed rules dynamic database 575 containing a list of the user's accounts and any watch lists the user 104 belongs to (which can be updated at any time by pulling additional information 579 from the creditor 581), and a creditor immediate cache database 577 for storing the data temporarily. Cache database 577 is indexed by the creditor 581 in real-time or near real-time 583 and destroyed after access. These databases are illustrated as examples only and additional databases containing additional rules may be provided.

Once creditor interface 569 has presented the user's actions to databases 571, 573, 575, and 577, the databases respond to creditor interface 569 with either a pass, fail or abstain for each requested action. Responses are sent by the creditor interface 569 to a distribution engine 585 for distributing the responses to correct locations. If the user 104 has provided insufficient data to determine if a request passes, the user 104 is asked additional questions 587 to fill in the data. The request is again presented to the creditor interface 567. If the user 104 no longer wants to pursue the request, validation is denied and the process is ended 589. The user 104 can also be asked to wait for a determination of validity and re-submit the requested action to creditor interface 567. This may be as a result of system provider 103 losing a link to creditor 581. Upon a determination of invalidity, the user 104 is prompted for additional data and the credit report is refreshed 591. Next, the user 104 is asked additional questions 593 to provide the system with additional data and the requested action is re-submitted to creditor interface 567, or the requested action is ended if the user does not want to answer the additional questions 589. If the requested action passes the validity test, the requested action is processed 593A.

Figure 6A:
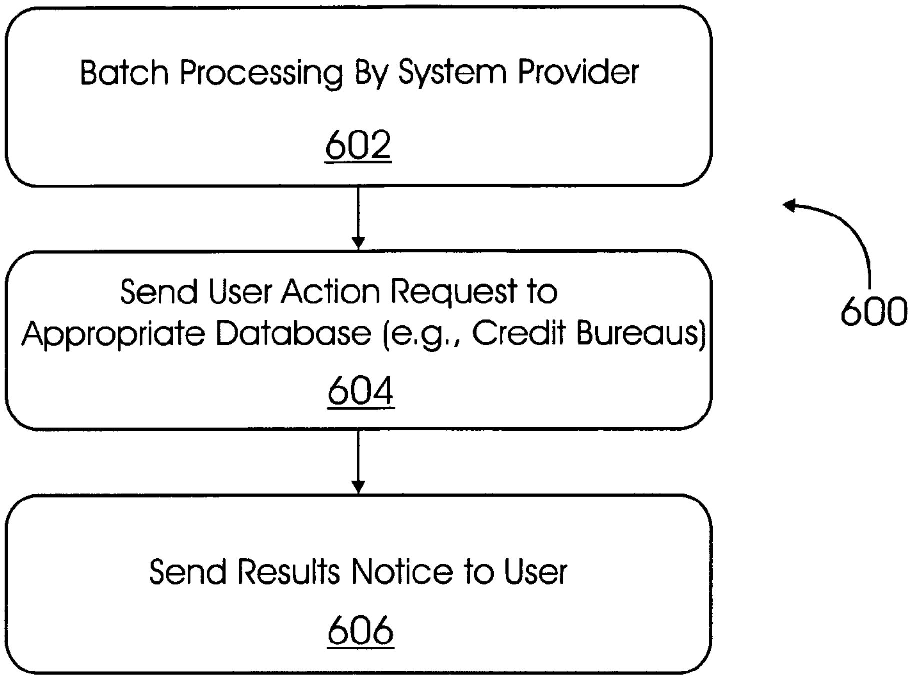
FIG. 6A is a process flow diagram of a method for sending user action requests to a database, according to yet another embodiment of the present invention.

User Action Requests:

FIG. 6A shows a method 600 for sending user action requests to a database, such as a credit reporting bureau 118 (shown in FIG. 4A), creditor 114A or other modules. A step 602 comprises of batch processing of user action requests by the system provider 102 (shown in FIG. 4A). A step 604 includes sending user action requests (or at least one user action request) to an appropriate database (such as a credit reporting bureau or another third party database provider). Next, a step 606 comprises sending results (or a notice of a lack of results) to the user.

Figure 6B:
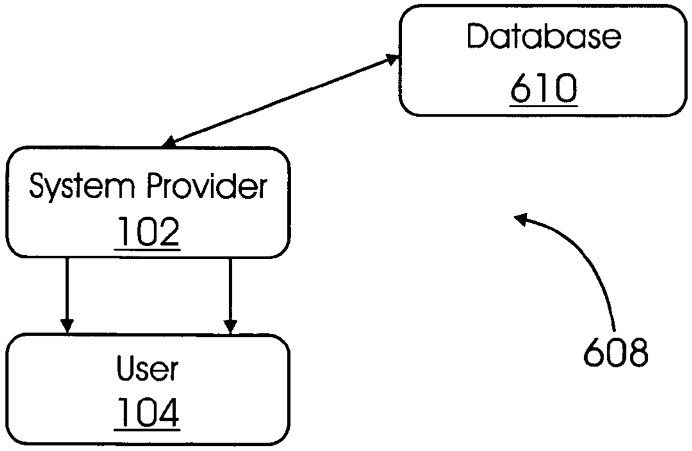
FIG. 6B is a block diagram of a system for sending user action requests to a database, according to yet another embodiment of the present invention.

FIG. 6B shows a block diagram of a system 608 for sending user action requests to a database. If the user 104 elects to send a user action request, then the system provider 102 sends the user action request to the appropriate database 610. The database 610 may be a third party database, such as a credit reporting bureau 118, creditor 114A or other type of database provider.

The database 610 communicates with the system provider 102. For example, the system provider 102 sends information within a user action request for verification regarding a disputed credit report entry to the database 610. Then, the database 610 sends a notice to the system provider 102 whether the database 610 has changed or deleted the disputed credit report entry.

Upon the action or non-action of the database 610, then the system provider 102 sends a results notice to the user 104 detailing whether the database has changed or deleted the disputed credit report entry or whether the database has not acted in response to the user action requests.

Figure 6C:
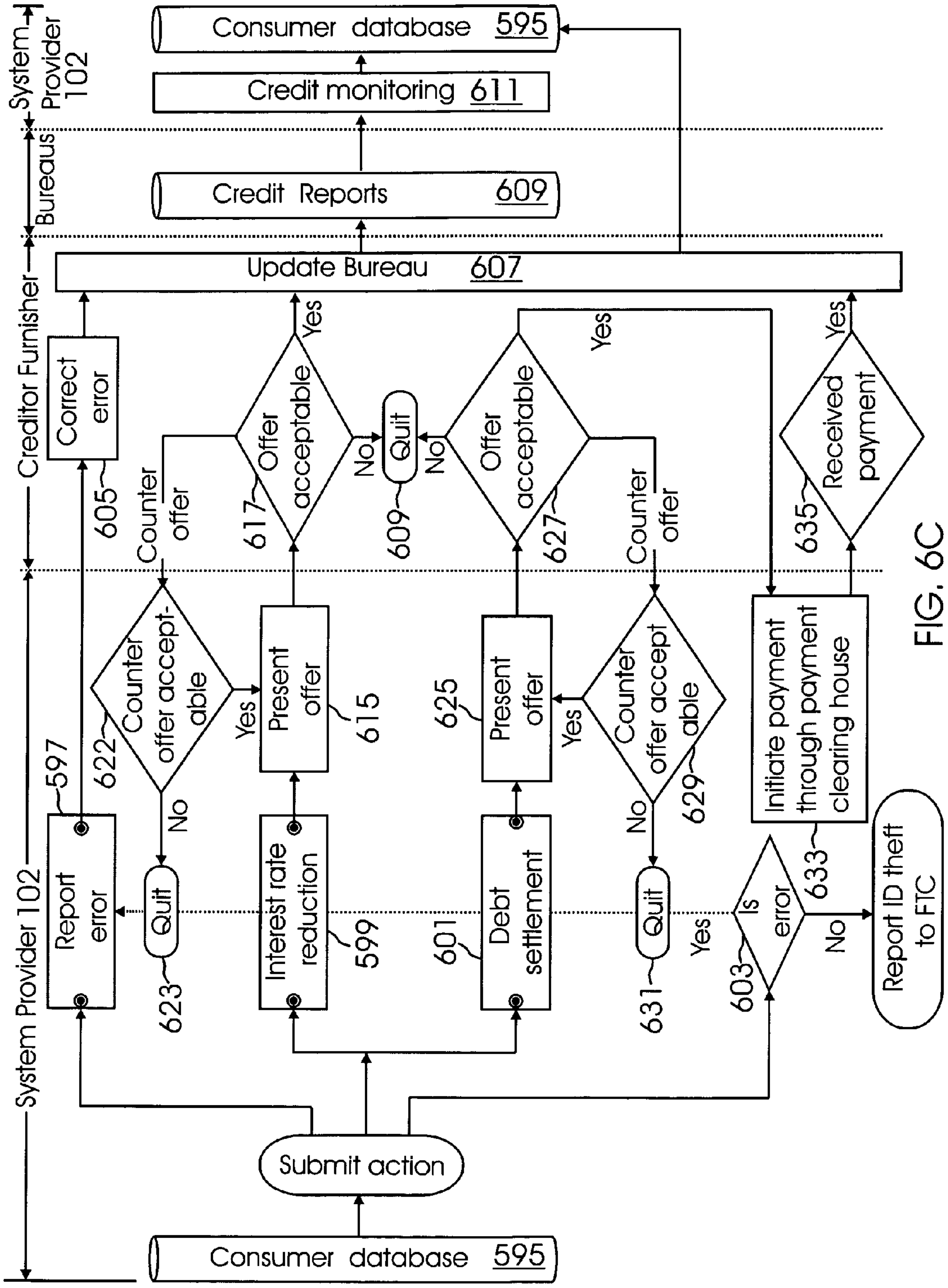
FIG. 6C is a flow chart of a method of processing a consumer's action, according to yet another embodiment of the present invention.

FIG. 6C is a flow chart of a method of processing a user's action. Customer database 595 gathers data from three sources, creditors, independent databases and credit bureaus. Based upon the data stored in the customer database 595, actions are determined and presented by the system provider 102 to creditors. When the action requests an error to be corrected 597 and an error is found, the error is corrected 605 and the bureau is updated 607 which in turn updates the user's credit reports 609. The system provider 102 monitors 611 the data from the bureau and updates the user's data in the customer database 595. Alternatively, the bureau may send a report to the system provider 102 causing the system provider 102 to update the user's information in the customer database 595.

If the action requests an interest rate to be reduced 599, the system provider 102 submits an offer 615 to an entity (such as a creditor, collection agency, contract assignee, and the like) which determines if the offer is acceptable 617. Upon receiving an unacceptable offer, the entity can end negotiations 619 or submit a counter offer. If the counter offer is acceptable 621, the new offer is presented to the entity, 615. Upon acceptance of any offer to reduce interest rates, the bureau is updated 607 causing the user's credit reports 609 to be updated. The system provider 102 monitors 611 the data from the bureaus and updates the user's data in the customer database 595. Alternatively, the bureaus may send a report to the system provider 102 causing the system provider 102 to update the user's information in the customer database 595. User 104 may also choose to reject the counteroffer and end negotiations 623.

An action may also request that a debt be settled 601. First, the system provider submits an offer 625 and the entity determines if the offer is acceptable 627. Upon receiving an unacceptable offer, the entity can end negotiations 619 or submit a counter offer. If the counter offer is acceptable 629, the new offer is presented to the entity 625. Upon acceptance of any offer to settle a debt, payment is initiated through a payment clearing house 633 and when the payment is received 635, the bureaus are updated 607 causing the user's credit reports 609 to be updated. The system provider 102 monitors 611 the data from the bureaus and updates the user's data in the customer database 595. Alternatively, the bureaus may send a report to the system provider 102 causing the system provider 102 to update the user's information in the customer database 595. The user 104 may choose to reject the counteroffer and end negotiations 631.

Finally, identity theft can be reported. Upon reporting identity theft, it is determined if identity theft has occurred or if the report was in error 603. If the report was in error, no action is taken 631. However, if the report of identify theft was correct, the identity theft is reported to the Federal Trade Commission as well as the creditor.

Service Action Guide:

FIGS. 7-12 show various screen shots using the various adaptive aspects of the present invention.

FIG. 7 shows a screen shot of a service action guide 230, describing options for taking action (opt-in and opt-out), credit corrections, and debt relief. The service provider 102 (shown in FIG. 4A) charges fees for actions taken (opting-in). A user 104 (shown in FIG. 4A) may avoid paying fees by requesting that actions not be taken (opting-out).

Actions are controlled by using action buttons 232-238. Action buttons 232-238 may change colors to indicate the status of an action. For example, an action button 232 may be a first color (such as grey) to indicate that the user 104 (shown in FIG. 4A) may opt-in (such as electing to dispute a credit report entry) and choose to pay a fee for requesting the taking of an action.

Likewise, an action button 234 may be a second color (such as red) to indicate that the user 104 (shown in FIG. 4A) may opt-out (such as when a credit report entry is already being disputed) to not pay a particular fee and to request that an action not be taken.

Credit Reporting Corrections:

Continuing with FIG. 7, for credit corrections, negative credit report entries are viewed and erroneous entries are disputed. For example, action button 236 is used to opt-in (or opt-out) of an action to dispute erroneous entries (such as inaccurate, outdated, or unverifiable credit report entries). Opting-in to the action to dispute erroneous entries (such as by clicking on action button 236) indicates to the system provider 102 (shown in FIG. 4A) that the user 104 (shown in FIG. 4A) desires that the credit reporting database 118 (or creditor 114A) receive a request that the credit report entry be disputed.

A user (shown in FIG. 4A) elects to view credit items for debt relief. An action button 238 appears adjacent to a credit report entry that is eligible for submission to debt relief. Action button 238 is used to opt-in (or opt-out) of the action of requesting an interest rate reduction from a creditor (114A).

Debt Relief:

FIG. 8 shows a screen shot of the service action guide 230 continuing with information on debt relief and information on identity protection actions, including an identity shield. Action button 240 may be a portion of debt relief shown in FIG. 7 above. Action button 240 may be used to opt-in (or opt-out) of the action of requesting an offer of compromise from a creditor for debt reduction.

Continuing with debt relief in FIG. 8, action button 242 may be used to opt-in (or opt-out) of the action of requesting that a creditor validate a debt and that the creditor validate the terms and conditions related to the debt.

Identity Theft:

In another aspect of the present invention, identity shield services are offered for preventing identity theft. Action button 244 may be used to opt-in (or opt-out) of the action of disputing a credit report entry as not belonging to the user 104 (shown in FIG. 4A). In this situation, a label of "NOT YOURS" may be used.

Action button 246 may be used to opt-in (or opt-out) of the action of disputing a particular credit report entry as not belonging to the user 104 (shown in FIG. 4A) and submitting the credit report entry to authorities (such as law enforcement agencies) to report that the user 104 (shown in FIG. 4A) is a victim of identity theft for the particular credit report entry.

Credit Correction Disputes:

FIG. 9 shows a screen shot for correction disputes. The screen shot in FIG. 9 is an exemplary view of a display presented to the user 104 (shown in FIG. 4A) after opting-in to a credit dispute action, such as requesting an action with action button 236 (as explained above with FIG. 7).

Before the user 104 (shown in FIG. 4A) is charged a fee, the user 104 (shown in FIG. 4A) is asked to confirm a desire to pay the fee. Details of the item to be disputed are displayed in columns A, B, and C for each of the credit reporting bureaus 118 (shown in FIG. 4A).

The user 104 (shown in FIG. 4A) provides a reason for disputing the credit data entry. For example, the reason provided may be that the account listed in the credit data entry is not an account that belongs to the user 104 (shown in FIG. 4A). A label "This is not my account." may be used in this situation.

Various other reasons may be provided for disputing the credit data entry (such as, wrong balance shown, account previously closed, debt discharged in bankruptcy, and the like). The various reasons for disputing a credit data entry may be selected from a drop-down box 250, which may list the various reasons plus blank fields for other reasons not listed. The user 104 (shown in FIG. 4A) may confirm opting-in to the credit dispute action by clicking the button 252. If the user 104 (shown in FIG. 4A) elects to cancel the request for the credit dispute action, then the button 254 may be clicked.

It is noteworthy that credit disputes may be taken up directly with a creditor 114A or a credit bureau 118.

Credit Score Meter:

FIG. 10A shows a screen shot for a credit score meter 380. A method for providing a tool or calculator is used to take data, categorize the data, and display the data. The data categories include debts, such as mortgage, automobile loan, credit card debt, and personal loan debt. It is to be understood that the present invention is not limited to the categories shown in FIG. 10A. For example other categories not shown, but within the scope of the present invention, may be residential rent, business rent, student loan, and medical debt.

User 104 (shown in FIG. 4A) is permitted to change the categorized data. The credit score meter 380 shows a current credit score of 484 in block 382, such as a FICO™ score, and a scalable and movable future (predicted) credit score of 658 in block 386. The current credit score in block 382 may be moved with a current score indicator 384, such as the triangular button shown. The future credit score in block 486 may be moved with a future score indicator 388, such as the triangular button shown.

Future interest rates and payment amounts are automatically adjusted to show the savings from improved credit scores. Actions are taken automatically or upon instructions by the user 104 based upon modification of the categorized data or the future credit score in block 386. Financing and sales of services and products are determined by the current and future information presented to user 104 (shown in FIG. 4A).

User 104 (shown in FIG. 4A) enters, for example, mortgage, auto, credit card, and personal loan amounts within the corresponding fields. The remaining time duration of the debt payments, such as the number of months of payments remaining, may be entered for each of the categories of debts.

The user 104 (shown in FIG. 4A) moves the current score indicator 384 to a location on a scale 390 to a location corresponding to the current credit score. For example, for a current credit score of 485, the current score indicator 384 may be set, as shown in FIG. 10, at about 485 along the scale 390.

The user 104 (shown in FIG. 4A) then manually moves or adjusts the future score indicator 388 to a desired location along the scale 390 for the future score shown in block 386. For example, for a future credit score of 656, the future score indicator 388 may be set, as shown in FIG. 10, at about 656 along the scale 390.

Instead of manually moving or adjusting the future score indicator 388 to a desired location, the credit meter 380 automatically moves the future score indicator 388 to a desired location in response to adjustments performed by the user 104 (shown in FIG. 4A).

Figure 10B:
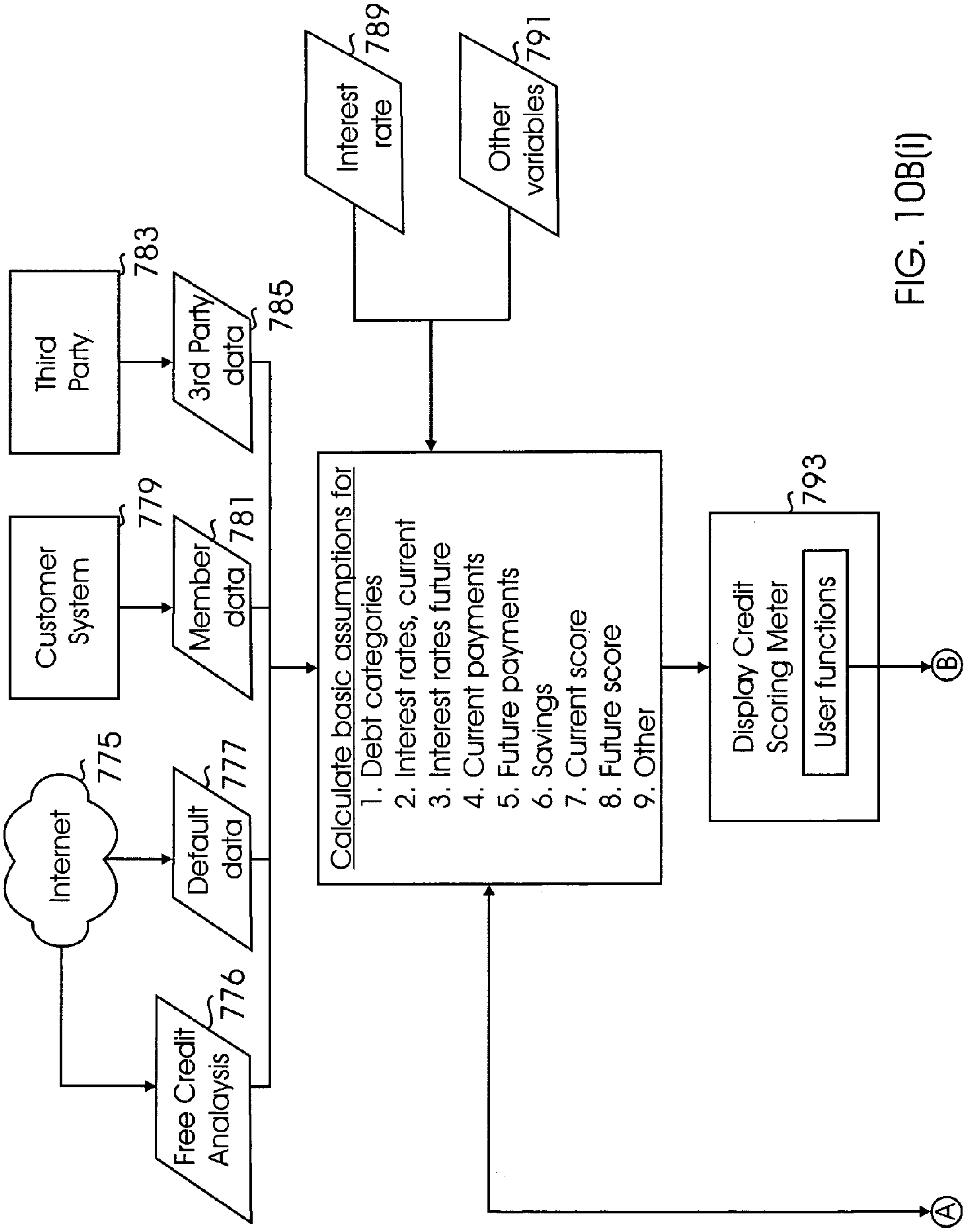
FIG. 10B shows a flow chart of a method of utilizing a credit scoring meter, according to one aspect of the present invention.
Figure 10B:
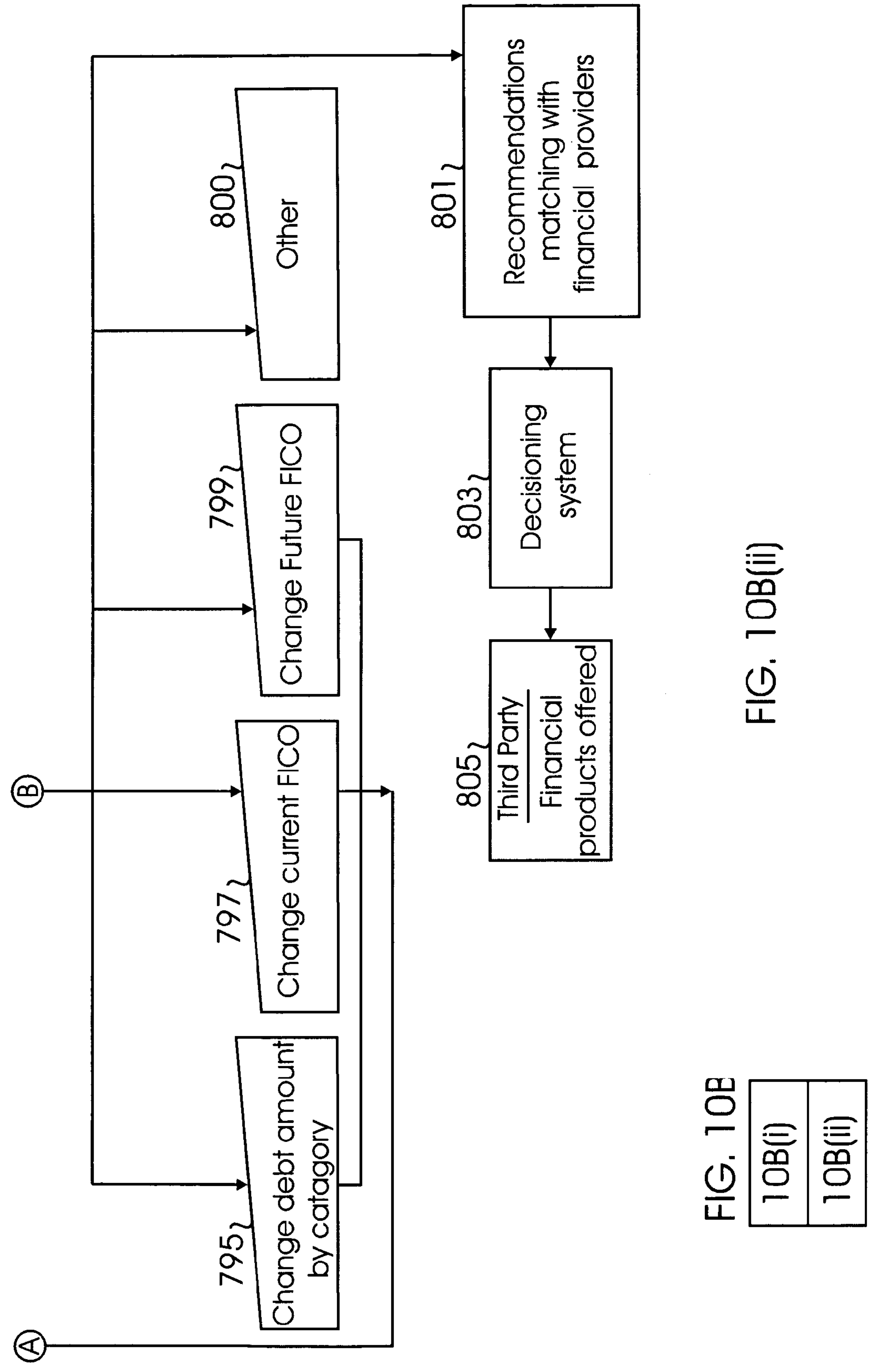

For example, if the amount of the auto loan were predicted to be changed to a lesser amount (such as, from $25,000, as shown in FIG. 10, to $1,000), then the future credit score in block 386 is decreased due to a lower debt-to-income ratio.

Thus, when adjustments are made in the input amounts, a future (predicted) credit score in block 386 is automatically determined.

FIG. 10B shows a flow chart of a method of utilizing a credit scoring meter, according to one aspect of the present invention. The credit scoring meter retrieves data from the user's credit analysis 776, default data 777, such as a user's mortgage or other loans, from the Internet 775, consumer data 781 from the customer system 779 and third party data 785 from a third party 783, such as a creditor. All the retrieved data 776, 777, 781 and 785, along with the current interest rate 789 and other variables 791 such as length of the loan, is used to calculate basic assumptions for debt categories, current interest rates, future interest rates, current payments, future payments, savings, future credit score, and other like information 787. These assumptions are then displayed in a credit scoring meter 793 which allows the consumer to change debt amount by category 795, change the current FICO score 797, change the future FICO score 799 or other data 800 to desired values, as described with reference to FIG. 10A. The desired values are then used to re-calculate the basic assumptions 787 so the consumer can see how improving these values will affect the credit reports. The information from the credit scoring meter is also used to provide recommendations that match the user with financial providers 801, such as credit card companies and lenders to consolidate loans. The financial providers, such as credit card companies and mortgage lenders, are determined by a decisioning system 803 used by system provider 102. Information in the decisioning system is provided by third parties who are offering financial products, such as credit cards and lower interest rate loans 805.

Credit Reporting:

FIGS. 11 and 12 show screen shots of presented credit reporting bureau reports and features for disputing erroneous and negative items. It is noteworthy that credit report entries may be disputed directly with the credit bureaus 118 or the creditors (114A).

FIG. 11 (FIGS. 11(*i*), 11(*ii*), and 11(*iii*)), for example, shows a summary of negative items and the status of disputed items. Action button 542 is labeled, "In Dispute," to indicate that the user 104 (shown in FIG. 4A) has already previously requested the action of disputing the associated debt. Action button 544 is labeled, "Dispute," to indicate that the user 104 (shown in FIG. 4A) has the option of requesting the action of disputing the associated debt.

Action button 546 indicates that the item is disputed. The discrepancy in the item includes the reporting of the account as a current account ("Open") although the account was discharged in bankruptcy proceedings. Because accounts discharged in bankruptcy should not be reported as current accounts, the account is not reported accurately.

Action button 548 indicates that another item is disputed. Action button 550 suggests to the user 104 (shown in FIG. 4A) that the item merits disputing as the account is reported as an open account, although the account is also reported as charged off. Because charged off accounts should not be reported as, open accounts, the account is not reported accurately.

More items are shown in FIG. 12 (FIGS. 12(*i*), 12(*ii*), and 12(*iii*)). Action button 552 merits disputing because, as explained above regarding action button 546 in FIG. 11, accounts discharged in bankruptcy should not be reported as currently open accounts. As can be seen in FIG. 12, the item is reported at only two credit reporting bureaus (A and B), but not in another credit reporting bureau (C).

Action button 554 indicates a suggestion the item should be disputed. In this situation, several reasons may be available for disputing the reported debt. For example, the account was discharged in a bankruptcy, but the account is still reported as "Open."

Additionally, the account is not reported by the other two credit reporting bureaus (A and B), presumably because the other two credit reporting bureaus (A and B) have already accurately removed the item from their respective databases. The item may also be disputed because the account number is not reported.

Continuing with FIG. 12, action button 556 may also be suggesting to dispute an item that is an open collection account, although the account should be removed from the credit reporting bureau 118 database as the last reporting date is earlier than the permitted earliest date (generally seven years after the reporting date). A request for the action of disputing an item is initiated by clicking action button 558. Disputing the item may also be suggested because the account is listed as an open account, although the account has been discharged in bankruptcy proceedings.

Action button 560 indicates that the item is in dispute. The item is disputed because a 60-day late payment is reported in the "Late 60 Days" row, but no 30-day payment is reported in the "Late 30 Days" row, despite an entry in the "Creditor Comments" row that the item is a "CURRENT ACCOUNT /WAS 30 DAYS PAST DUE." Reporting of the 60-day late payment is erroneous.

Figure 13:
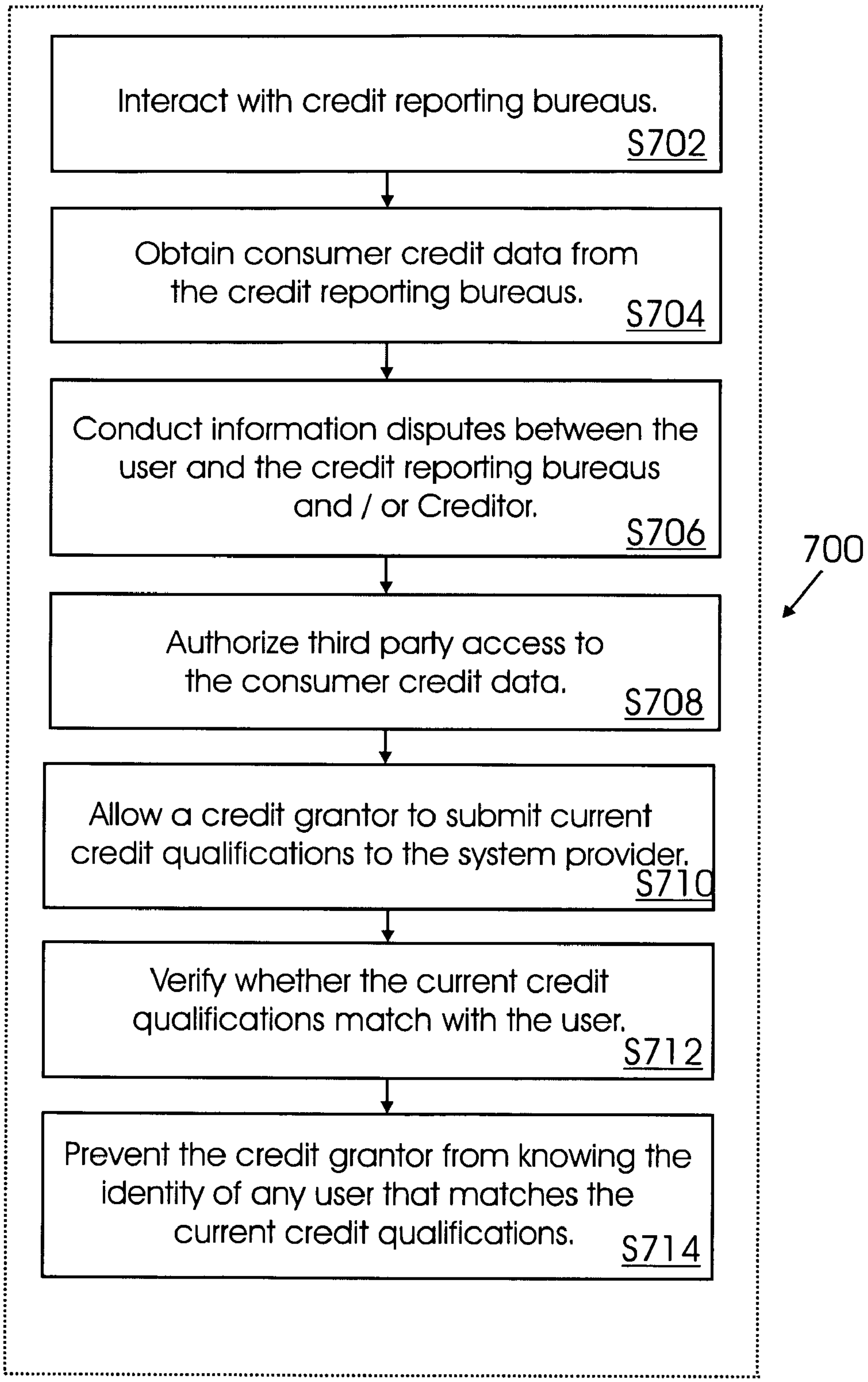
FIG. 13 is a flow chart of a method for online credit report data analysis and management, according to another embodiment of the present invention.

Process Flow Diagrams:

FIG. 13 shows a flow chart of a method 700 for providing credit reporting information and services to a user through a system provider 102. The method 700 includes a step S702 for interacting with credit reporting bureaus 118. In step S704, consumer credit data is obtained from the credit reporting bureaus 118. In step S706, information disputes between the user and the credit reporting bureaus 118 (or directly with the creditor 114A) are conducted. In step S708, a third party is authorized access to the consumer credit data.

Continuing with FIG. 13, in step S710, a credit grantor is allowed to submit current credit qualifications to the system provider 102. In step S712, the process verifies whether the current credit qualifications match with the user. In step S714, the credit grantor is prevented from knowing the identity of any user that matches the current credit qualifications.

Figure 14:
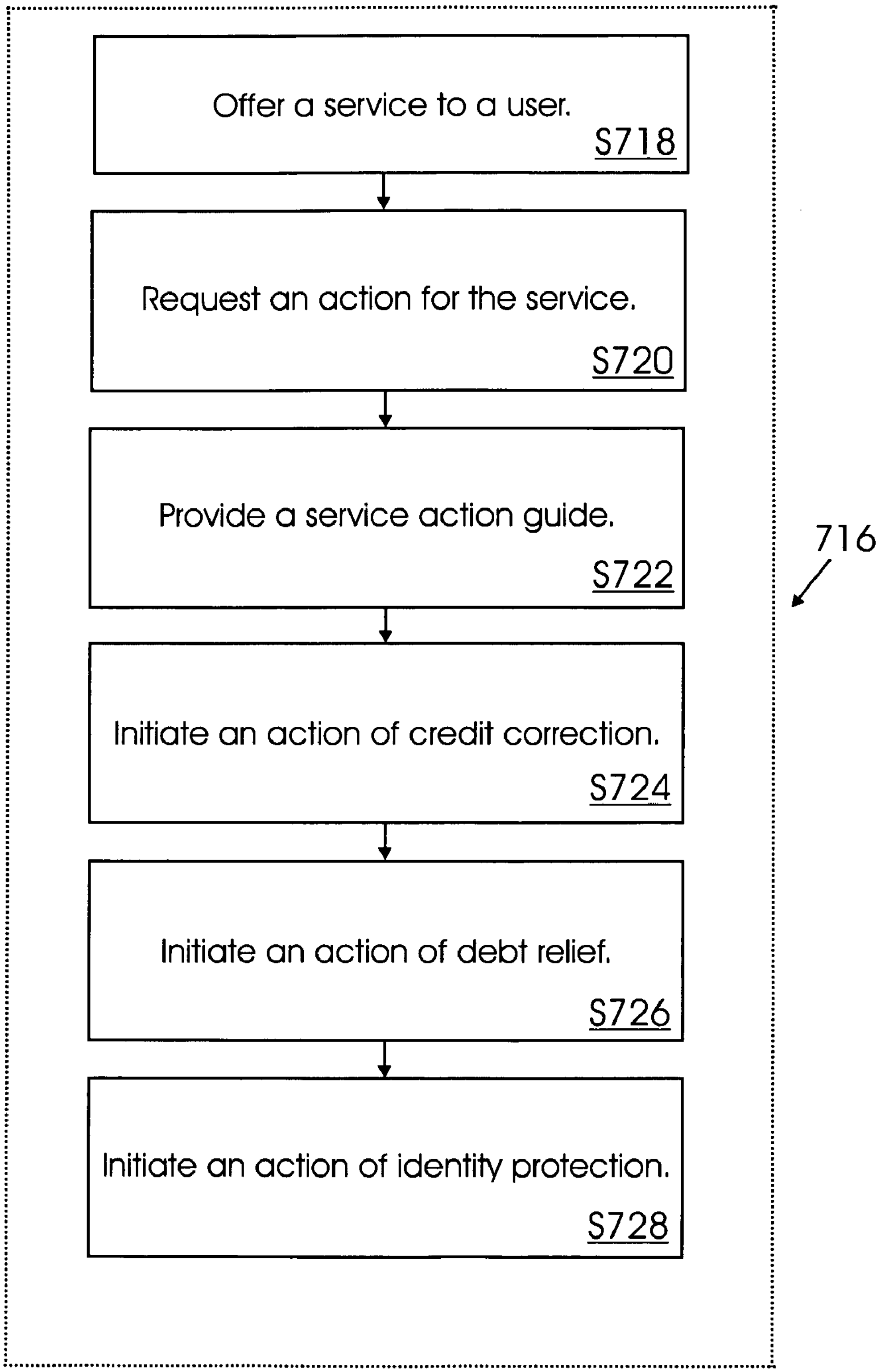
FIG. 14 is a flow chart of a method for management of consumer credit report data, according to another embodiment of the present invention.

FIG. 14 shows a flow chart of a method 716 for management of consumer credit report data. The method 716 comprises a step S718 of offering a service to a user. The service offered may be credit corrections, credentials, debt relief, credit qualifier, a credit score meter, and the like.

A step S720 requests an action for the service. If a user 104 (shown in FIG. 4A) proceeds with the step S720 of requesting an action for a service from the service provider 102 (shown in FIG. 4A), the user 104 (shown in FIG. 4A) requests an action for credentials from a credentials module 126 (shown in FIG. 4A), request an action for the credit score meter 218 (shown in FIG. 5) or credit score meter 480 (shown in FIG. 10), and request an action for a credit qualification from a credit qualifier module 128 (shown in FIG. 4A) or a credit qualifier module 220 (shown in FIG. 5).

In step S722, a service action guide is provided, and in step S724, an action of credit correction is initiated.

Continuing with FIG. 14, debt relief is initiated in step S726.

In step S728, an action for identity protection is initiated. Step S728 includes an instruction to deny responsibility for the debt and an instruction to inform authorities of the identity theft. The system provider 102 submits information to online forms provided by government entities, including the Fair Trade Commission, the Federal Bureau of Investigation, and Attorneys General offices to declare that the user is a victim of identity theft and which items on the credit reports have been declared by the user to be related to the identity theft.

The system provider 102 reports the appropriate information to the credit reporting bureaus 118. The user instructs the credit reporting bureaus 118 (through the system provider 102) to block new credit accounts for a limited time (for example, six months).

Figure 15:
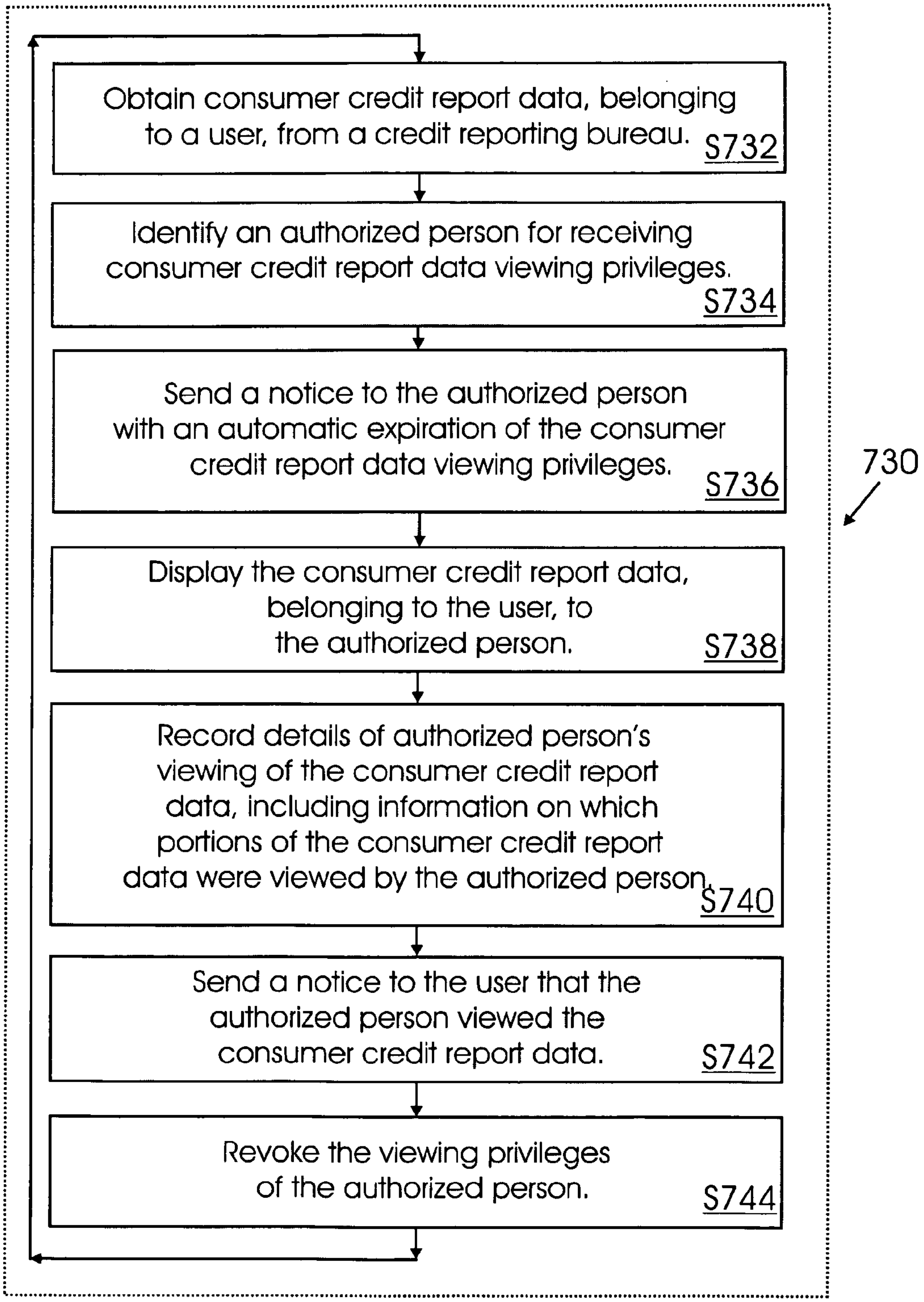
FIG. 15 is a flow chart of a method for providing credit credentials for authorized distribution of consumer credit report data, according to another embodiment of the present invention.

FIG. 15 shows a flow chart of a method 730 for providing credit credentials for authorized distribution of consumer credit report data. In step S732, user's consumer credit report data is obtained from a credit reporting bureau 118. In step S734, an authorized person (or entity) is identified who has viewing privileges for viewing consumer credit report data. In step S736, a notice is sent to the authorized person with an automatic expiration of the consumer credit report data viewing privileges. Hence, the authorized person is allowed to view the consumer's credit data for a limited time.

This data available for viewing is deemed by the system provider 102 as the electronic property of the user. When a consumer requests credit, an inquiry indication is entered in the consumer's credit report for each instance of a formal credit request. Often, a consumer requests credit from several entities to seek the most favorable rates available on the open market. Unfortunately, numerous credit inquiry indications on a consumer's credit report usually negatively impacts the consumer's ability to obtain favorable credit rates and the consumer's credit score.

To facilitate the consumer's search for favorable terms, the system provider 102 obtains a copy of the consumer's credit report from a credit reporting bureau 118 for distribution to potential credit grantors designated by the consumer.

Because a copy of the consumer's credit report is only requested once (by the system provider 102), only this one inquiry is indicated on the consumer's credit report. Thus, the consumer instructs the system provider 102 to authorize a plurality of selected potential credit grantors to view the copy of the consumer's credit report.

Continuing with FIG. 15, in step S738, the user's consumer credit report data is displayed to the authorized person. The authorized person may view the user's consumer credit report data, for a limited time. The authorized person is allowed to view the data at a secure website.

In step S740, the details of the authorized person's viewing of the consumer credit report data are recorded, including information on which portions of the consumer credit report data was viewed by the authorized person.

In step S742, a notice is sent to the user that the authorized person viewed the consumer credit report data. In step S744, the viewing privileges of the authorized person are revoked.

If the user chooses to revoke the viewing privileges of the authorized person, the user can request a confirmation of the revocation of the authorized person's viewing privileges.

After step S744, the user elects to return to step S732 of the method 730 to identify another person authorized to view the user's credit data and the process continues.

Figure 16:
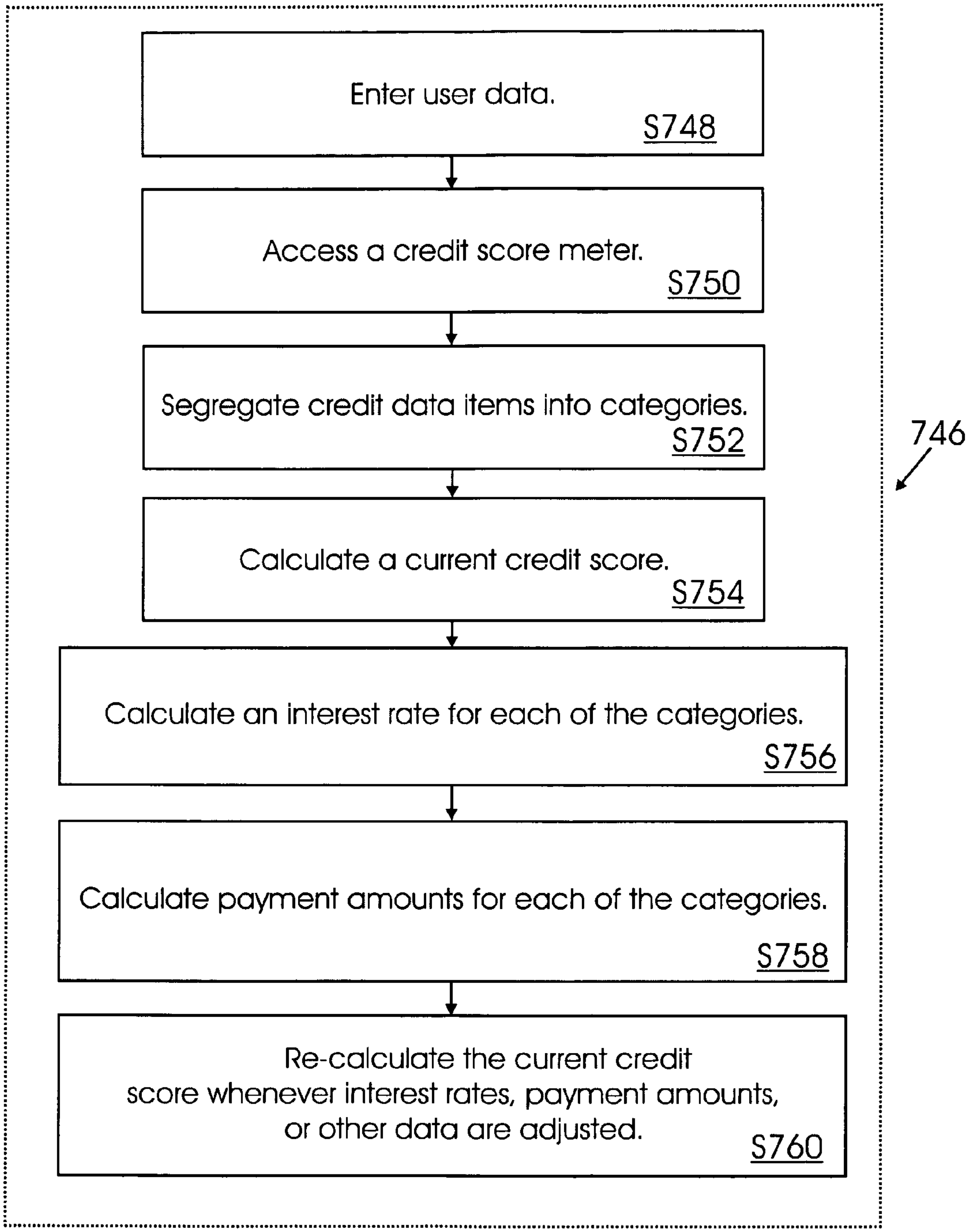
FIG. 16 is a flow chart of a method for a method for simulating a current credit score, according to another embodiment of the present invention.

FIG. 16 shows a flow chart of a method 746 for simulating a current credit score. In step S748, user data is entered. In step S750, a credit score meter 218 (shown in FIG. 5) is accessed by the user.

In step S752, credit data items are segregated into categories (such as mortgage, auto loan, and credit cards) and in step S754, a current credit score is determined.

Continuing with FIG. 16, in step S756, a current interest rate or an estimated current interest rate is calculated for each of the categories. Current interest rates or estimated current rates may be automatically calculated for the benefit of the user. Calculated results may be displayed such as at a secure website on a computer monitor.

In step S758, the process calculates corresponding payment amounts for each of the categories. In step S760, the current credit score is re-calculated whenever interest rates, payment amounts, resulting savings, or other data are adjusted.

For example, if a credit score is increased, then an available interest rate may be decreased. The system provider 102 also makes recommendations to the user regarding particular financial institutions for depositing funds for greater savings and financial returns.

Figure 17:
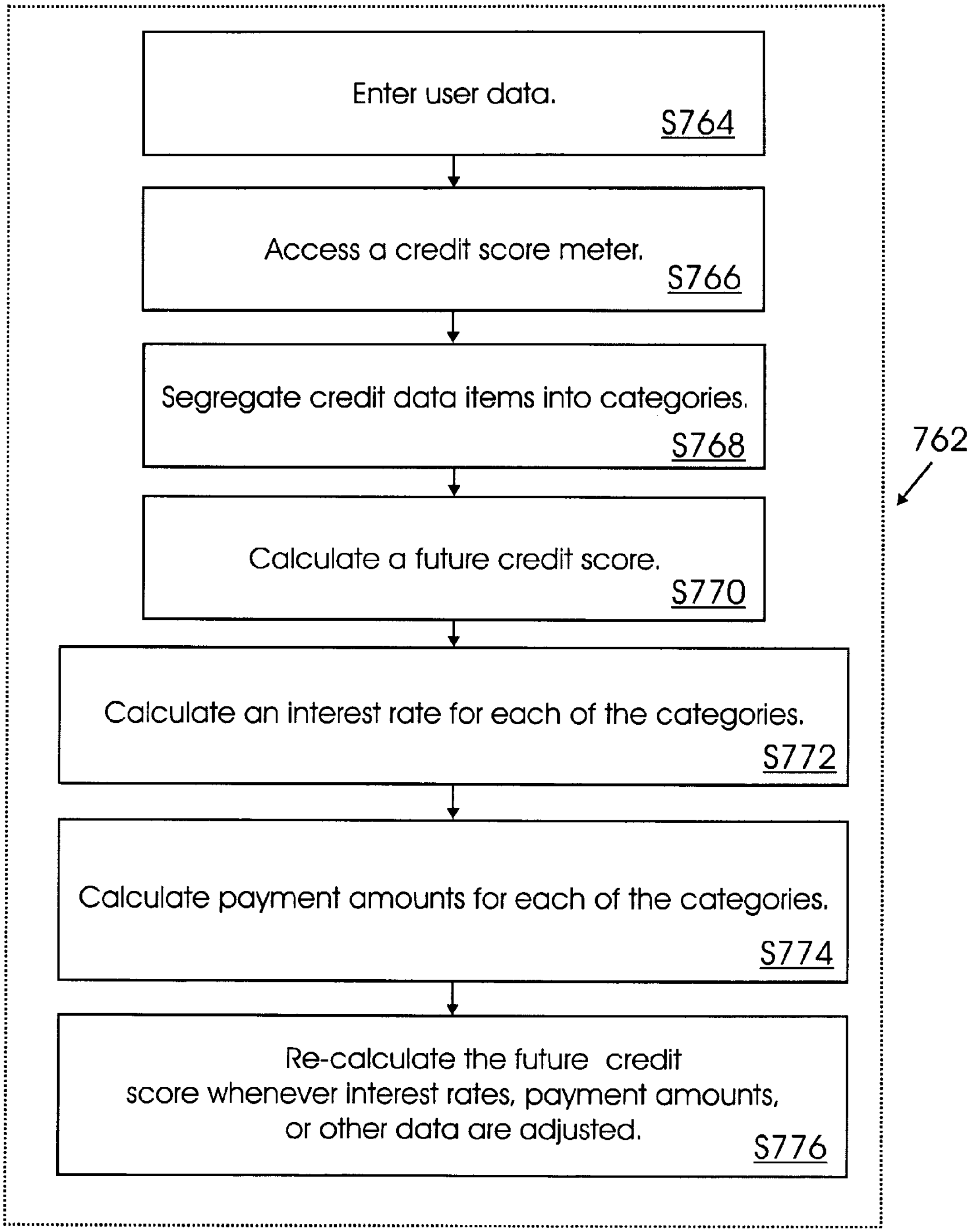
FIG. 17 is a flow chart of a method for predicting a future credit score, according to another embodiment of the present invention.

A flow chart of a method 762 for predicting a future credit score is shown in FIG. 17. In step S764, user data is entered. In step S766, a credit score meter 218 (shown in FIG. 5) is accessed. In step S768, credit data items are segregated into categories. Step S770, calculates or predicts a future credit score.

In step S772, an interest rate for each of the categories is calculated. The interest rate may be an estimated future interest rate.

In step S774, payment amounts for each of the categories are calculated. In step S776, the future credit score is re-calculated whenever interest rates, payment amounts, or other data are adjusted. Calculated results may be displayed, such as at a secure website on a computer monitor.

Continuing with FIG. 17, a user can manually move or adjust a current or future credit score. The user's manual movement or adjustment of the current or future credit score causes the credit score meter 480 (shown in FIG. 10) to automatically provide a re-calculation of pertinent user data (for example, present and future interest rates, present and future payment amounts, and resulting savings).

For example, if a consumer predicts obtaining an auto loan, the consumer may enter data into the credit score meter 480 (shown in FIG. 10) to indicate the auto loan interest rate and the payment amounts.

Based upon the payment amounts' affect on the consumer's debt-to-income ratio, the credit score meter 480 (shown in FIG. 10) simulates a corresponding increase or decrease of the consumer's credit score (re-calculating the credit score). The simulated credit score may be considered to be a predicted future credit score.

Figure 18:
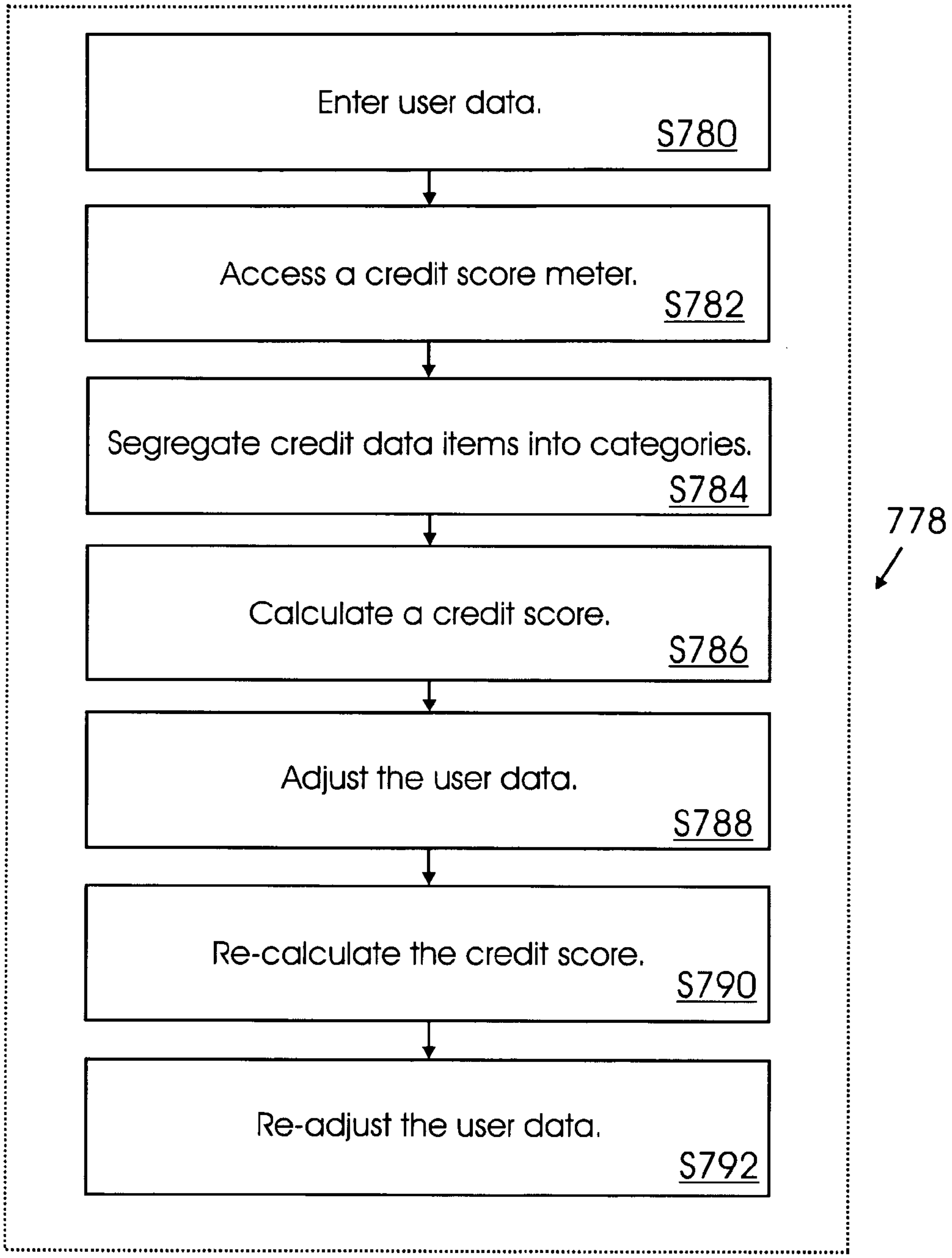
FIG. 18 is a flow chart of a method for calculating a credit score, according to another embodiment of the present invention.

FIG. 18 shows a flow chart of a method 778 for calculating a credit score. In step S780, user data is entered. In step S782, a credit score meter 218 (shown in FIG. 5) is accessed. In step S784, credit data items are segregated into categories. In step S786, a credit score (for example, a current credit score or a future credit score) is calculated.

Continuing with FIG. 18, in step S788, the user data is adjusted, while step S790, recalculates the credit score. In step S792, the user data is re-adjusted, for example, if payment amounts are reduced, a consumer's debt-to-income ratio may be correspondingly decreased, and the credit score may be increased.

Figure 19:
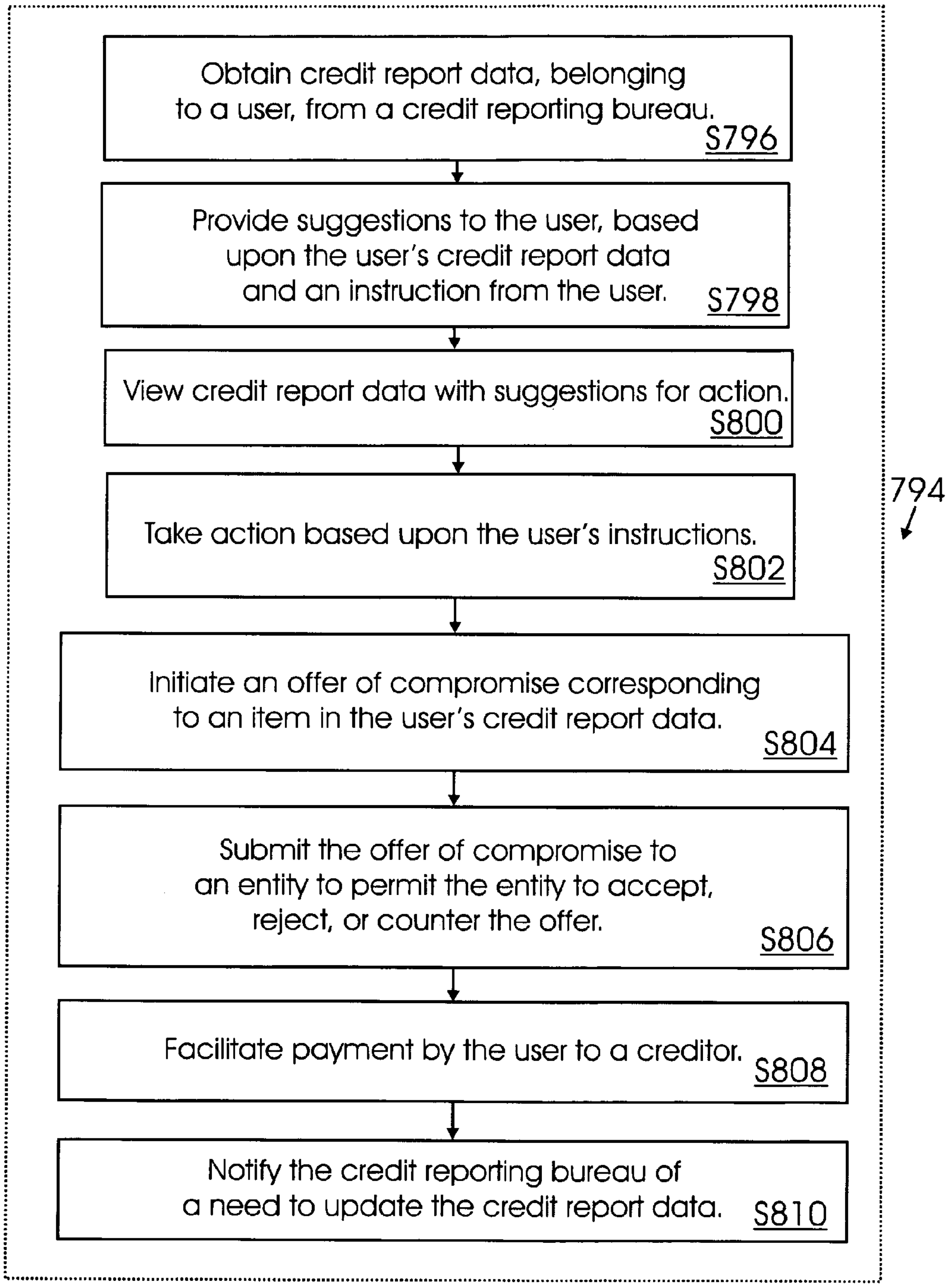
FIG. 19 is a flow chart of a method for managing credit report data, according to another embodiment of the present invention.

FIG. 19 shows a flow chart of a method 794 for managing credit report data. The method 794 begins with a step S796 of obtaining credit report data, belonging to a user, from a credit reporting bureau 118.

In step S798, suggestions are provided to the user, based upon the user's credit report data and an instruction from the user. Suggestions for user actions to improve the credit score may be also made. For example, a user is suggested to improve a credit rating by moving a large credit balance from one account to another account. Another suggestion may involve showing the user where mistakes may be made in banking accounts (such as late fees and not-sufficient funds fees).

In step S800, credit report data (such as a credit report) is viewed with possible suggestions for action and in step S802, action is taken based upon the user's instructions.

Continuing with FIG. 19, the method 794 further includes a step S804 for initiating an offer of compromise corresponding to an item in the user's credit report data.

In step S806, the offer of compromise is submitted to an entity (such as a creditor, collection agency, contract assignee, and the like) to permit the entity to accept, reject, or counter the offer. The entity may be any entity authorized to report information to a credit reporting bureau 118, such as a creditor, landlord, financial institution, collection agency, database provider, and the like.

In step S808, payment by the user to a creditor is facilitated. For example, the user may pay an amount to the system provider 102. Then the system provider 102 may forward the amount to the creditor. The system provider 102 may also ensure that the creditor modifies the credit report data of the user with the credit reporting bureau 118.

In step S810, the credit reporting bureau 118 is notified, to update and upgrade the credit report data of the user.

Figure 20:
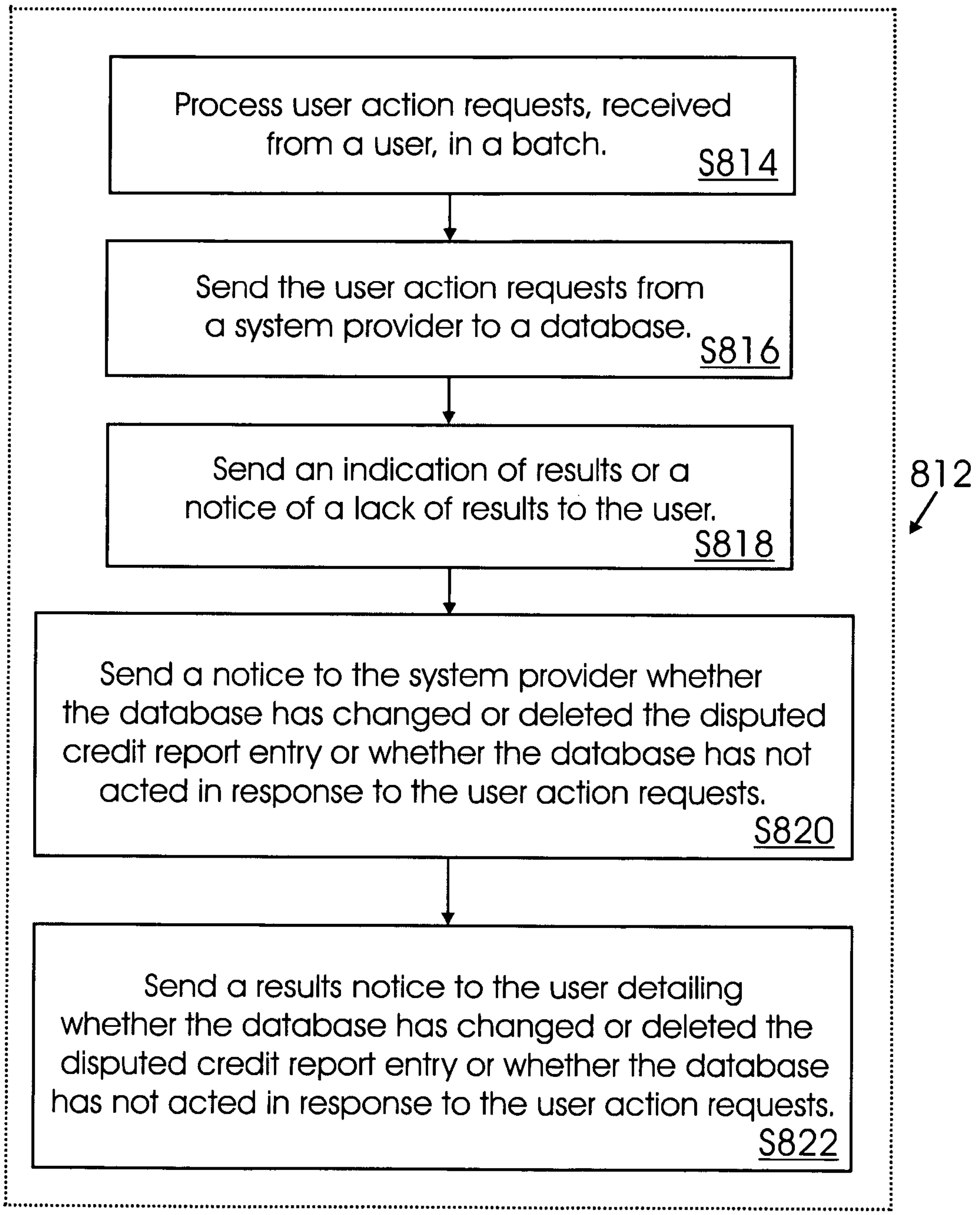
FIG. 20 is a flow chart of a method for sending user action requests to a database, according to another embodiment of the present invention.

FIG. 20 shows a flow chart of a method 812 for sending user action requests to a database. The database may be a database of a credit reporting bureau 118 (or the creditor 114A). At least one of the user action requests is a user action request for verification regarding a disputed credit report entry.

In step S814, user action requests that are received from a user are processed. The requests may be received in a batch. In step S816, the user action requests are sent from system provider 102 to a database.

The user action request may comprise of an offer of compromise, a request to validate a debt, and a request for an interest rate reduction. For example, a user may use the system 100 (shown in FIG. 4A) to request that the credit reporting bureau 118 (shown in FIG. 4A) seek validation of a reported debt from the corresponding creditor.

If the user elects to dispute a credit report entry, the credit reporting bureau 118 is contacted directly by the system provider 102 (see FIG. 4A). Alternatively, the user may choose to dispute the credit information with the creditor (through the system provider 102) instead of contacting the credit reporting bureau 118.

Still following FIG. 20, in step S818, an indication of results or a notice of a lack of results are sent to the user.

In step S820, a notice to the system provider 102 is sent whether the database has changed or deleted the disputed credit report entry or whether the database has not acted in response to the user action requests. In step S822, a results notice to the user is sent, detailing whether the database has changed or deleted the disputed credit report entry or whether the database has not acted in response to the user action requests.

The system provider 102 (shown in FIG. 4A) allows a user 104 (shown in FIG. 4A) to post a response to a declined disputed item for transmittal to a credit reporting bureaus 118. The system provider 102 (shown in FIG. 4A) may use an escalation process where a declined disputed item is disputed again with increased emphasis.

Figure 21:
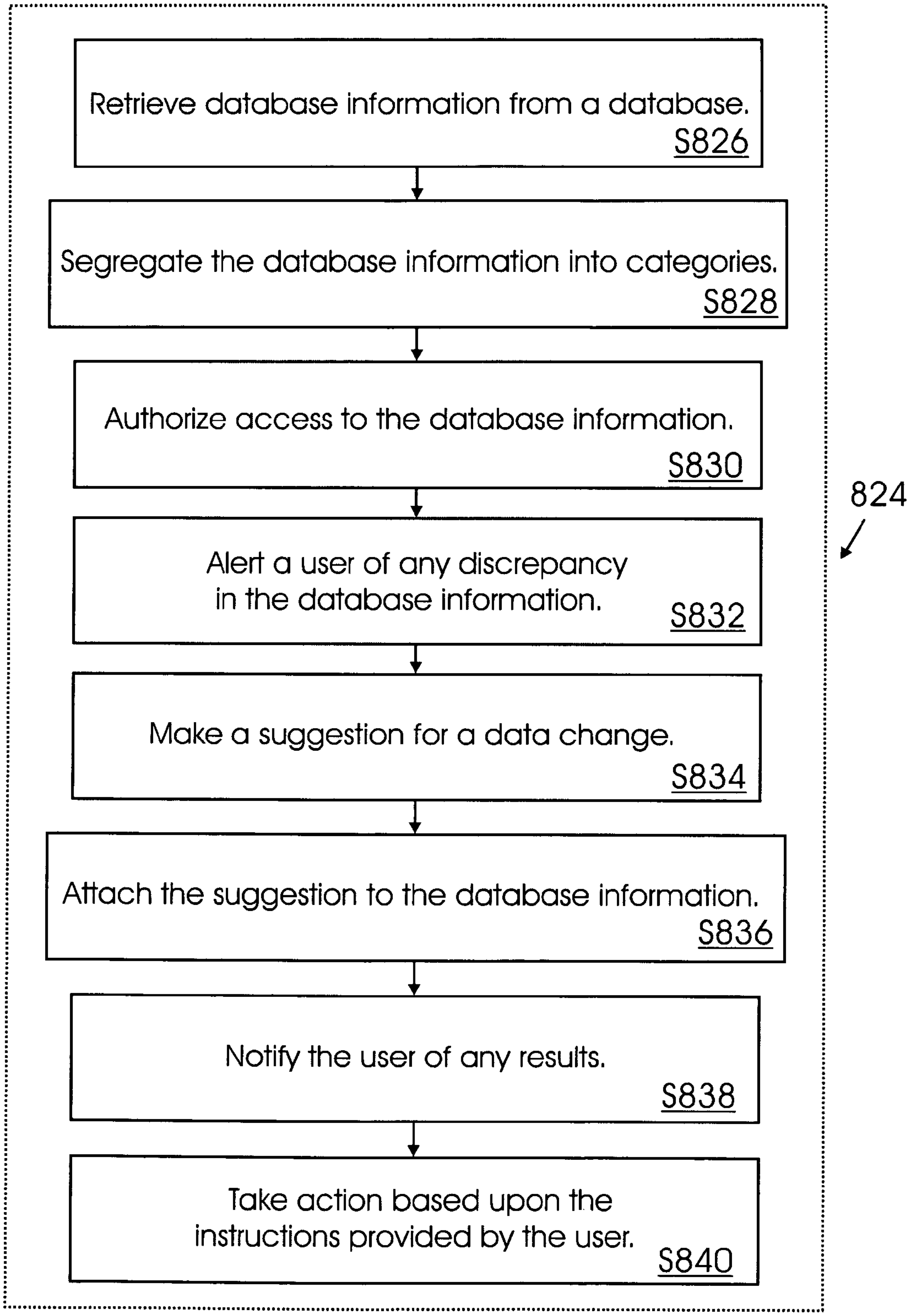
FIG. 21 is a flow chart of a method for suggesting a'data change after data analysis, according to another embodiment of the present invention.

FIG. 21 shows a flow chart of a method 824 for suggesting a data change after data analysis. The method 824 includes a step S826 for retrieving database information (data) from a database. In step S828, the database information is segregated into categories, while in step S830; access to the database information is authorized.

In step S832, a user is alerted of any discrepancy in the database information. System provider 102 determines which credit report data items to include in an alert to the user. The user may decide, after receiving an alert, that a credit report entry should be disputed as inaccurate, outdated, unverifiable, or possible identity theft.

For example, if three or more late payments are reported (including charge offs and collections), yet the credit score is about 650, then the system provider 102 may make a suggestion that the late payments do not belong to the user. The system provider 102 may present the user with a label of "NOT MINE" or "ID THEFT" in such a situation.

If only one late payment is reported and the score is above 650, the system provider 102 may make a suggestion that the reporting of the one late payment is erroneous. In this situation, the system provider 102 may present the user with a notice labeled "NEVER LATE."

If a 90-day late payment is reported but no 30-day or 60-day late payments are reported, then the system provider 102 may make a suggestion that the reporting of the 90-day late payment is erroneous. The system provider 102 may present the user with a label of "NEVER LATE2" in such a situation. Similarly, if a 60-day late payment is reported but no 30-day late payments are reported, then the system provider 102 may make a suggestion that the reporting of the 60-day late payment is erroneous. In such a situation, the system provider 102 may present the user with a notice labeled "NEVER LATE3."

If a 90-day late payment is reported and a 60-day late payment is reported, but no 30-day late payment is reported, then the system provider 102 may make a suggestion that the reporting of the 90-day late payment and the 60-day payment is erroneous. Then, the system provider 102 may present the user with a notice labeled "NEVER LATE4."

Likewise, the system provider 102 may make a suggestion that a 90-day late payment report and a 30-day late payment report are erroneous if no 60-day late payment is reported. Then the system provider 102 may present the user 104 with a notice labeled "NEVER LATE5."

If a credit balance is reported and the balance is about thirty percent (30%) of the total balance due and the total balance due is below a certain amount (for example, US$10,000), then the system provider 102 may alert the user to take note of the item as potentially paid in full. The system provider 102 may present the user with a notice labeled "PAID IN FULL."

If a reported activity date is earlier than a particular time period (for example, two years) and the reported balance is zero, then the system provider 102 may alert the user to take note of the item as potentially a closed account. The system provider 102 may present the user with a notice labeled "ACCOUNT CLOSED."

The system provider 102 may alert the user of other discrepancies in the credit reports. For example, the system provider 102 may alert the user of a mortgage foreclosure although the data indicates that the account was paid in full. The system provider 102 may alert the user of an item reported as discharged in bankruptcy although the data indicates that the account has a balance due. The system provider 102 may alert the user of an item reported as having a zero balance although the data indicates that the account has not been closed.

The system provider 102 may alert the user of erroneous items such as multiple addresses, multiple names, multiple spouses, multiple social security numbers, multiple employers, and the like. The system provider 102 may alert the user 104 of any inquiries that are questionable, such as back-to-back inquiries.

The system provider 102 may alert the user 104 of duplicate items reported as separate credit accounts. For example, the system provider 102 may determine duplicate credit items by exact matching, without consideration of date. Additionally, the system provider 102 may alert the user of similar accounts reported as separate credit accounts. For example, the system provider 102 may determine similar credit items by checking for account numbers that are similar (for example, "9329946" and "9329446"), and the respective dates reported are within 90 days of each other.

The system provider 102 may alert the user of collections items, such as unreported sales of a collection account from one collection agency to another collection agency or collection accounts established without prior credit history with the reported original creditor. The system provider 102 may determine such information by looking for open accounts reporting with zero balances and multiple addresses, multiple names, multiple spouses, multiple social security numbers, multiple employers, and the like.

The system provider 102 may alert the user of an item reported in one credit reporting bureau 118 that is substantially different from how the item is reported with another credit reporting bureau 118. For example, one credit reporting bureau 118 may report a credit account as having a large balance owed while another credit reporting bureau 118 may report the same account as paid in full.

The system provider 102 may alert the user of an item reported as a closed account although the data indicates that the account has a balance due. Additionally, the system provider 102 may alert the user of credit item descriptor mismatches.

For example, sometimes an automobile purchase loan is described as a home purchase loan (such as a mortgage or trust deed agreement) or vice versa. One way to look for these instances would be to flag each automobile loan account with a balance over US$100,000 as possibly being erroneously categorized. Similarly, any mortgage loan account that lists "ACME Auto Financing Partners" as a lien holder could be flagged.

Continuing with FIG. 21, in step S834, system provider 102 makes a suggestion for a data change. The step S834 may also record the suggestion (such as paying off credit card balances).

In step S836, the suggestion is attached to the database information. In step S838, the user is notified of the results. The user may provide instructions in response to the suggestion. In step S840, action is taken based upon the instructions provided by the user.

Figure 22A:
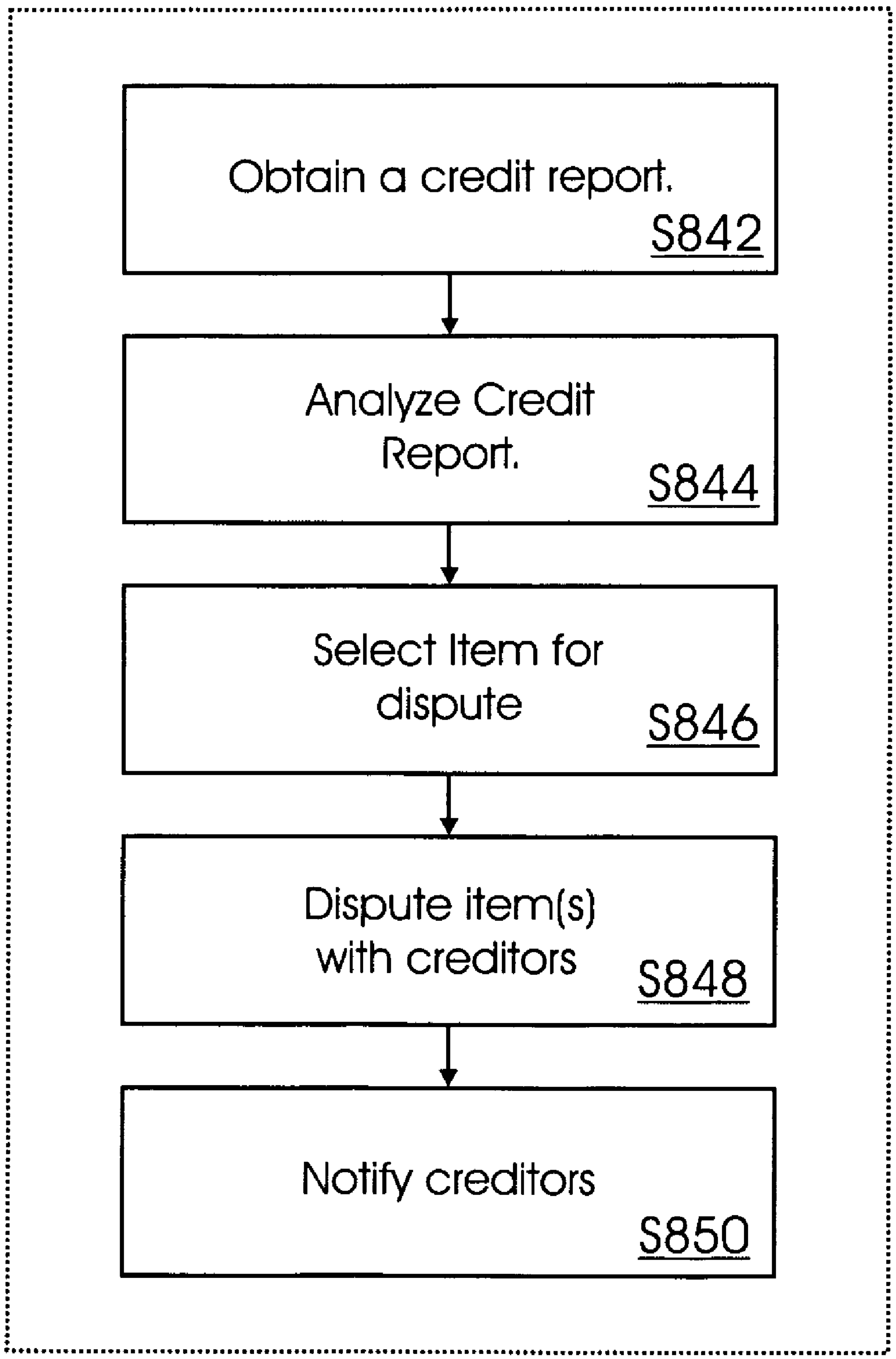
FIG. 22A is a flow chart of a method for disputing credit report items directly with a creditor, according to one aspect of the present invention.

FIG. 22A shows a flow diagram for disputing credit report errors directly with a creditor 114A, according to one aspect of the present invention. Turning in detail to FIG. 22A, in step S842, a user's credit report is provided to the user.

In step S844, the credit report is analyzed, as described above to ascertain items that a user wants to dispute.

In step S846, items for dispute are selected.

In step S848, the selected items are disputed directly with the creditors 114A. In one aspect, a creditor database is accessed directly by system provider 102 to analyze the disputed items with respect to the information stored by the creditor. In this aspect, the credit bureau 118A is not inundated with credit dispute inquires from consumers directly.

In step S850, the creditor 114A notifies the credit bureaus that an item(s) on a consumer's credit report has been disputed. The creditor 114A also notifies (via system 102 or directly), when a dispute regarding a credit item has been resolved.

Figure 22B:
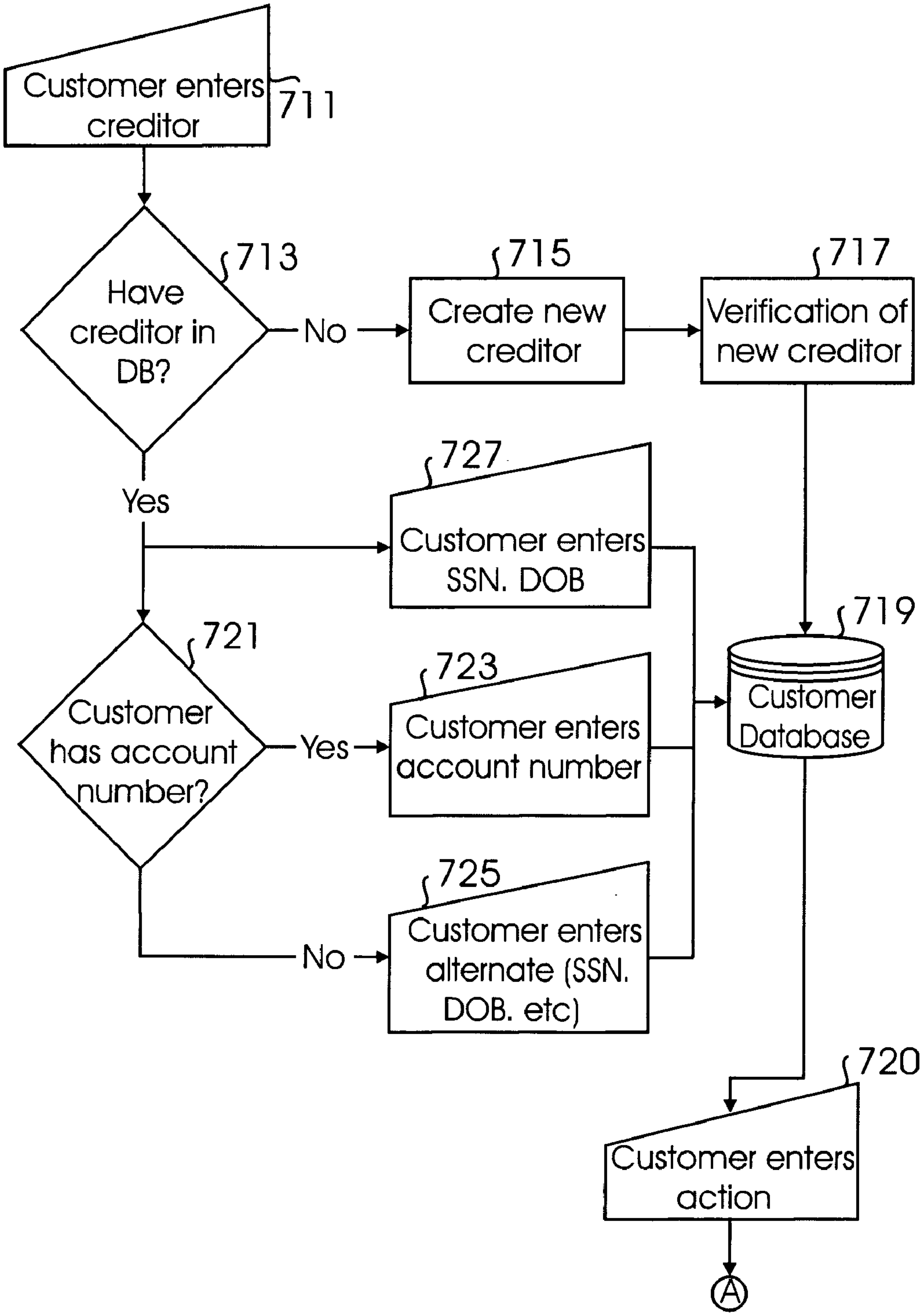
FIG. 22B shows a flow chart that allows a consumer to file an independent action against a creditor, according to one aspect of the present invention.

FIG. 22B shows a flow chart that allows a user to file an independent action against a creditor, according to one aspect of the present invention. To request an action, the user 104 enters the name of the creditor 711 and the system provider 102 verifies that the creditor is in the customer database 713. If the creditor is not located in the database, the user enters the new creditor information 715, the information is verified 717 and the new creditor is added to the customer database 719. If the creditor is in the database, the system verifies information about the user 104 depending on the type of action requested. When the action requested is reporting an error on a credit report or proposing an offer of settlement, the system verifies that the user has a valid account number 721. If the user has an account number, the user 104 enters the account number 723. However, if the user 104 does not have an account number, the user 104 can enter alternate information such as a social security number and date of birth 725. Once the user 104 has entered the information, the customer database 719 verifies the information. When the action requested is reporting identification theft, the user 104 enters the social security number and date of birth 727 and the information is verified by the customer database 719.

Next, the user enters the action being requested 720 which is then entered into the customer database 719. The system provider 10 then determines if the request is frivolous 729 (as described above with reference to FIG. 5C) and if the request is not frivolous, the system validates the request with the creditor 731 (as described above with reference to FIG. 5D) before processing the request 733 (as described above with reference to FIG. 6C). After the request has been processed, the credit bureaus 735 are notified and a letter 737 is sent to the creditor 739 if the user is requesting an error be fixed, thus fulfilling the user's requested action 736. If the requested action is a proposal for settling a debt, the proposal is sent to the creditor 739 and if the requested action is reporting identification theft, the Federal Trade Commission is notified 741 as well as the creditor.

Figure 23A:
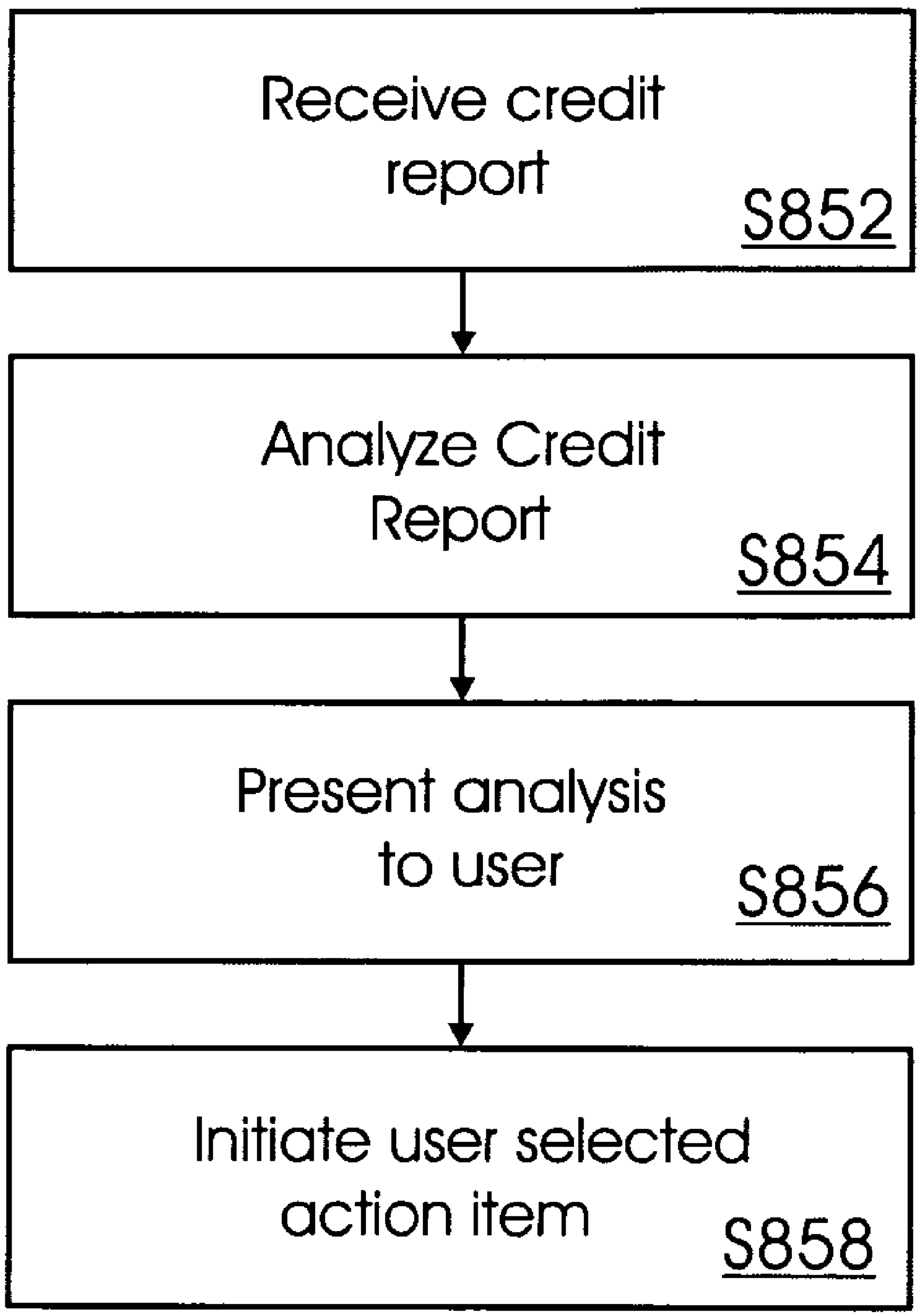
FIG. 23A shows yet another flow diagram of executable process steps for user credit report analysis, according to one aspect of the present invention.

FIG. 23A shows yet another flow diagram of executable process steps for user credit report analysis, according to one aspect of the present invention. Turning in detail to FIG. 23A, in step S852, system provider 102 receives a user credit report from multiple credit bureaus, for example, Experian®, Transunion® and Equifax®.

In step S854, system provider 102 analyzes the credit report. The analysis provides a summary of most likely items of error, items that could be identity theft related or inconsistencies between the bureau reports; for example, Experian may report an item on a credit report (for example, "account closed"), while Equifax may still report that item to be active.

In step S856, the analysis is provided to the user. The user is provided with a user interface (similar to that described above) and in step S858, the user is given plural options to resolve the problems/challenges highlighted in the analysis. For example, if certain items are in error, then the user can initiate a "dispute entry" option to dispute the item. If an entry is related to identity theft, then the user can declare identity theft and initiate actions to notify the necessary authorities of the identity theft.

Figure 23B:
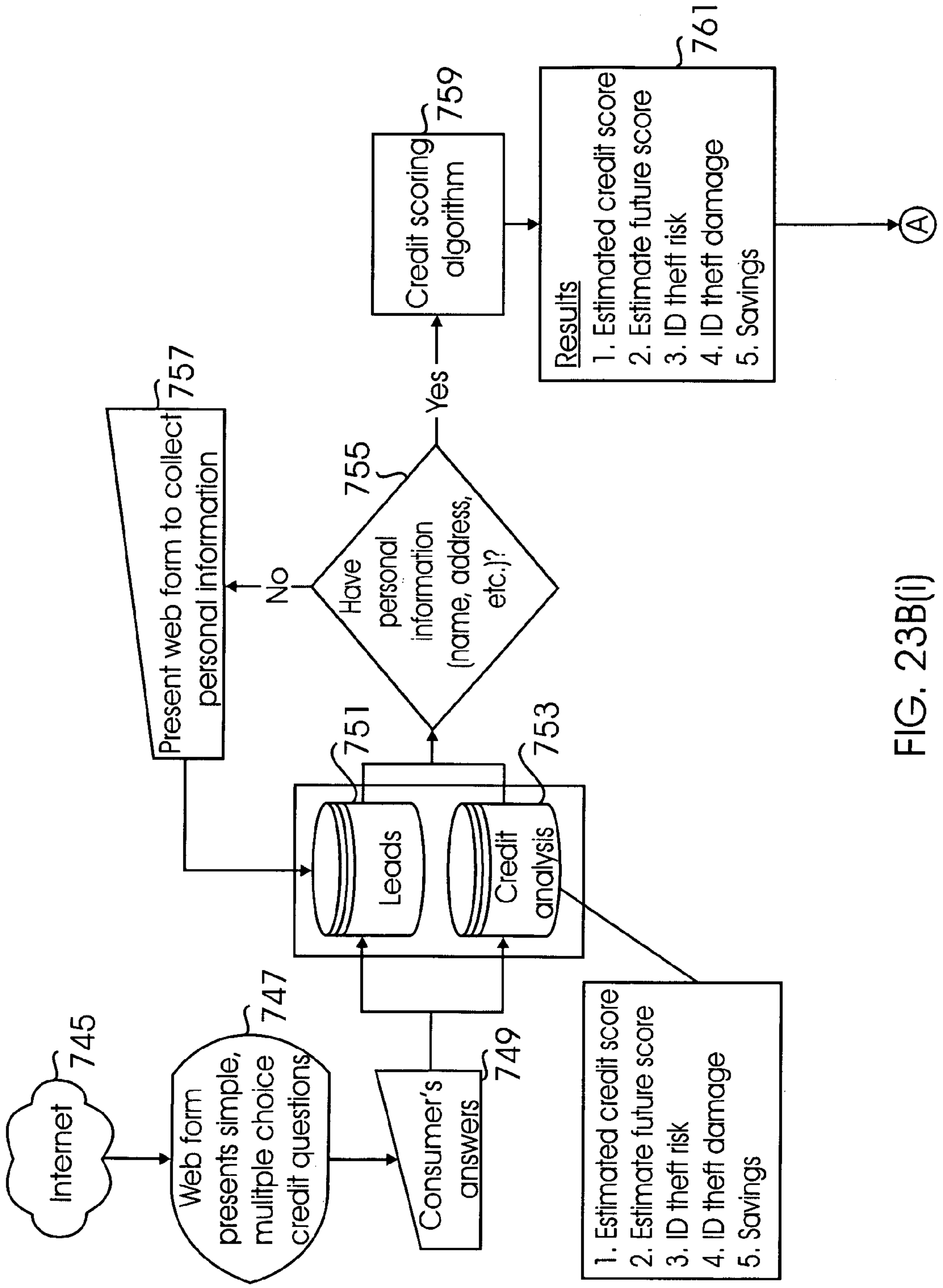
FIG. 23B shows a flow chart of a method of analyzing a consumer's credit report, according to one aspect of the present invention.

FIG. 23B shows a flow chart of a method of analyzing a user's credit report, according to one aspect of the present invention. To receive a credit analysis, the user accesses the system through the Internet 745 and answers simple, multiple choice credit questions presented on a web form 747. Examples of questions are (1) what is the number of ID Theft related items on your credit report?; (2) What do you believe your Credit Status is?; (3) How many Credit Cards (Including department, but not debit or prepaid cards)?; and (4) Combined Balance Owed on your Credit Cards?. Based on the answers to the questions, the user's estimated credit score, estimated future score, identification theft risk, potential identification theft damage, savings, and various other financial information about the user 104 is calculated. This information is then stored in a leads/customer database 751 providing a database of potential leads or customers to enroll in the system. In addition to the leads/customer database 751, the information is also stored in a credit analysis database.

Next, the system provider 102 determines if the user's personal information, such as name and address, has been entered or determines if the user's personal information is not needed 755. It is possible that the system provider 102 will never request the information, will request the information at some later time from the user, get the information from a third party or request the information when the user's signs up to be a member. If the system provider 102 wants the user's personal information, a web form is presented to the user 104 to collect the information 757. The information is entered into a credit scoring algorithm 759 which then displays the user's estimated credit score, estimated future score, identification theft risk, identification theft damage and savings to the user by correcting the problem 761.

Next, the system provider 102 inquires if the user 104 would like to sign up as a member 763. If the user 104 decides to sign up as a member, the sign up process is complete 765. If the user 104 decides not to sign up as a member, information from the credit analysis database 753 and leads database 751 is sent to a marketing/leads analysis engine 752. The marketing/leads analysis engine 752 then determines where to store the user's information. If the user is a good candidate for improving a credit score, the user's information is stored in a target leads base on credit storage 769. If the user has a high potential of identity theft, the user's information is stored in a target leads base on identity theft 771. If the user has a high potential for improvement, the user's information is stored in a target leads base on potential improvement 773.

Figure 24A:
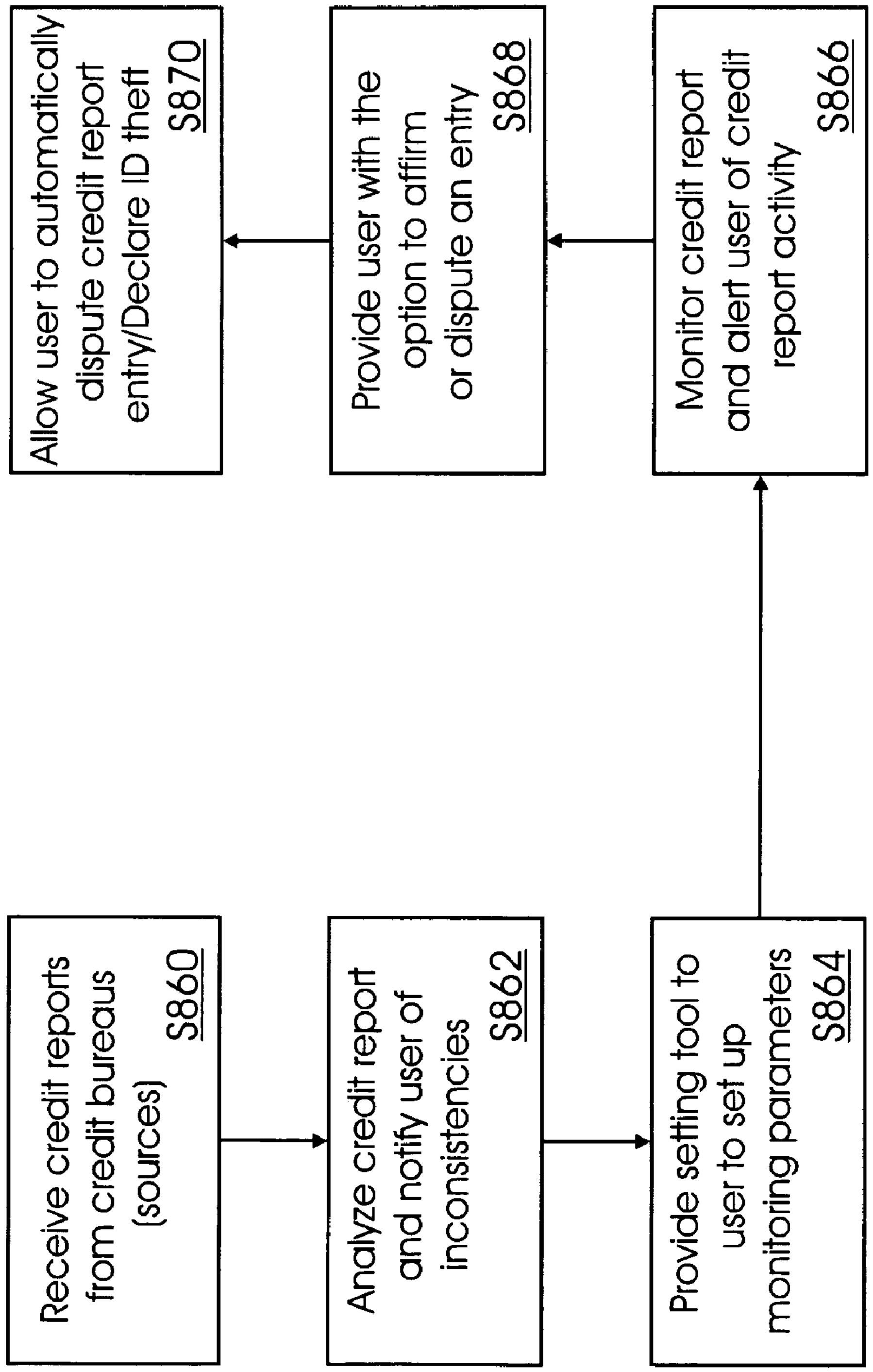
FIG. 24A shows a flow diagram that allows a user to set certain parameters for monitoring credit report(s), according to one aspect of the present invention.

FIG. 24A shows a flow diagram that allows a user to set certain parameters for monitoring their credit report, according to one aspect of the present invention. Turning in detail to step S860, a user's credit report is received. In step S862, system provider 102 analyzes the credit report (similar to step S854, FIG. 23) and the user is notified of any inconsistencies, errors or any other item that needs user's attention.

In step S864, the user is provided a setting tool so that the user can set up certain parameters based on which a user is informed of any activity that occurs on a user's credit report. For example, a user can set up a maximum account balance value for a credit card, i.e. a user can set up a dollar value for a credit card (for example, $10000.00), a maximum charge amount for a credit card (for example, a charge greater than $2000.00 per transaction), a user can set up a maximum number of accounts that can be opened within a certain period (for example, not more than 2 accounts per month), or a user can define the number of credit related inquires (i.e. if there are more than a certain number of inquires, for example, 3). It is noteworthy that these examples have been provided to illustrate the adaptive aspects of the present invention and are not intended to limit the process flow to any particular parameter or setting. It is also noteworthy that system provider 102 may use certain default settings/parameter values, which when violated (or if they occur), a user is alerted (using alert module 102A).

In step S866, the user credit report is monitored for activities. The activities are compared to the parameters set by the user and/or the default parameters for system provider 102 (jointly referred to as "user parameters"). If an activity occurs that is beyond a user parameter, then the user is notified via email or any other means. Various activities can trigger user alerts, for example, new entries on a credit report, new credit inquires, or any substantial charges and other activities.

In step S868, the user is provided an interface to either affirm an entry or dispute the entry.

In step S870, if the user selects to dispute the entry, then the user is automatically taken to a dispute resolution screen (similar to the screen in FIG. 8 and the screen shots in FIGS. 36-39). If the user elects to declare identity theft, then the user is provided with the interface to declare identity theft (similar to identity shield as shown in FIG. 8 and the screen shots in FIGS. 32-35). This allows the user to notify the authorities/creditors of the identity theft.

Figure 24B:
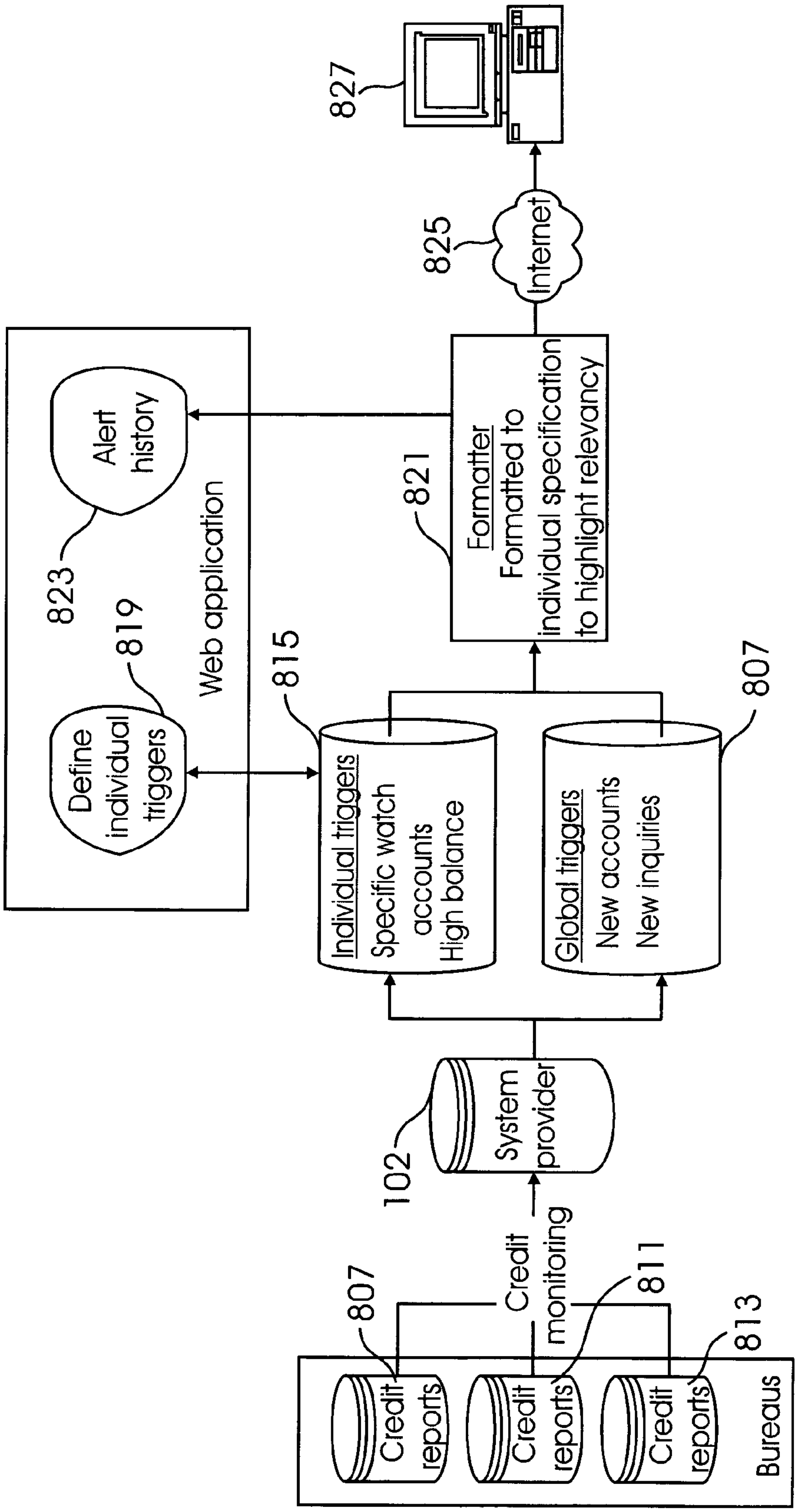
FIG. 24B shows a flow chart of a method of monitoring a consumer's credit reports and providing the user with an alert if there is an addition, subtraction or change on any credit report, according to one aspect of the present invention.

FIG. 24B shows a flow chart of a method of monitoring a user's credit reports and providing the user with an alert if there is an addition, subtraction or change on the user's credit report, according to one aspect of the present invention. The credit reports 809, 811, 813 from credit bureaus 807 are monitored for any change and if there is a change, the change is provided to system provider 102. System provider 102 sends the information to an individual filter 815 and a global filter 817. Filters 815 and 817 have been provided with rules or triggers 819 by the user 104. Triggers can include, but are not limited to, activity on specific accounts, a high balance, new accounts and new inquiries. A user 104 can customize an alert so the user 104 will only be notified of particular events or changes. When the user 104 receives the alert, the user 104 can report back to the creditor that the information reported is correct. This allows the creditor to know that they weren't the victims of identify theft. If a trigger has occurred, the information is formatted 821 into an alert based upon the user's 104 specifications as to relevancy. Relevancy is determined by prior relevancies stored in the user's alert history 823. Once the alert has been formatted, it is sent via the Internet to a user's computer 827 to notify the user.

Figure 25:
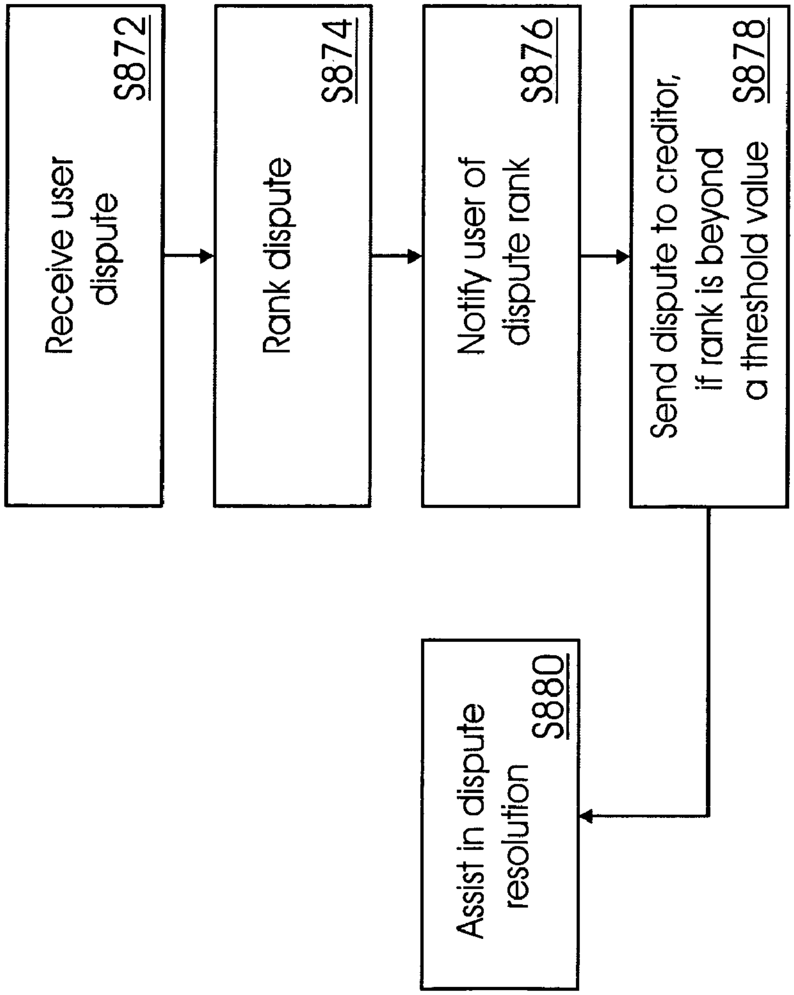
FIG. 25 shows a process flow diagram where "pre-decisioning" is used to accept and resolve customer disputes, according to one aspect of the present invention.

FIG. 25 shows a process flow diagram where "pre-decisioning" is used to accept and resolve user disputes, according to one aspect of the present invention. Turning in detail to FIG. 25, in step S872, a user dispute based on a credit report entry is received.

In step S874, system provider 102 ranks the user dispute based on plural factors. For example, system provider 102 uses historical data (for example, database 610 or interfacing directly with creditor database) to determine if user 104 has filed frivolous claims; or if user 104 may have made a mistake after verifying with the creditor and other similar factors.

In step S876, system provider 102 provides the user with a rank. The user is also notified whether the dispute will be submitted to the creditor or not. The user is also provided with the reason as to why a dispute won't be presented to the creditor. This provides the user with an opportunity to give more information to system provider 102 so that the dispute request and rank can be re-analyzed.

If the dispute rank is greater than a pre-programmed threshold value (that can be changed), then the dispute is submitted to the creditor in step s878.

In step S880, system provider 102 assists in resolving the dispute.

Figure 26:
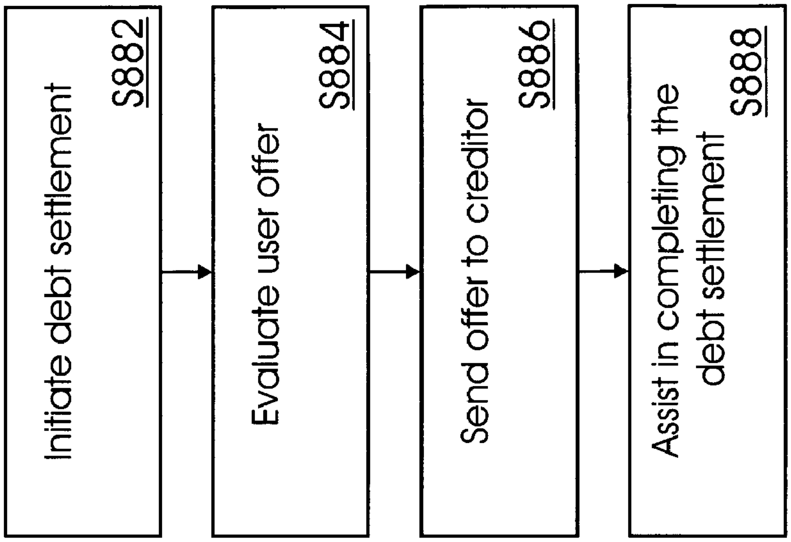
FIG. 26 shows a process flow diagram for debt resolution, according to one aspect of the present invention.

FIG. 26 shows a process flow diagram for debt resolution, according to one aspect of the present invention. Turning in detail to FIG. 26, in step S882, the user initiates a debt relief settlement action, using a service action button.

In step S884, system provider 102 ranks a user offer (similar to the ranking process of step S874 (FIG. 25)). If the user offer meets the threshold value, then the offer is sent to the creditor in step S886. In step S888, system provider 102 assists in the negotiation process until the debt is settled.

User Interface:

FIGS. 27-39 provide screen shots (user interfaces) that allows a user to initiate debt settlement with a creditor, declare identity theft or initiate a dispute, as described in the foregoing process flow diagrams. It is noteworthy that the screen shots are merely to illustrate the adaptive aspects of the present invention and are not intended to limit the invention to the user interface layout and "look and feel".

FIG. 27 shows a screen shot where a user can select debt settlement 890, a direct action 892 or declare identity theft 894 after viewing the user credit report 896. The credit report lays out plural entries from all plural credit bureaus. The user can select a particular entry for each bureau.

In FIG. 27, the user selects the debt settlement option 890. FIG. 28 shows the screen shot where a user has three choices after selecting the debt settlement option: debt resolution 898A, "validate this debt" 898B and interest rate reduction 898C.

The user can select the debt resolution option 898A by simply clicking on that tab. The user can provide a reason for debt reduction 900A and action is taken when the user clicks on "Take Action" button 900.

FIG. 29 shows the screen shot where the user validates a particular debt and system provider 102 communicates with the creditor directly verifying that a particular debt is a valid debt. The debit is validated by the user simply by clicking on the "take action button" 902.

FIG. 30 shows the screen shot that allows a user to request an interest reduction from a creditor. The request is communicated to the creditor directly. The user enters the interest rate in the user interface that is shown in FIG. 30 and provides a reason in the segment shown as 906. Thereafter, the user clicks on "Take Action" button 908 and the user request for interest rate reduction is sent to the creditor.

Figure 31:
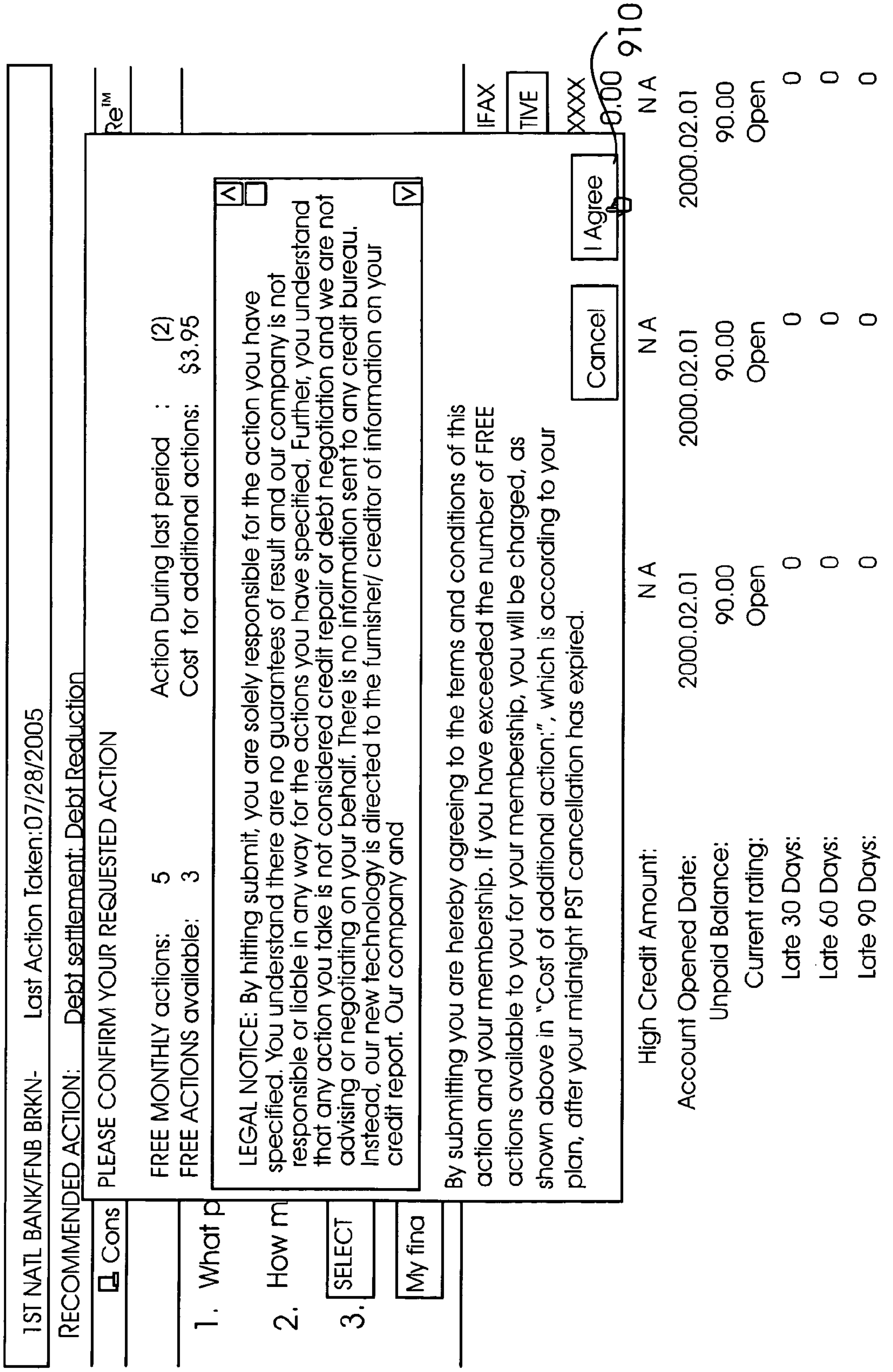
FIG. 31 shows a confirmation screen that provides a summary of all the user actions based on user selection of the debt settlement tab, according to one aspect of the present invention.

FIG. 31 shows a confirmation screen that provides a summary of all the user actions based on user selection of the debt settlement tab 898A described above. The screen lists the various actions and the costs that are associated with the actions. The user is given an option to confirm all the actions 910.

After a user reviews the user credit report, the user may declare identity theft by selecting tab 894 (the selection is shown as 912, FIG. 32). The user is given two options: "Declare Not Mine" (914, FIG. 33) and validate (916, FIG. 34). If the user believes that a particular entry in the credit report is not the user's, then the user can select tab 914, as shown in FIG. 33. This initiates a dispute with the creditor wherein the creditor is notified that a particular entry is not user's and should be removed from the user's credit report.

The validate option 916 as shown in FIG. 34, allows a user to validate an entry on the credit report, directly with the creditor. Once again, the user is allowed to confirm all the entries whether disputed or validated via the screen shown in FIG. 35. By clicking on "I Agree' button (918), the user confirms all the disputed/validated entries.

Figure 36:
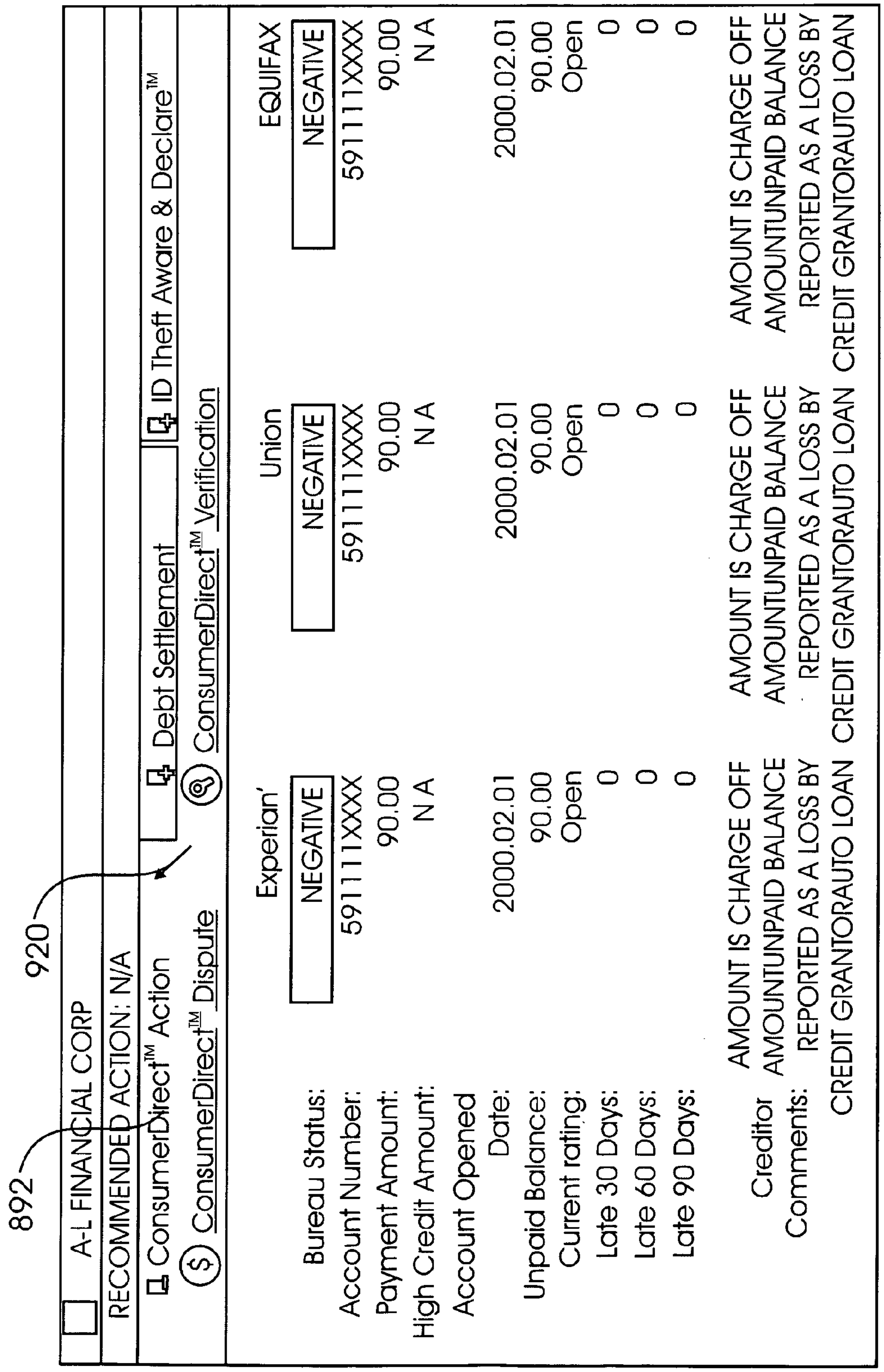
FIG. 36 shows a screen shot of a user interface when a user selects the consumer direct action, according to one aspect of the present invention.
Figure 39:
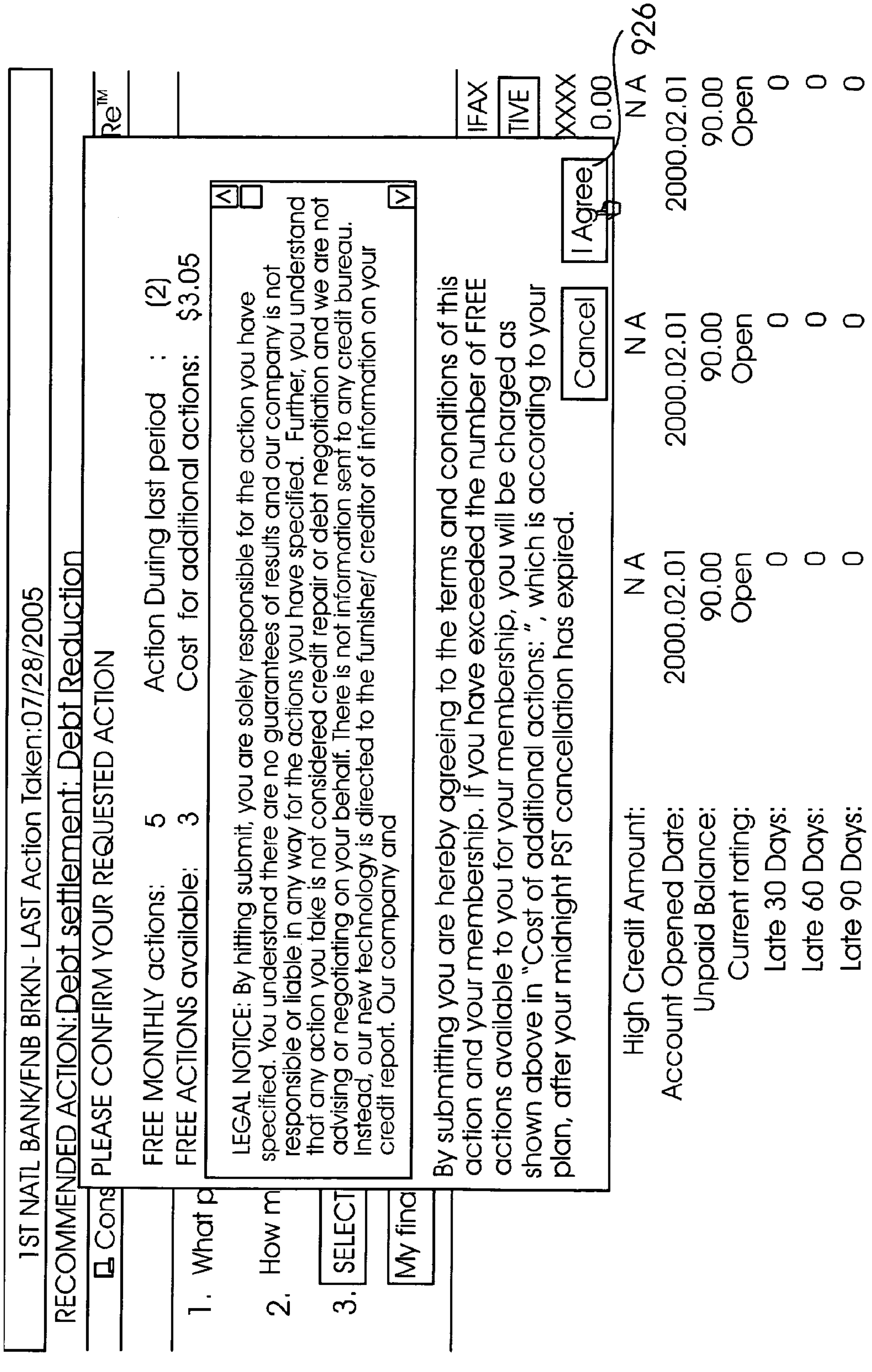
FIG. 39 again shows a confirmation screen where a user can confirm the actions it took by selection tab.

FIG. 36 shows a user interface when a user selects the consumer direct action 892 (shown as arrow 920). This screen allows a user to dispute an entry or verify that a credit report entry is accurate. FIG. 37 shows the screen shot where a user elects to dispute an entry (shown by 922) directly with a creditor. The screen shot allows the user to input a reason for the dispute 922A and after the reason is entered, the user can take action by clicking on button 922B.

FIG. 38 shows the screen shot where a user can verify an entry by clicking on the verification option 924. This notifies the creditor that a user has verified a particular account/debt or any other credit report entry.

FIG. 39 again shows a confirmation screen where a user can confirm the actions it took by selection tab 892. The user can cancel the actions or by clicking on "I Agree" (926) button confirm all the actions. Once again, the screen displays the summary of all the actions and the cost associated with the various options.

Although the present invention has been described with reference to specific embodiments, these embodiments are illustrative only and not limiting. Many other applications and embodiments of the present invention will be apparent in light of this disclosure and the following claims.

What is claimed is:

1. A computer implemented method, comprising;

(a) providing a user interface to a consumer via a computer network; wherein a computerized system provider executed by a computing system provides the user interface;

(b) presenting a plurality of questions to the consumer via the user interface for obtaining consumer credit related information; wherein the plurality of questions seek to obtain a number of identity theft related items a credit report for the consumer, a number of credit cards that the consumer has, and a combined balance owed by the consumer on the number of credit cards;

(c) answering the plurality of questions provided to the consumer in step (b), wherein the consumer answers the plurality of questions via the user interface provided by the computerized system provider executed by the computing system;

(d) analyzing the answers in step (c) for determining credit data for the consumer, wherein the computerized system provider executed by the computing system analyzes the answers in step (c); and wherein the credit data includes an estimated credit score of the consumer, an estimated future credit score of the consumer, an identity theft risk for the consumer and a potential loss to the consumer from the identity theft;

(e) storing the answers to the plurality of questions in step (c) in a leads database that is used for storing consumer credit related information and for enrolling the consumer for services offered by the computerized system provider for improving consumer credit and for protecting consumer identity; wherein the computerized system provider executed by the computing system stores the answers;

(f) storing the answers to the plurality of questions in step (c) in a credit analysis database that is used for determining the estimated credit score of the consumer, the estimated future credit score of the consumer, the identity theft risk for the consumer and the potential loss to the consumer from the identity theft; wherein the computerized system provider executed by the computing system stores the answers;

(g) displaying the credit data to the consumer on a display device; wherein the computerized system provider executed by the computing system displays the credit data via the user interface;

(h) inquiring into whether the consumer wants to register for managing credit online, offered by the computerized system provider; wherein the computerized system provider executed by the computing system makes the inquiry via the user interface;

(i) registering the consumer as a customer if the customer wants to register in step (h); wherein the computerized system provider executed by the computing system registers the consumer; and (j) if the consumer does not want to register in step (h), sending the consumer information from step (c) to a marketing analysis engine to categorize the consumer information for marketing credit improvement services to the consumer based on (i) if the consumer is a candidate for improving the consumer credit score, (ii) if the consumer has a potential for identity theft and (iii) if the consumer is a candidate for credit improvement; wherein the computerized system provider executed by the computing system sends the consumer information to the marketing analysis engine executed by the same computing system or a different computing system.

2. The method of claim 1, wherein the credit data further includes potential savings for the consumer by changing the credit data.

3. The method of claim 1, wherein the consumer credit related information received in step (j) of claim 1 is categorized and stored in a database that stores information regarding consumers who are candidates for improving consumer credit score.

4. The method of claim 1, wherein the consumer information received in step (j) of claim 1 is stored in a database that stores information regarding consumers with a risk of identity theft.

5. The method of claim 1, wherein the consumer information received in step (j) of claim 1 is stored in a database that stores information regarding consumers who are a candidate for improving credit.

6. The method of claim 1, wherein the computerized system provider executed by the computing system maintains one or more database for storing information regarding consumers who are a candidate for improving credit scores, have a potential for identity theft and are a candidate for credit improvement.

* * * * *